United States Patent
Deenoo et al.

(10) Patent No.: US 11,612,001 B2
(45) Date of Patent: Mar. 21, 2023

(54) DISTRIBUTED CONTROL IN WIRELESS SYSTEMS

(71) Applicant: Sony Group Corporation, Tokyo (JP)

(72) Inventors: Yugeswar Deenoo, Conshohocken, PA (US); Ghyslain Pelletier, Montreal (CA); Ping Hsuan Tan, Montreal (CA); Martino M Freda, Montreal (CA)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/734,126

(22) Filed: May 2, 2022

(65) Prior Publication Data

US 2022/0264660 A1  Aug. 18, 2022

Related U.S. Application Data

(63) Continuation of application No. 16/099,390, filed as application No. PCT/US2017/032069 on May 11, 2017, now Pat. No. 11,357,059.

(Continued)

(51) Int. Cl.
*H04W 8/22* (2009.01)
*H04W 74/08* (2009.01)
(Continued)

(52) U.S. Cl.
CPC ...... *H04W 74/0841* (2013.01); *H04B 7/0408* (2013.01); *H04B 7/0617* (2013.01);
(Continued)

(58) Field of Classification Search
CPC .......... H04B 7/0408; H04B 7/0617; H04L 5/0048; H04L 5/0053; H04L 5/0098;
(Continued)

(56) References Cited

U.S. PATENT DOCUMENTS

2014/0112220 A1  4/2014  Kwak et al.
2014/0247818 A1  9/2014  Lopez et al.
(Continued)

FOREIGN PATENT DOCUMENTS

EP     2987276 A1    2/2016
JP     2008-235961 A  10/2008
(Continued)

OTHER PUBLICATIONS

International Search Report and Written Opinion dated Sep. 11, 2017, issued in International Application No. PCT/US2017/032069.
Office Action dated Aug. 13, 2020, in corresponding Russian patent Application No. 1811537, 15 pages.
(Continued)

*Primary Examiner* — Mansour Oveissi
(74) *Attorney, Agent, or Firm* — Xsensus LLP

(57) ABSTRACT

Systems, procedures, and instrumentalities are disclosed for distributed control in wireless systems, such as 5G flexible radio access technology (RAT) (5gFLEX). Example procedures are provided for WTRU and network operation associated with a distributed control plane architecture, connectionless data transfer and dedicated system information acquisition. Distributed control may be provided, for example, by replicating a plurality of access control functions (ACFs) using a plurality of instances in a plurality of different transmission/reception points (TRPs) with multi-connectivity. The plurality of TRPs may concurrently provide control services to a WTRU. Centralized control functions may manage core network connectivity and/or a plurality of user plane instances for the WTRU and/or may facilitate coordination between the plurality of ACF instances for the WTRU in the plurality of different TRPs of the WTRU's configuration.

12 Claims, 13 Drawing Sheets

Related U.S. Application Data

(60) Provisional application No. 62/442,317, filed on Jan. 4, 2017, provisional application No. 62/416,499, filed on Nov. 2, 2016, provisional application No. 62/400,810, filed on Sep. 28, 2016, provisional application No. 62/334,704, filed on May 11, 2016.

(51) Int. Cl.
| | | |
|---|---|---|
| *H04B 7/0408* | (2017.01) | |
| *H04B 7/06* | (2006.01) | |
| *H04W 76/11* | (2018.01) | |
| *H04W 76/27* | (2018.01) | |
| *H04L 5/00* | (2006.01) | |
| *H04W 16/14* | (2009.01) | |
| *H04W 56/00* | (2009.01) | |
| *H04W 68/00* | (2009.01) | |
| *H04W 72/0453* | (2023.01) | |
| *H04W 80/02* | (2009.01) | |

(52) U.S. Cl.
CPC .......... *H04L 5/0048* (2013.01); *H04L 5/0098* (2013.01); *H04W 8/22* (2013.01); *H04W 16/14* (2013.01); *H04W 56/001* (2013.01); *H04W 68/005* (2013.01); *H04W 72/0453* (2013.01); *H04W 76/11* (2018.02); *H04W 76/27* (2018.02); *H04W 80/02* (2013.01)

(58) Field of Classification Search
CPC ................ H04W 16/14; H04W 48/14; H04W 56/001; H04W 68/005; H04W 72/0453; H04W 74/0833; H04W 74/0841; H04W 76/11; H04W 76/27; H04W 8/22; H04W 80/02
See application file for complete search history.

(56) References Cited

U.S. PATENT DOCUMENTS

| | | |
|---|---|---|
| 2015/0201368 A1 | 7/2015 | Cudak et al. |
| 2015/0208443 A1 | 7/2015 | Jung et al. |
| 2015/0271704 A1 | 9/2015 | Suh et al. |
| 2016/0234736 A1 | 8/2016 | Kubota et al. |
| 2017/0064691 A1 | 3/2017 | Kubota et al. |
| 2017/0111886 A1* | 4/2017 | Kim .................... H04W 72/042 |
| 2019/0104549 A1 | 4/2019 | Deng et al. |
| 2019/0124650 A1 | 4/2019 | Sun et al. |
| 2019/0223094 A1* | 7/2019 | Ingale ................. H04W 56/001 |
| 2019/0394807 A1* | 12/2019 | Xiao ..................... H04W 72/10 |

FOREIGN PATENT DOCUMENTS

| | | |
|---|---|---|
| JP | 2013-528009 A | 7/2013 |
| JP | 2017-503386 A | 1/2017 |
| KR | 2014-0035930 A | 3/2014 |
| KR | 2014-0052786 A | 5/2014 |
| KR | 2014-0136630 A | 12/2014 |
| KR | 2015-0015447 A | 2/2015 |
| RU | 2254682 C1 | 6/2005 |
| RU | 2419213 C2 | 5/2011 |
| RU | 2446575 C2 | 3/2012 |
| WO | 2011/111233 A1 | 9/2011 |
| WO | 2013/086164 A1 | 6/2013 |
| WO | 2013/141541 A1 | 9/2013 |
| WO | 2014/104758 A1 | 7/2014 |
| WO | 2015/045658 A1 | 4/2015 |
| WO | 2015/080646 A1 | 6/2015 |
| WO | 2016/130354 A1 | 8/2016 |

OTHER PUBLICATIONS

Nortel, NEC, On demand System Information broadcast. Email rapporteur report [online], 3GPP TSG RAN WG2#58B is Tdoc R2-070071, Mar. 5, 2021, URL:https://www.3gpp.org/ftp/tsg_ran/WG2_RL2/TSGR2_56bis/Documents.htm.

* cited by examiner

DISTRIBUTED CONTROL IN WIRELESS SYSTEMS

CROSS-REFERENCE TO RELATED APPLICATIONS

This application is a continuation of U.S. application Ser. No. 16/099,390, filed Nov. 6, 2018, which is a national stage (under 35 U.S.C. 371) of International Patent Application No. PCT/US2017/032069, filed May 11, 2017 and claims the benefit of U.S. Provisional Patent Application No. 62/442,317 filed on Jan. 4, 2017; U.S. Provisional Patent Application No. 62/416,499, filed on Nov. 2, 2016; U.S. Provisional Patent Application No. 62/400,810, filed on Sep. 28, 2016; and U.S. Provisional Patent Application No. 62/334,704, filed on May 11, 2016, the contents of all of which being hereby incorporated by reference as if fully set-forth herein in their respective entirety, for all purposes.

BACKGROUND

Mobile communications continue to evolve. A fifth generation may be referred to as 5G. A previous (legacy) generation of mobile communication may be, for example, fourth generation (4G) long term evolution (LTE).

SUMMARY

Systems, procedures, and instrumentalities (e.g., aspects of entities, interfaces and/or procedures in a wireless transmit/receive unit (WTRU) and/or network layers L1, L2, l3) are disclosed for distributed control in wireless systems, such as 5G flexible radio access technology (RAT) (5gFLEX). Example procedures are provided for WTRU and network operation associated with a distributed control plane architecture, connectionless data transfer and/or dedicated system information acquisition. Distributed control may be provided, for example, by replicating a plurality of access control functions (ACFs) using a plurality of instances in a plurality of different transmission/reception points (TRPs) with multi-connectivity. The plurality of TRPs may concurrently provide control services to a WTRU. Centralized control functions may manage core network connectivity and/or a plurality of user plane instances for the WTRU and/or may facilitate coordination between the plurality of ACF instances for the WTRU in the plurality of different TRPs of the WTRU's configuration. For example, there may be a first access plane between the WTRU and a first TRP that provides a first ACF for the WTRU, a second access plane between the WTRU and a second TRP that provides a second ACF for the WTRU, a RAN central control plane between the WTRU and a first RAN central control function (RCCF) and/or a RAN central user plane between the WTRU and a RAN central user function (RCUF).

A WTRU may use assistance information for beamformed system information delivery. Assistance information may be determined and/or transmitted.

A WTRU may determine when to apply and/or activate on-demand system information. A WTRU may determine when to delete and/or deactivate on-demand system information.

A WTRU may have saved instructions in memory executable by a processor and/or received from a wireless network via a message (e.g., rules) for triggering a system information ("SI") request procedure. A WTRU may also have saved instructions in memory executable by a processor and/or received from a wireless network via a message for performing an SI request, (e.g., using a random access channel "RACH"), and/or msg3 and/or handling of networks.

A wireless transmit/receive unit (WTRU) may be in communication with a communication network. The WTRU may comprise a memory. The WTRU may comprise a processor. The processor may be configured to determine to request one or more system information (SI) messages from the communication network. The processor may be configured to determine if a transmission of the one or more SI message from the communication network will utilize at least one beamformed communication based on one or more communication parameters. The WTRU may comprise a transceiver. The transceiver may be configured to receive at least one of the one or more SI messages from the communication network via the at least one beamformed communication.

A wireless transmit/receive unit (WTRU) may be in communication with a communication network. The WTRU may comprise a memory. The WTRU may comprise a processor. The processor may be configured to determine to request one or more system information (SI) messages from the communication network. The processor may be configured to conduct a beam sweep operation of one or more downlink (DL) beams transmitted from the communication network. The processor may be configured to identify at least one DL beam of the one or more DL beams via which to receive the one or more on-demand SI messages based at least in part on the beam sweep operation. The processor may be configured to determine one or more uplink (UL) resources with which to communicate information for the WTRU reception of the one or more on-demand SI messages. The information for the WTRU reception may include the at least one DL beam. The processor may be configured to initiate the request for the one or more on-demand SI messages from the communication network. The WTRU may comprise a transceiver. The transceiver may be configured to send the request for the one or more on-demand SI messages to the communication network using the one or more UL resources. The request may include the information for the WTRU reception of the one or more on-demand SI messages. The transceiver may be configured to receive at least one of the one or more on-demand SI messages from the communication network via the at least one DL beam.

A wireless transmit/receive unit (WTRU) may be in communication with a communication network. The WTRU may comprise a memory. The WTRU may comprise a transceiver. The transceiver may be configured to receive system information (SI) from the communication network at a first-time instance. The WTRU may comprise a processor. The processor may be configured to determine a first-reference identifier (ID) that corresponds to at least some of the SI of the first-time instance. The processor may be configured to determine a first-value identifier (ID) that corresponds to the at least some of the SI of the first-time instance. The processor may be configured to associate the first-reference ID and/or the first-value ID with the at least some of the SI of the first-time instance. The processor may be configured to utilize the at least some of the SI of the first-time instance in communication with the communication network. The processor may be configured to search the memory for stored SI of a previous-time instance that is associated with the same first-reference ID of the at least some of the SI of the first-time instance. The processor may be configured to store the at least some of the SI of the first-time instance upon no stored SI of the previous-time instance associated with the same first-reference ID being found. The processor may be configured to replace stored SI of the previous-time instance associated with the same first-reference ID with the at least some of the SI of the first-time instance upon a value ID associated with the stored SI of the previous-time instance associated with the same first-reference ID being different from the first-value ID.

A wireless transmit/receive unit (WTRU) may be in communication with a communication network. The WTRU may comprise a memory. The WTRU may comprise a processor. The processor may be configured to determine to request other system information (other-SI) from the communication network. The WTRU may be configured to initiate the request for the other-SI from the communication network as part of a Radom Access Channel (RACH) procedure. The WTRU may comprise a transceiver. The transceiver may be configured to transmit a RACH signal. The RACH signal may include the request for the other-SI in a random access preamble of the RACH signal. The processor may be configured to monitor for a message that includes a minimum SI from the communication network for a predetermined period of time following the transmission of the RACH signal. The processor may be configured to determine if the requested other-SI is included in the message that includes the minimum SI upon a detection of the message that includes the minimum SI. The processor may initiate one or more retransmissions of the RACH signal the message that includes the minimum SI not being detected, and/or the other-SI is determined to not be included in a detected message that includes the minimum SI.

DETAILED DESCRIPTION

A detailed description of illustrative embodiments will now be described with reference to the various Figures. Although this description provides a detailed example of possible implementations, it should be noted that the details are intended to be examples and in no way limit the scope of the application.

Figure 1A:
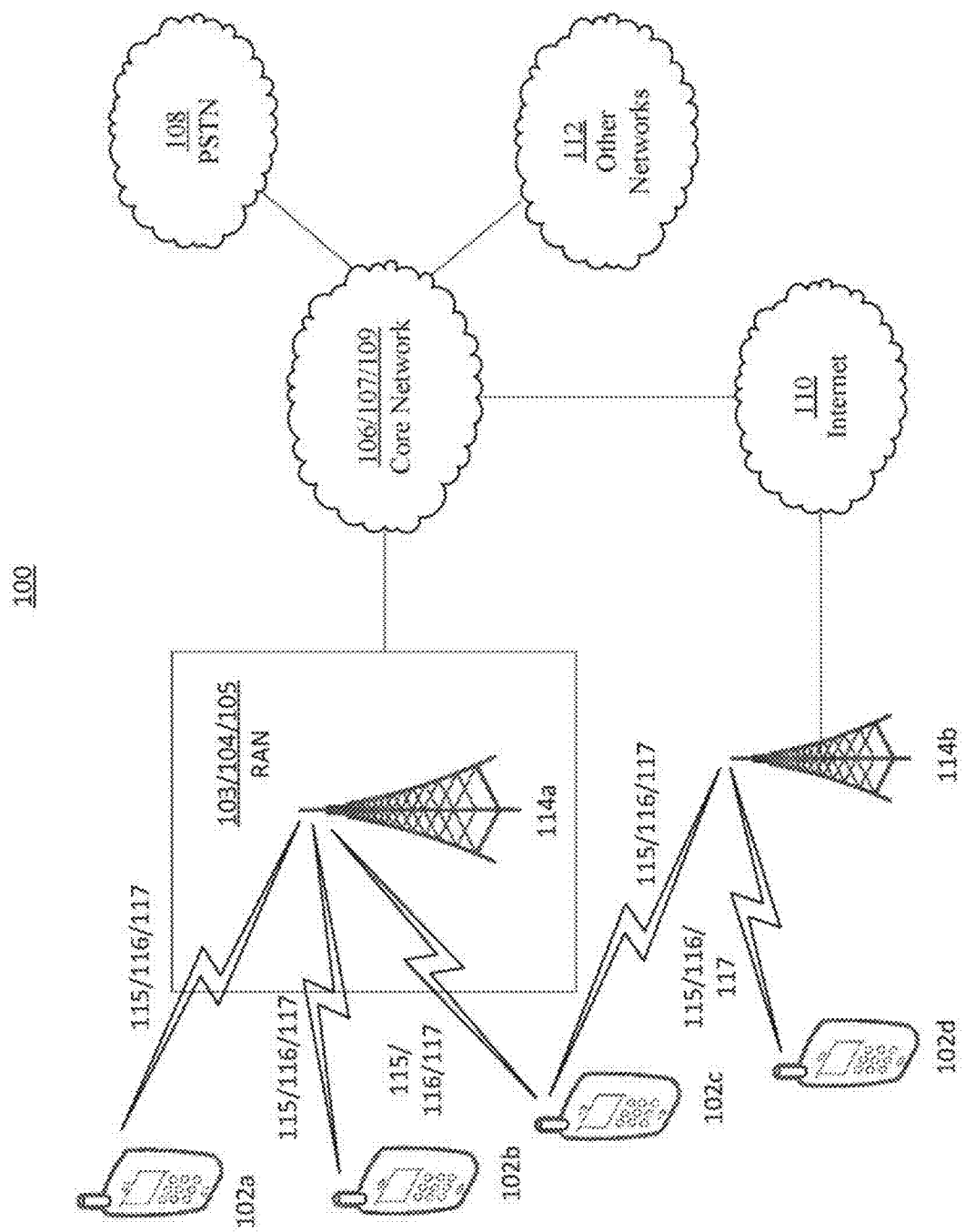
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
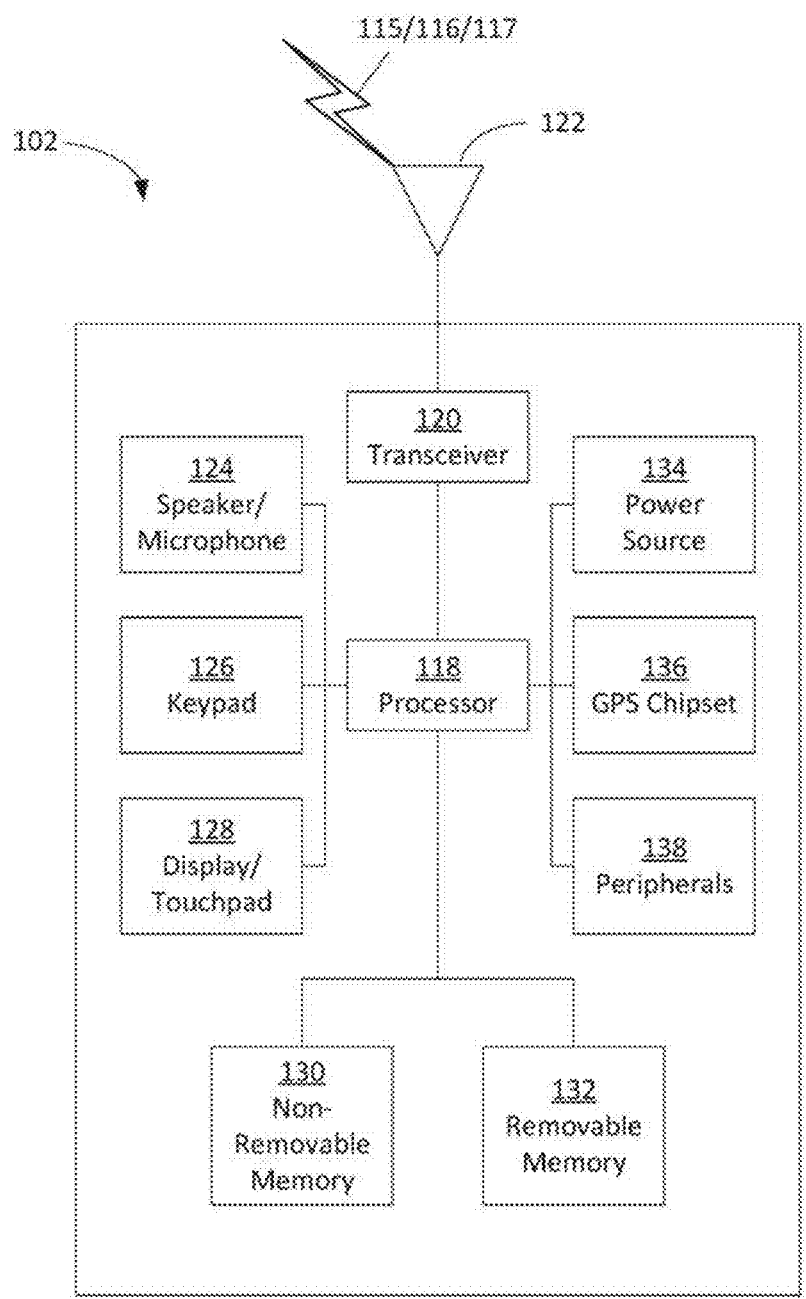
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive RF and/or light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
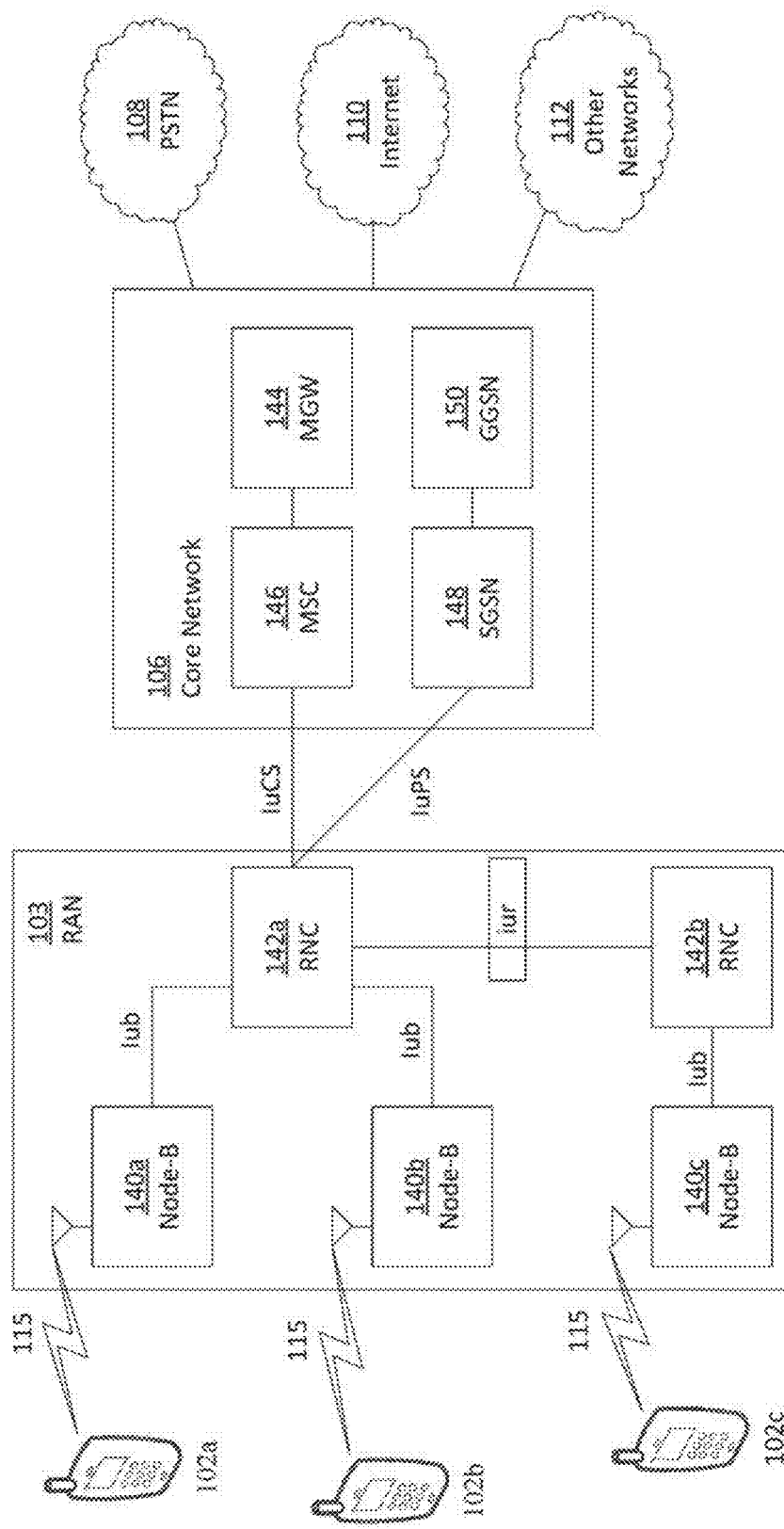
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
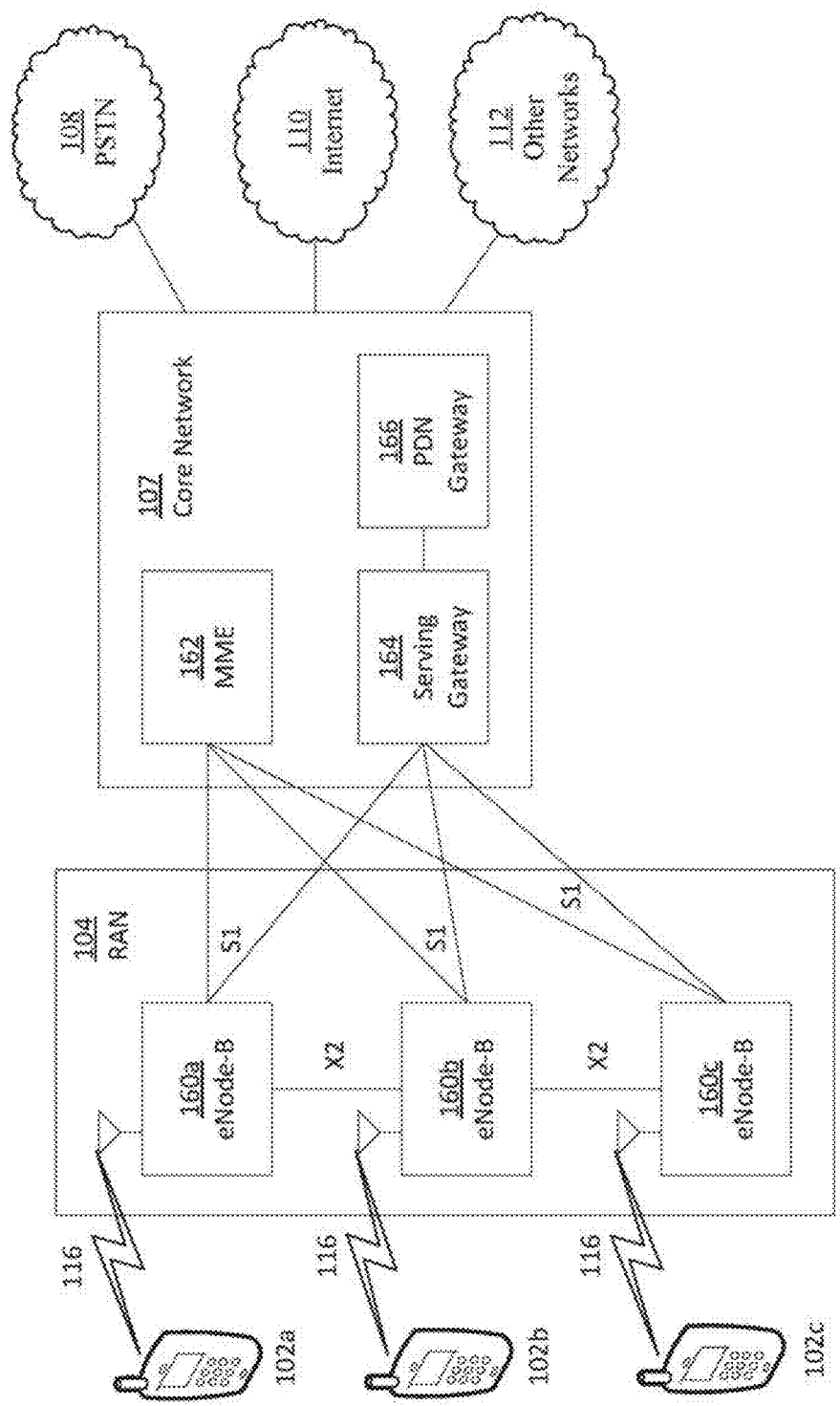
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
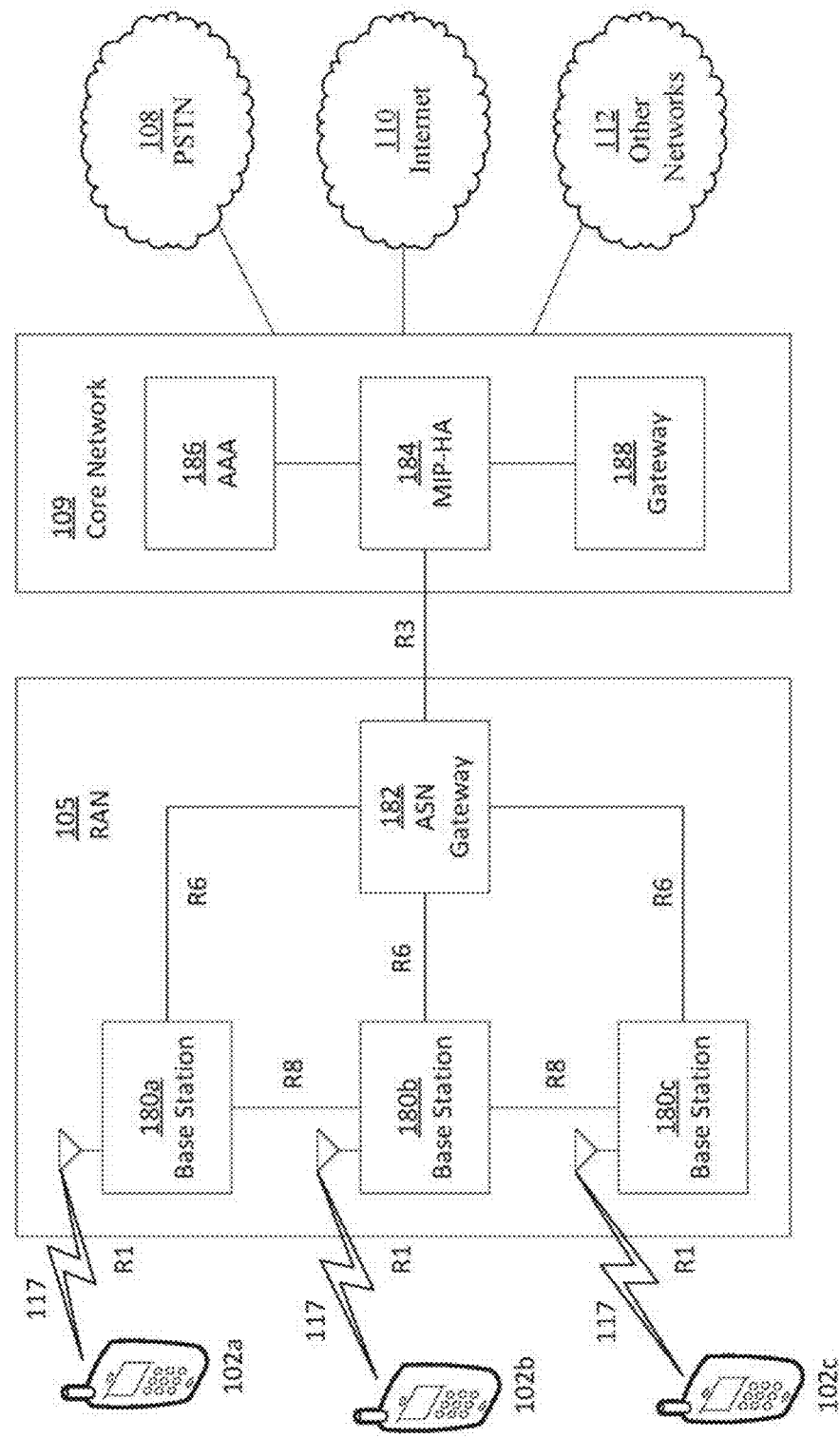
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In view of FIGS. 1A-1E, and the corresponding description of FIGS. 1A-1E, one or more, or all, of the functions described herein with regard to one or more of: WTRU 102a-d, Base Station 114a-b, Node B 140a-c, RNC 142a-b, MSC 146, SGSN 148, MGW 144, CGSN 150, eNode-B 160a-c, MME 162, Serving Gateway 164, PDN Gateway 166, Base Station 180a-c, ASN Gateway 182, AAA 186, MIP-HA 184, and/or Gateway 188, or the like, may be performed by one or more emulation devices (not shown) (e.g., one or more devices configured to emulate one or more, or all, of the functions described herein).

The one or more emulation devices may be configured to perform the one or more, or all, functions in one or more modalities. For example, the one or more emulation devices may perform the one or more, or all, functions while being fully or partially implemented/deployed as part of a wired and/or wireless communication network. The one or more emulation devices may perform the one or more, or all, functions while being temporarily implemented/deployed as part of a wired and/or wireless communication network. The one or more emulation devices may perform the one or more, or all, functions while not being implemented/deployed as part of a wired and/or wireless communication network (e.g., such as in a testing scenario in a testing laboratory and/or a non-deployed (e.g. testing) wired and/or wireless communication network, and/or testing performed on one or more deployed components of a wired and/or wireless communication network). The one or more emulation devices may be test equipment.

Below is a list of abbreviations and acronyms that may be used herein, by way of example and not limitation.
Δf Sub-carrier spacing
5gFlex 5G Flexible Radio Access Technology
5gNB 5GFlex NodeB
ACK Acknowledgement
BLER Block Error Rate
BTI Basic TI (in integer multiple of one or more symbol duration)
CB Contention-Based (e.g. access, channel, resource)
CoMP Coordinated Multi-Point transmission/reception
CP Cyclic Prefix
CP-OFDM Conventional OFDM (relying on cyclic prefix)
CQI Channel Quality Indicator
CN Core Network (e.g. LTE packet core)
CRC Cyclic Redundancy Check
CSG Closed Subscriber Group
CSI Channel State Information
D2D Device to Device transmissions (e.g. LTE Sidelink)
DCI Downlink Control Information
DL Downlink
DM-RS Demodulation Reference Signal
DRB Data Radio Bearer
EPC Evolved Packet Core
FBMC Filtered Band Multi-Carrier
FBMC/OQAM A FBMC technique using Offset Quadrature Amplitude Modulation
FDD Frequency Division Duplexing
FDM Frequency Division Multiplexing
ICC Industrial Control and Communications
ICIC Inter-Cell Interference Cancellation
IP Internet Protocol
LAA License Assisted Access
LBT Listen-Before-Talk
LCH Logical Channel
LCP Logical Channel Prioritization
LLC Low Latency Communications
LTE Long Term Evolution e.g. from 3GPP LTE R8 and up
MAC Medium Access Control
NACK Negative ACK
MC MultiCarrier
MCS Modulation and Coding Scheme
MIMO Multiple Input Multiple Output
MTC Machine-Type Communications
NAS Non-Access Stratum
NR New Radio access technology
NR-eNB A network node that may e.g. schedule NR resources
OFDM Orthogonal Frequency-Division Multiplexing
OOB Out-Of-Band (emissions)
$P_{cmax}$ Total available UE power in a given TI
PHY Physical Layer
PRACH Physical Random Access Channel
PDU Protocol Data Unit
PER Packet Error Rate
PLMN Public Land Mobile Network
PLR Packet Loss Rate
PSS Primary Synchronization Signal
QoS Quality of Service (from the physical layer perspective)
RAB Radio Access Bearer
RACH Random Access Channel (or procedure)
RAR Random Access Response
RCU Radio access network Central Unit
RF Radio Front end
RNTI Radio Network Temporary Identifier
RRC Radio Resource Control
RRM Radio Resource Management
RS Reference Signal
RTT Round-Trip Time
SCMA Single Carrier Multiple Access
SDU Service Data Unit
SI System Information
SL Sidelink SOM Spectrum Operation Mode
SS Synchronization Signal
SSS Secondary Synchronization Signal
SRB Signaling Radio Bearer
SWG Switching Gap (in a self-contained subframe)
TB Transport Block
TBS Transport Block Size
TDD Time-Division Duplexing
TDM Time-Division Multiplexing
TI Time Interval (in integer multiple of one or more BTI)
TTI Transmission Time Interval (in integer multiple of one or more TI)
TRP Transmission/Reception Point
TRPG Transmission/Reception Point Group
TRx Transceiver
UFMC Universal Filtered MultiCarrier
UF-OFDM Universal Filtered OFDM
UL Uplink
URC Ultra-Reliable Communications
URLLC Ultra-Reliable and Low Latency Communications
Uu Interface between a NR-eNB/TRP (or equivalent) and a UE
V2V Vehicle to vehicle communications
V2X Vehicular communications
WLAN Wireless Local Area Networks and related technologies (IEEE 802.xx domain)

Systems may manage (e.g., attempt to minimize) the impact of on-demand other-SI broadcast on an uninterested WTRU. Multi-stage RACH may be used for other-SI request. A WTRU may handle stored SI and/or may operate in a reduced MSI cell.

Terms New Radio (NR), 5gFLEX and 5G may be used interchangeably. While examples may refer to 3GPP protocols, subject matter described herein is applicable to other wireless systems (e.g., other wireless technologies, communication and/or control procedures). Terms and definitions do not limit the applicability of disclosed subject matter to other definitions, types of signals, configuration procedures and/or logical associations, e.g., between different user data units.

An air interface, e.g., for a new radio (NR) access technology in a 5G system, may support a variety of use cases, such as improved broadband performance (IBB), Industrial control and communications (ICC) and/or vehicular applications (V2X) and/or Massive Machine-Type Communications (mMTC). Use cases may have associated support in an air interface (e.g., 5G air interface).

An air interface may support, for example, ultra-low transmission latency (LLC), ultra-reliable transmission (URC) and/or machine-type communications (MTC) operation (including narrowband operation).

Support for ultra-low transmission latency (LLC) may comprise, for example, air interface latency such as 1 ms RTT and/or TTIs between 100 us to 250 us. Support may be provided for ultra-low access latency (e.g., time from initial system access until the completion of the transmission of the first user plane data unit). End-to-end (e2e) latency less than 10 ms may be supported, for example, for IC and/or V2X.

Support for ultra-reliable transmission (URC) may comprise, for example, improved transmission reliability, such as 99.999% transmission success and/or service availability. Support may be provided for mobility speed in the range of 0-500 km/h. Packet Loss Ratio of less than $10e^{-6}$ may be supported, for example, for IC and/or V2X.

Support for MTC operation may comprise, for example, air interface support for narrowband operation (e.g. using less than 200 KHz), extended battery life (e.g., up to 15 years of autonomy) and/or minimal communication overhead for small and/or infrequent data transmissions (e.g., low data rate in the range of 1-100 kbps with access latency of seconds to hours).

A 5gFLEX system may be implemented with OFDM and/or other waveforms for uplink and/or downlink. Description of examples herein is non-limiting. Examples are applicable and/or adaptable to other waveforms and wireless technologies.

OFDM may be used as a signal format for data transmissions, e.g., in LTE and IEEE 802.11. OFDM may efficiently divide spectrum into multiple parallel orthogonal subbands. A (e.g., one or more, or each) subcarrier may be shaped using a rectangular window in the time domain, which may lead to sinc-shaped subcarriers in the frequency domain. OFDMA may rely on (e.g., perfect) frequency synchronization and/or tight management of uplink timing alignment within the duration of the cyclic prefix, for example, to maintain orthogonality between signals and/or to minimize intercarrier interference. Tight synchronization may be difficult, for example, in a system where a WTRU may be simultaneously connected to one or more, or multiple access points. Additional power reduction may be applied to uplink transmissions, for example, to comply with spectral emission requirements for adjacent bands. Fragmented spectrum may be aggregated for WTRU transmissions.

OFDM (CP-OFDM) performance may be improved, for example, by more stringent RF requirements for implementations, such as operation using a large amount of contiguous spectrum that might not require aggregation. A CP-based OFDM transmission scheme may provide a downlink physical layer for 5G similar to a 4G system with modifications to pilot signal density and/or location.

5gFLEX radio access may be characterized by a very high degree of spectrum flexibility that enables deployment in different frequency bands with different characteristics, which may include different duplex arrangements, different and/or variable sizes of available spectrum, such as contiguous and/or non-contiguous spectrum allocations in the same or different bands. 5gFLEX radio access may support variable timing aspects, such as support for one or more, or multiple TTI lengths and/or asynchronous transmissions.

Multiple duplexing schemes (e.g., TDD, FDD) may be supported. Supplemental downlink operation may be supported, e.g., for FDD operation, for example, using spectrum aggregation. FDD operation may support full-duplex FDD and/or half-duplex FDD operation. DL/UL allocation may be dynamic (e.g., might not be based on a fixed DL/UL frame configuration), e.g., for TDD operation. The length of a DL and/or a UL transmission interval may be set per transmission opportunity.

A 5G air interface characteristic and/or capability may enable different transmission bandwidths on uplink and/or downlink ranging, e.g., varying between a nominal system bandwidth to a maximum value corresponding to the system bandwidth.

Single carrier operation may support a variety and/or range of system bandwidths, such as 5, 10, 20, 40, and/or 80 MHz, and/or 160 MHz. Nominal bandwidths may have one or more fixed values. Narrowband transmissions (e.g., 0 to 200 KHz) may be supported within the operating bandwidth for MTC devices.

System bandwidth may refer to the largest portion of spectrum that may be managed by a network for a given carrier. The spectral portion of a carrier that a WTRU minimally supports for cell acquisition, measurements and/or initial access to the network may correspond to the nominal system bandwidth. A WTRU may be configured with a channel bandwidth that may be within the range of the entire system bandwidth. A WTRU's configured channel bandwidth may or might not include a nominal part of system bandwidth, e.g., as shown in the example in FIG. 2.

Figure 2:
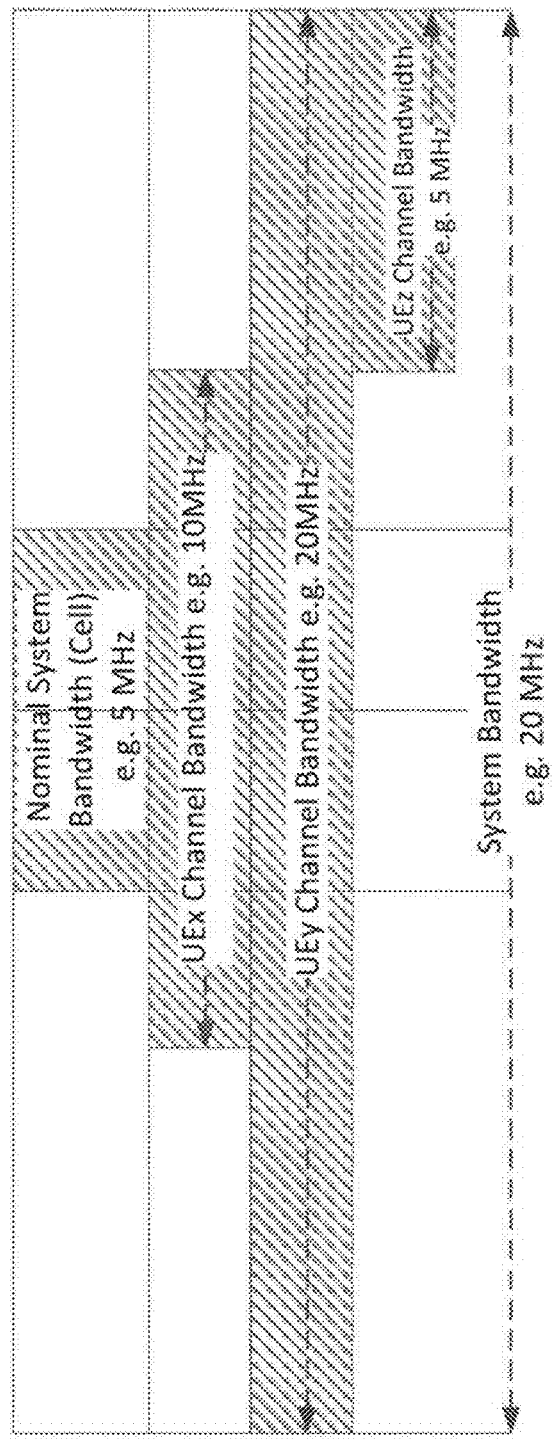
FIG. 2 is an example of transmission bandwidths.

FIG. 2 is an example of transmission bandwidths. Bandwidth flexibility may be achieved, for example, because (e.g., all) applicable sets of RF requirements for a given maximum operating bandwidth in a band may be met without the introduction of additional allowed channel bandwidths for that operating band, e.g., due to the efficient support of baseband filtering of the frequency domain waveform.

A WTRU's channel bandwidth for single carrier operation may be configured, reconfigured and/or dynamically changed. Spectrum for narrowband transmissions within the nominal system, system and/or configured channel bandwidth may be allocated.

A 5G air interface physical layer may be band-agnostic and/or may support operation in licensed bands (e.g., below 5 GHz) and/or unlicensed bands (e.g., in the range 5-6 GHz). Listen before talk (LBT) Cat 4 based channel access framework similar to LTE LAA may be supported, e.g., for operation in unlicensed bands.

Cell-specific and/or WTRU-specific channel bandwidths for arbitrary spectrum block sizes may be scaled and/or managed (e.g., scheduling, addressing of resources, broadcasted signals, measurements, etc.).

Downlink control channels and signals may support FDM operation. A WTRU may acquire a downlink carrier, for example, by receiving transmissions using (e.g., only) the nominal part of the system bandwidth. For example, a WTRU might not initially receive transmissions covering the entire bandwidth being managed by the network for the concerned carrier.

Downlink data channels may be allocated over a bandwidth that may or might not correspond to nominal system bandwidth, e.g., without restrictions other than being within a WTRU's configured channel bandwidth. For example, a network may operate a carrier with a 12 MHz system bandwidth using a 5 MHz nominal bandwidth allowing devices supporting 5 MHz maximum RF bandwidth to acquire and/or access the system while potentially allocating +10 to −10 MHz of the carrier frequency to other WTRU's supporting up to 20 MHz worth of channel bandwidth.

Figure 3:
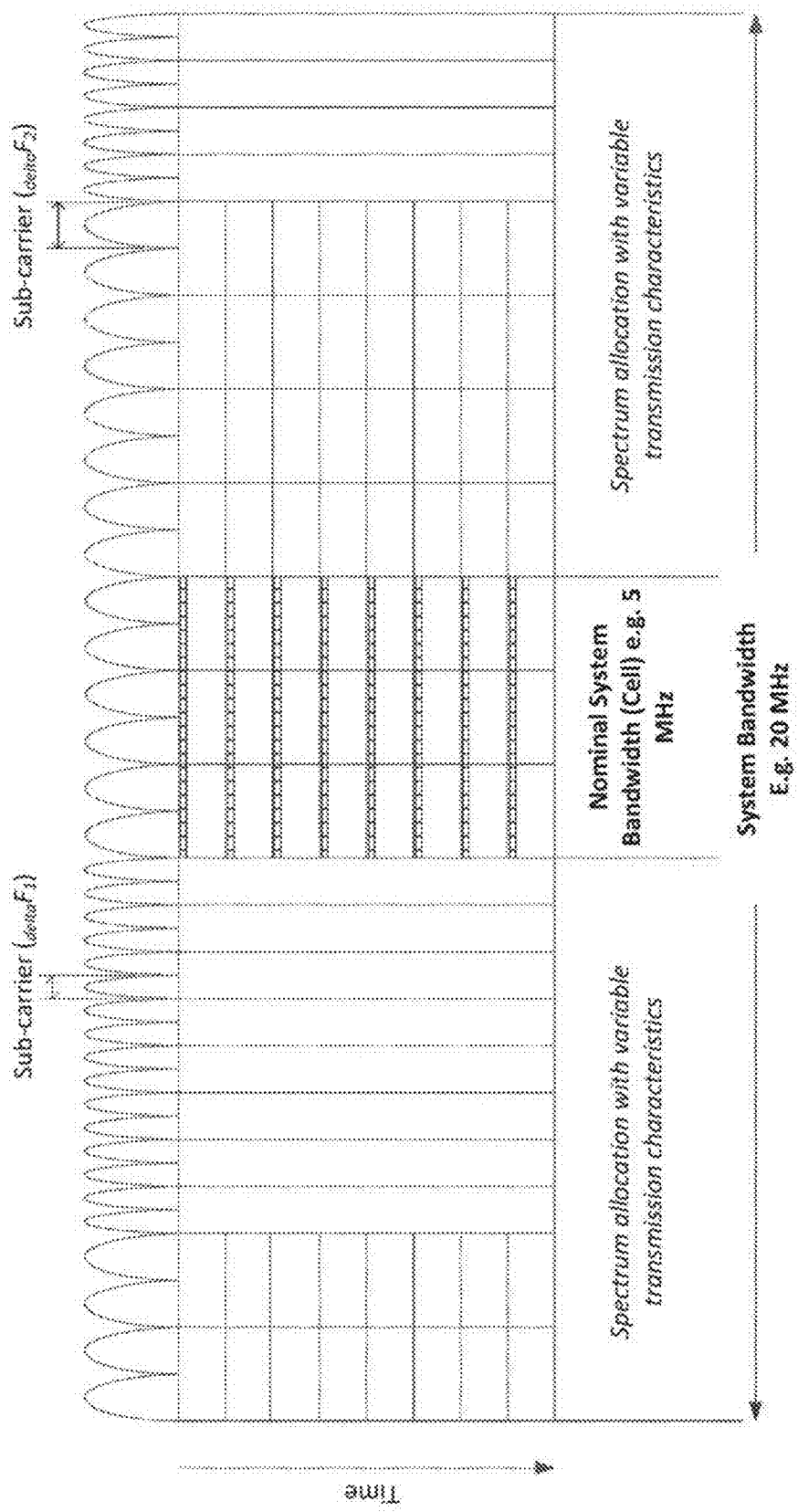
FIG. 3 is an example of flexible spectrum allocation.

FIG. 3 is an example of flexible spectrum allocation. FIG. 3 shows an example of spectrum allocation where different subcarriers may be (e.g., at least conceptually) assigned to different modes of operation (hereafter Spectrum Operation Mode or SOM). Different SOM may be used to fulfill different requirements for different transmissions. A SOM may include and/or be defined based on one or more of a subcarrier spacing, a TTI length and/or one or more reliability aspects (e.g., HARQ processing aspects, secondary control channel). A SOM may be used to refer to a (e.g., specific) waveform and/or may be related to a processing aspect (e.g., in support of co-existence of different waveforms in the same carrier using FDM and/or TDM and/or coexistence of FDD operation in a TDD band (e.g. with support in a TDM manner or similar)).

A WTRU may be configured to perform transmissions according to one or more SOMs. For example, a SOM may correspond to transmissions that use at least one of the following: a specific TTI duration, a specific initial power level, a specific HARQ processing type, a specific upper bound for successful HARQ reception/transmission, a specific transmission mode, a specific physical channel (uplink and/or downlink), a specific waveform type and/or even a transmission according to a specific RAT (e.g., LTE and/or according to a 5G transmission technique). A SOM may correspond to a QoS level and/or a related aspect (e.g., maximum/target latency, maximum/target BLER or similar). A SOM may correspond to a spectrum area and/or to a specific control channel and/or aspect thereof (e.g., search space and/or DCI type). For example, a WTRU may be configured with a SOM for a URC type of service, a LLC type of service and/or an MBB type of service. A WTRU may have a configuration for a SUM for system access and/or for transmission/reception of L3 control signaling (e.g., RRC), for example, in a portion of a spectrum associated with a system, such as in a nominal system bandwidth.

Spectrum aggregation may be supported (e.g., for single carrier operation). A WTRU may support transmission and/or reception of one or more, or multiple transport blocks over contiguous and/or non-contiguous sets of physical resource blocks (PRBs), e.g., within the same operating band. Mapping of a single transport block to separate sets of PRBs may be supported. Support may be provided for simultaneous transmissions associated with different SOM requirements.

Multicarrier operation may be supported, for example, using contiguous and/or non-contiguous spectrum blocks within the same operating band and/or across two or more operating bands. Support may be provided for aggregation of spectrum blocks using different modes (e.g., FDD and/or TDD) and/or different channel access procedures (e.g., licensed and/or unlicensed band operation below 6 GHz). Support may be provided for procedures that configure, reconfigure and/or dynamically change a WTRU's multicarrier aggregation.

A scheduling function may be supported in the MAC layer. Support may be provided for one or more, or multiple (e.g., two) scheduling modes, e.g., network-based scheduling (e.g., for tight scheduling in terms of resources, timing and/or transmission parameters of downlink transmissions, and/or uplink transmissions) and/or WTRU-based scheduling (e.g., for more flexibility in terms of timing and/or transmission parameters). Scheduling information for modes may be valid for one or more TTIs.

Network-based scheduling may enable a network to tightly manage available radio resources assigned to different WTRUs, which may permit optimal sharing of resources. Dynamic scheduling may be supported.

WTRU-based scheduling may enable a WTRU to opportunistically access uplink resources with minimal latency on a per-use basis, for example, within a set of shared and/or dedicated uplink resources assigned (e.g., statically and/or dynamically) by the network. Support may be provided for synchronized and/or unsynchronized opportunistic transmissions. Support may be provided for contention-based transmissions and/or contention-free transmissions.

Support for opportunistic transmissions (scheduled and/or unscheduled) may be provided, for example, to meet ultra-low latency requirements for 5G and/or power saving requirements for mMTC.

A WTRU may be configured to receive and/or detect one or more system signatures. A system signature may consist of a signal structure using a sequence. A signal may be similar to a synchronization signal, e.g., similar to LTE PSS and/or SSS. A signature may be specific to (e.g., may uniquely identify) a particular node (and/or transmission/reception point (TRP)) within a given area and/or it may be common to a plurality of nodes (and/or TRPs) within an area, which aspect might not be known and/or relevant to a WTRU. A WTRU may determine and/or detect a system signature sequence. A WTRU may determine one or more parameters associated with the system. For example, a WTRU may further derive an index therefrom and/or may use the index to retrieve associated parameters, e.g., within a table, such as an access table. For example, a WTRU may use received power associated with a signature for open-loop power control, e.g., to set an initial transmission power when a WTRU determines that it may access (and/or transmit) using applicable resources of the system. For example, a WTRU may use the timing of a received signature sequence, e.g., to set the timing of a transmission (e.g., a preamble on a PRACH resource) when the WTRU determines that it may access (and/or transmit) using applicable resources of the system.

A system signature may consist of any type of signal received by a WTRU for one or more purposes described herein.

A WTRU may be configured with a list of one or more entries. A list may be referred to as an access table. A list may be indexed, e.g., where an (e.g., one or more, or each) entry may be associated with a system signature and/or to a sequence thereof. An access table may provide initial access parameters for one or more areas. An (e.g., one or more, or each) entry may provide one or more parameters necessary for performing an initial access to the system. Parameters may include one or more of a set of one or more random access parameters (e.g., including applicable physical layer resources, such as PRACH resources) in time and/or frequency, initial power level and/or physical layer resources for reception of a response. Parameters may (e.g., further) include access restrictions (e.g., PLMN identity and/or CSG information). Parameters may (e.g., further) include routing-related information, such as one or more applicable routing areas. An entry may be associated with (and/or indexed by) a system signature. Such entry may be common to a plurality of nodes (and/or TRPs), for example. A WTRU may receive an access table, for example, via a transmission using dedicated resources (e.g., by RRC configuration) and/or by a transmission using broadcast resources. In the latter case, the periodicity of the transmission of an access table may be relatively long (e.g., up to 10240 ms), which may be longer than the periodicity of the transmission of a signature (e.g., in the range of 100 ms).

An access table may consist of any type of system information received by a WTRU for one or more purposes described herein.

5gFLEX may support one or more forms of association between data available for transmission and/or available resources for uplink transmissions. Multiplexing of data with different QoS requirements within the same transport block may be supported, for example, when multiplexing does not introduce a negative impact to the service with the most stringent QoS requirement and/or does not introduce an unnecessary waste of system resources.

A Logical Channel (LCH) may represent a logical association between data packets and/or PDUs. An association may be based on data units being associated with the same bearer (similar to legacy), and/or being associated with the same SOM and/or slice (e.g., a processing path using a set of physical resources). For example, an association may be characterized by one or more of a chaining of processing functions, an applicable physical data (and/or control) channel (and/or instance thereof) and/or an instantiation of a protocol stack with one or more of: a specific portion being centralized (e.g., PDCP and/or anything beyond portions of the physical layer processing such as Radio Front (RF) end); and/or another portion being closer to the edge (e.g. MAC/PHY in the TRP and/or RF) potentially separated by a fronthauling interface. The term LCH as used herein may have a different and/or broader meaning than a similar term for LTE systems.

A WTRU may be configured to determine a relationship between different data units. A relationship may be based on a matching function (e.g., based on the configuration of one or more field values common to data units that are part of the same logical association). Fields may correspond to fields in a protocol header associated with the data unit(s). For example, a matching function may use a tuple of parameters for fields of the IP headers of a data unit, such as IP source/destination address(es), transport protocol source/destination port(s) and/or transport protocol type, IP protocol version (e.g., IPv4 and/or IPv6), etc.

For example, data units that are part of the same logical association may share a common radio bearer, processing function, SOM and/or may (e.g., at least conceptually) correspond to the same LCH and/or LCG.

A Logical Channel Group (LCG) may consist of a group of LCH(s) (and/or equivalent as per the definition above), e.g., where a grouping may be based on one or more criteria. Criteria may be, for example, that one or more LCH(s) may have a similar priority level applicable to one or more, or all LCHs of the same LCG and/or may be associated with the same SOM (and/or type thereof), the same slice (and/or type thereof). For example, an association may characterized by one or more of a chaining of processing functions, an applicable physical data (and/or control) channel (and/or instance thereof) and/or instantiation of a protocol stack, which may include one or more of: a specific portion being centralized (e.g., PDCP and/or anything except RF); and/or another portion being closer to the edge (e.g., MAC/PHY in the TRP and/or RF) that may be separated by a fronthauling interface. The term LCG as used herein may have a different and/or broader meaning than a similar term for LTE systems.

A radio access network (RAN) slice may include (e.g. one or more, or all) radio access network functions and/or transport network functions and/or resources, e.g., radio resources and/or backhaul/fronthaul resources along with core network functions/resources that may be used and/or required to provide end-to-end services to a user. Network functions may, for example, be virtualized on a general purpose processor, run as network functions on specialized hardware and/or split between specialized hardware and general purpose hardware. A PLMN may consist of one or more network slices. A slice may be equivalent to an operator's single, common and/or general purpose network. A RAN slice may consist of one or more SOMs that may be optimized to support various services that the RAN slice may have to offer.

For example, WTRUs served within a slice may have, for example, one or more of the following aspects in common: services and/or QoE requirements (e.g. ULLRC, eMBB, MMTC); WTRU categories (e.g., CAT 0 to M and beyond, additional categories may be defined for >6 GHz to differentiate beamforming capability); coverage requirements (e.g., normal coverage, enhanced coverage); PLMN/Operators; support for specific Uu interface (e.g., LTE, LTE-Evo, 5G below 6 Ghz, 5G above 6 Ghz, Unlicensed); and/or served by same core network slice. The terms "RAN slice" and "slice" may be used interchangeably.

A Transport Channel (TrCH) may include one or more sets (e.g., a specific set) of processing steps and/or a specific set of functions applied to data information that may affect one or more transmission characteristics over a radio interface.

LTE may define one or more, or multiple types of TrCH, such as the Broadcast Channel (BCH), the Paging Channel (PCH), the Downlink Shared Channel (DL-SCH), the Multicast Channel (MCH), the Uplink Shared Channel (UL-SCH) and/or the Random Access Channel (which might not carry user plane data). Transport channels for carrying user plane data may include the DL-SCH and/or the UL-SCH for the downlink and for the uplink, respectively.

An augmented set of requirements may be supported by an air interface for a 5G system. Support may be provided for one or more, or multiple transport channels, e.g., for user and/or control plane data, for one or more WTRU devices. The term TrCH as used herein may have a different and/or broader meaning than a similar term for LTE systems. For example, a transport channel for URLLC (e.g., URLLCH), for mobile broadband (MBBCH) and/or for machine type communications (MTCCH) may be defined for downlink transmission (e.g., DL-URLLCH, DL-MBBCH and/or DL-MTCCH) and/or for uplink transmissions (e.g., UL-URLLCH, UL-MBBCH and/or UL-MTCCH).

For example, one or more, or multiple TrCH may be mapped to a different set of physical resources (e.g., PhCH) belonging to the same SOM. This may be advantageous, for example, to support simultaneous transmission of traffic with different requirements over the same SOM. An example of this may be transmitting a URLLCH along MTCCH simultaneously when a WTRU is configured with a single SOM.

A WTRU may be configured with one or more parameters associated with a characterization of how data should be transmitted. A characterization may represent constraints and/or requirements that a WTRU may be expected to meet and/or enforce. A WTRU may perform different operations and/or adjust its behavior as a function of the state associated with the data based on a characterization. Parameters may include, for example, time-related aspects (e.g., Time to Live (TTL)—for a packet, which represents the time before which the packet should be transmitted to meet, acknowledged, etc. to meet latency requirements), rate-related aspects and/or configuration related aspects (e.g., absolute priority). Parameters may (e.g., also) be changed with time while a packet and/or data may be pending for transmission.

A WTRU may be connected to TRPs, e.g., in standalone mode and/or assisted mode. A group of cells that requires assistance may be referred to as an assisted layer. A group of cells that provides the assistance may be referred to as an assistance layer.

Figure 4:
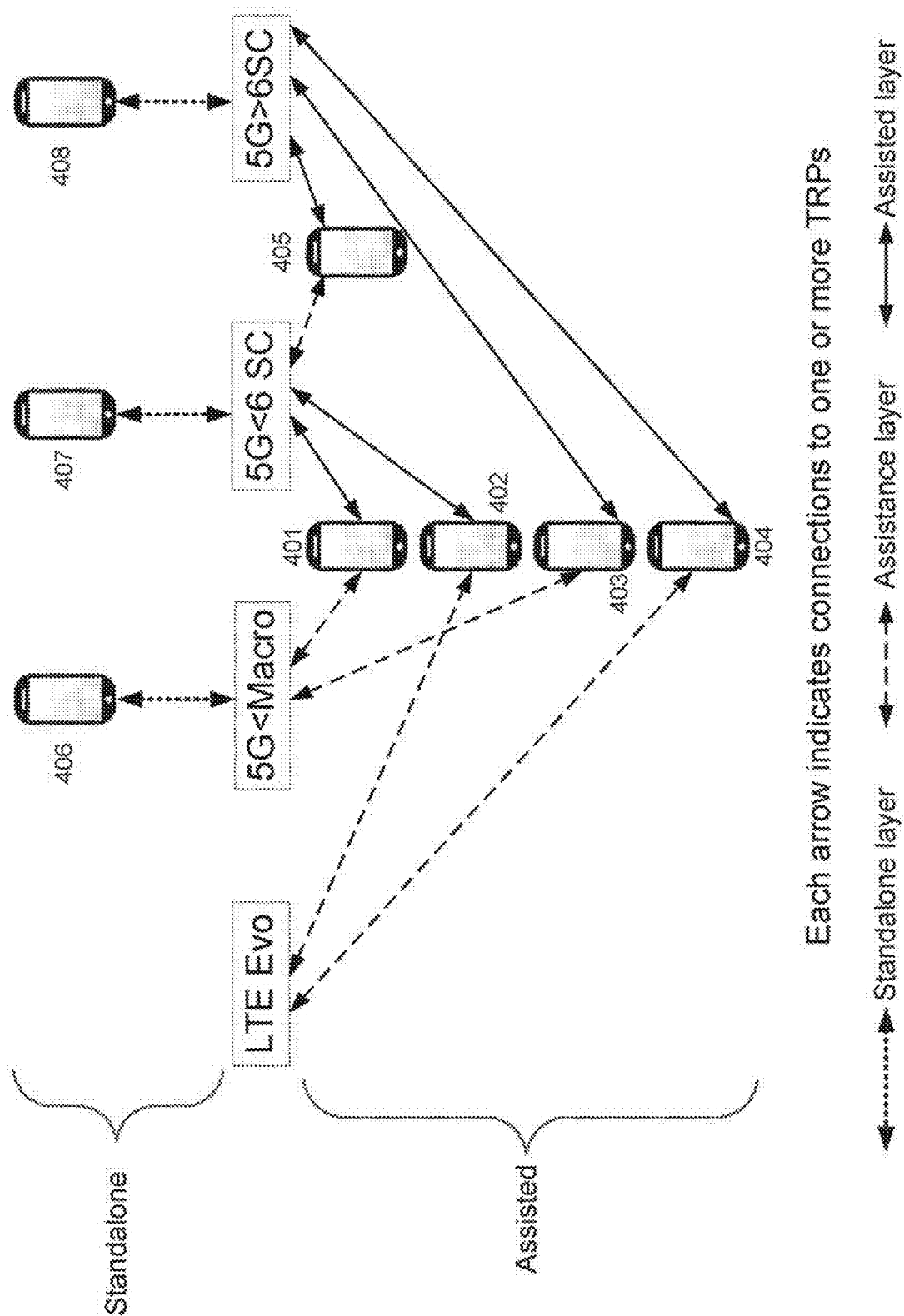
FIG. 4 is an example of types of assistance modes.

FIG. 4 is an example of different types of assistance layers, using example WTRUs 401-408. Examples of assistance modes may include, for example one or more of: a WTRU 401 connected to 5Gflex small cell in below-6 Ghz band assisted by 5Gflex macro cell in sub-6 Ghz band; a WTRU 402 connected to 5Gflex small cell in below-6 Ghz band assisted by LTE-Evo macro cell; a WTRU 403 connected to 5Gflex small cell in above-6 Ghz band assisted by 5Gflex macro cell in sub-6 Ghz band; a WTRU 404 connected to 5Gflex small cell in above-6 Ghz band assisted by LTE-Evo macro cell; a WTRU 405 connected to 5Gflex small cell in above-6 Ghz band assisted by 5Gflex small cell in below-6 Ghz band; a WTRU 407 connected to 5Gflex small cell in below-6 Ghz band in standalone mode; a WTRU 406 connected to 5Gflex macro cell in above-6 Ghz band in standalone mode and/or a WTRU 408 connected to 5Gflex small cell in above-6 Ghz band in standalone mode.

Deployment scenarios may be supported by one or more procedures described herein. For example, a deployment scenario may be LTE-assisted 5gFLEX Aggregation (DC/CA/Offload). A WTRU may be configured, for example, using an LTE Control Plane (e.g., with an LTE RRC connection) using an LTE User Plane (e.g., with one or more LTE Uu interfaces). A WTRU may be (e.g., further) configured (e.g., by reception of access table(s) from broadcast and/or dedicated signaling) to operate with one or more additional 5gFLEX Uu(s), for example, using the principles of LTE DC, LTE CA and/or LTE-WLAN offload.

An example of a deployment scenario may be LTE-assisted 5gFLEX Transport Channel(s) (LTE CP, LTE UP, LTE Uu with one or more 5gFLEX TrCH/Physical channels plugged into LTE Uu). A WTRU may be configured for LTE Uu operation (e.g., using LTE procedure(s)). A WTRU may be (e.g., further) configured with one or more physical layer (e.g. control and/or data) channels for a 5gFLEX Uu of the WTRU's configuration. Downlink (DL) physical channels may co-exist in the DL carrier and/or frequency band. An uplink (UL) carrier may (e.g., also) be common or separate. Cell-specific LTE signals/channels may be viewed as "holes" in the 5gFLEX map of physical layer resources, for example, from the perspective of a WTRU configured with one or more 5gFLEX physical channels.

An example of a deployment scenario may be LTE-based Stand-alone 5gFLEX operation (LTE CP, LTE L2 at least in part, 5gFLEX PHY). A WTRU may be configured with one or more (e.g., many, most or one or more, or all) of the components of an LTE control plane (e.g., RRC connection, security, etc.) and/or the LTE user plane (e.g., EPS RABs, PDCP, RLC). A WTRU may be (e.g., further) configured with one or more 5G MAC instance(s). An (e.g., one or more, or each) instance may have one or more 5gFLEX Uu(s). Stated somewhat differently, for example, a WTRU might not be configured with an LTE PCell.

For example, a deployment scenario may be Stand-alone 5gFLEX operation. A WTRU may be configured with a 5G control plane and/or a 5G user plane. 5gFLEX Uu operation may be supported.

WTRU states may be modeled. The terms "state" and "mode" may be used interchangeably. Aspects of this disclosure may be applicable independent of state. Some aspects may be applicable for more than one state. Some aspects described herein may be applicable whether or not such states are actually defined.

A WTRU may operate according to at least one of the following states and/or similar: idle mode, light connected/loosely connected/inactive mode, and/or connected, fully connected/active mode.

In WTRU idle mode, from the network's perspective, the WTRU might not have a context with the radio access network ("RAN"). For example, in a distributed architecture, a WTRU might not have context at the edge control function and/or the central control function. From the WTRU's perspective in idle mode, the WTRU may monitor paging from the core network (e.g., at a well-defined DRX cycle). The WTRU may perform measurements and/or autonomous mobility. The WTRU may acquire, store, and/or apply system information valid for at least idle mode operations.

In WTRU light connected/loosely connected/inactive mode, from the network's perspective, there may exist a WTRU context stored in the RAN. There may also exist a RAN-core connection for the WTRU. For example, in a distributed architecture, a WTRU may have context established at the central control function with limited and/or no context at the edge control function. The WTRU may be tracked (e.g., at a granularity of a logical area greater than or equal to a cell). The WTRU may be reached by the RAN via paging messages that originates in the RAN (e.g., at DRX cycles specific to the light connected state). From the WTRU's perspective, a WTRU might not have an active and/or established connection to the RAN. Mobility in light connected state may be WTRU controlled. A WTRU may move within a logical area without notifying the network. A WTRU may notify the network when the WTRU determines that the WTRU has moved outside a logical area (e.g., the WTRU would fail to detect the signature/reference signal and/or another property that identifies the concerned area) and/or across a boundary between two different logical areas (e.g., the WTRU would detect a different identity for the current area). Mobility in light connected state may also be network controlled (e.g., to enable handover when data transfer is allowed and/or ongoing).

In the connected/fully connected/active mode, from the network's perspective, the WTRU may have connectivity with the network (e.g., the WTRU context may be established at the radio access network, and/or WTRU specific connection may be established between RAN and core network). For example, in a distributed architecture, a WTRU may have context established at a central control function and/or one or more edge control functions. A WTRU may have at least one user plane function/component established. WTRU mobility may be tracked at the cell level and/or may be WTRU assisted, network controlled mobility. Network configured WTRU controlled mobility may be used.

The states described may represent a standalone/independent state, with transition logic in between. Some of the states may have relationships to each other. For example, some states may be functional elements of another state (e.g., where transition between sub-states might not imply significantly different RRC function and/or trigger RRC behavior). For example, a connectionless transfer may be a sub-state and/or an access method for a WTRU in idle or light connected state. In another example, the light connected state may be a RAN controlled state.

WTRU control aspects may include procedures enabling configuration and/or coherent operation for one or more of the following aspects: a plurality of radio "layers"; a plurality of radio access technologies (e.g., NR, LTE, Wifi, etc.); a plurality of L2 transport and/or user plane components, which may be realized using different network slices and/or sets of physical resources; and/or enhanced connectivity principles such as loosely connected state.

In the broadcast transmission of on-demand other-SI, the notification of presence of other-SI and/or scheduling indication of other-SI may trigger a reception procedure (e.g., unnecessary) for the WTRUs that are uninterested in the other-SI. Trigger reception procedures in uninterested WTRU's may be energy inefficient.

Although examples describe procedures, features and elements in particular combinations, the disclosed subject matter encompasses implementation of one or more, or each procedure, feature and/or element in whole or in part, individually or in any combination with and without other procedures, features and/or elements disclosed herein or known.

A transmission/reception point (TRP) may support, for example, one or more of the following access procedures: LTE/LTE-A/LTE-Evo air interface, an NR access (e.g. based on a flexible 5G air interface and/or similar), a beamformed interface for higher frequencies, a non-3GPP access (e.g. 802.11 family such as WiFi), License Assisted Access (LAA), a narrow band air interface and/or similar. TRP, eNB/NR-eNB, access point, base station and/or the like may be used interchangeably.

A WTRU may be connected in a number of different manners with a radio system. For example, a WTRU may be configured for transmission to/from one or more TRPs. One or more, or multiple transmissions may be transmitted and/or received concurrently. A WTRU may (e.g. further) be configured for transmissions that may be characterized by varying levels of diversity/reliability, mobility robustness, differentiation in terms of services, etc. Higher level services may involve, for example, the configuration of a plurality of TRPs to achieve service levels. For example, one or more TRPs may support (e.g. only) narrow band transmissions, one or more TRPs may provide best effort offload, one or more TRPs may provide less overhead (e.g. specific signatures, preconfigured bearer), etc. A WTRU may be agnostic to the identity of a TRP and/or the number of TRPs, for example, even when configured with one or more, or multiple TRPs. For example, transmissions to/from different TRPs may be differentiated, for example, based on applicable reference signals (RS), control channels, timing and/or operating carrier/frequencies.

A distributed approach may be implemented for control plane modeling. A control plane in previous generations of wireless systems (e.g. LTE) may have a suite of protocols (e.g. RRC and/or NAS) use a very centralized and/or monolithic approach, e.g., from a WTRU perspective. A centralized approach may be difficult to scale for next generation systems that may require support for and/or coordination between differentiated services (e.g. very low latency services), multi-connectivity, a larger number of small cells for a given WTRU.

Distribution of (e.g. certain) functions, for example, towards the edge of a RAN (e.g. in or close to a TRP) may provide a more scalable approach for an NR system. Furthermore, increased isolation between different user plane processing paths (e.g. similar to bearers in EPC/LTE) may facilitate differentiated QoS, management of multi-path bearers (and/or similar) as well as differentiated allocation of network resources in a system and/or (e.g. potentially) sharing of network resources between operators.

Example procedures disclosed herein may enable a WTRU to be configured with plurality of user plane functions and/or processing paths according to diverse service requirements with support for diverse device types, deployment scenarios and/or other requirements in an NR system. For example, procedures disclosed herein may enable a control plane entity to establish, maintain and/or tear down service specific user plane components as useful, e.g., using a distributed model.

A separation and protocol/functional split may be provided. A distributed control plane may be modeled, for example, to enable a number of control functions to operate close to the edge of the system. The functions may be replicated, for example, using a number of instances (e.g. in different TRPs with multi-connectivity). Some functions may be centralized (e.g. to manage core network connectivity and/or user plane instances). Consequently, there may be one or more, or multiple different termination points in the access network that concurrently provide control services for a given WTRU. A WTRU may support a multiplexing/demultiplexing function (e.g. different sets of one or more SRBs) associated with one or more (e.g. specific) control plane contexts/instances/functions and/or a set thereof. A control plane model may (e.g. also) support one or more control plane functions to operate concurrently and/or in parallel, e.g., for functions logically closer to the edge. Centralizing one or more control plane functions may enable and/or facilitate coordination between different control plane instances of the same WTRUs, e.g., coordination between different TRPs of a WTRU's configuration.

Control plane/user plane (CP/UP) separation may be modeled in a variety of different ways. There may be a variety of potential axes for separation of the different components of a control plane.

For example, vertical isolation may be provided in a protocol stack (CP and/or UP). Different options may be based on depth of separation. For example, in a partial separation and/or split approach, CP/UP specific higher layers may be followed by one or more common lower layers. For example, in a complete separation, an independent protocol stack may be provided, e.g., all the way down to L1/PHY. For example, an optimized PHY channel design and/or different DCI/grant level may be provided. A different Spectral Operating Mode/signal structure may be provided.

For example, horizontal separation may be provided between instances of a (e.g. potentially different) protocol stack. A control plane instance may operate on a user plane instance. A protocol stack may be separated, e.g., by an interface between a central unit (CU) and a remote unit (RU). Functional splits may be based on one or more of the following, for example: transport network profile (e.g. fronthaul and/or backhaul bandwidth, latency, jitter, etc.); specific deployment scenarios; type of service (e.g. eMBB services may utilize centralized processing for cost savings and/or URLLC services may utilize distributed processing to minimize latency); resource availability (e.g. processing resource, specialized hardware); vendor interoperability; and/or dynamic changes to transport network capacity (e.g. when the transport network is shared with one or more, or multiple TRPs and/or operators).

For example, physical and/or access separation may be provided. Uu termination may be provided for control and/or user plane at different nodes in the RAN (e.g. assisted layer and/or different TRP). For example, CP termination may be at LTE-Evo eNB and/or UP termination may be at NG TRP/RCU, e.g., in assisted mode. For example, an L2 transport and/or termination point for CP may be different from UP, e.g., in standalone mode. For example, an L2 transport and/or termination point for CP may be any TRP while for UP it may be using a restricted set of TRPs, e.g., in standalone mode.

Modeling described herein may support any of the foregoing separation models and/or other models, alone or in combination. For example, modeling may facilitate having a control plane component and its associated user plane in different RAN slices. Slices may be realized, for example, by physical and/or vertical separation. For example, a multi-plane architecture may support a combination of horizontal separation and/or vertical isolation.

Examples of elements and/or characteristics may be provided for a distributed control plane architecture.

A high level generalization (e.g. a conceptual view) of a control plane may be as a set of one or more control function(s). A control function may include processing actions and/or related parameters. Examples of control functions are described herein. A control function may apply to one or more component(s) of a WTRU.

Components may include, for example, a protocol (e.g. NAS, RRC, PDCP, RLC, MAC, PHY, etc.) and/or a corresponding entity, an implementation aspect (e.g. a power control function, a state of a WTRU, etc.), a set of resources (e.g. a data transport path, a bearer, etc.) and/or a combination thereof (e.g. a set of physical/processing resources, a slice, etc.). Examples of component combinations are described herein.

A control functions may be characterized as being applicable, for example, according to one or more of the following: a WTRU-specific function; a component-specific function; and/or a plural-component function.

A WTRU-specific function, for example, such as a control function may be applicable to any aspect(s) and/or component(s) of a WTRU. For example, a function that controls a WTRU's connectivity to a core network (e.g. in terms of access credentials) may be WTRU-specific. A function may (e.g. from a network perspective) be centralized in a node that supports connectivity to a plurality of TRPs/NR-eNBs. For example, a function may be logically part of a RAN Central Control Function (RCCF), e.g., described below.

A component-specific function, for example, such as a control function may be applicable to one or more aspects of a WTRU. An aspect may be, for example: a MAC instance; a signature-specific aspect (e.g. a configuration corresponding to a signature); a TRP-specific aspect (e.g. a configuration corresponding to a TRP; a TRPG-specific aspect (e.g. a configuration corresponding to a TRPG); an LCH (and/or equivalent)-specific aspect (e.g. a configuration corresponding to an LCH); an instance of a component combination (e.g. a bearer, a flow such as a sequence of packets identified by a matching rule (e.g. a tuple, etc.), for example, as described herein; a slice specific aspect (e.g. a configuration) corresponding to a RAN slice and/or a core network slice and/or to an end-to-end network slice (e.g. a core network slice, a slice selection function and/or one or more RAN functions); a spectral operating mode (e.g. a configuration) corresponding to a spectral operating mode, and/or other examples. For example, a WTRU may apply a received configuration to a specific time/frequency resource while using a different configuration for other time/frequency resources in the system.

For example, a function may be logically part of an Access Control Function (ACF), e.g., for a function dedicated to connectivity to a single TRP/NR-eNB, which may include configuration for a MAC instance and/or physical layer parameters (e.g. single or multiple cells/carriers) for a given WTRU.

In a plural-component function, for example a control function may be applicable to a plurality of components of a WTRU. For example, a function may be logically part of an Access Control Function (ACF) for a function that may control connectivity for a TRPG and/or for one or more NR-eNB(s), which may include configuration for a single MAC instance (e.g. COMP) and/or for one or more, or multiple MAC instances (e.g. for multi-connectivity) and/or (e.g. required) physical layer parameters for a given WTRU. This may, for example, further include coordination and/or configuration aspects for a WTRU to handle, e.g., with reception of one or more, or multiple responses to a random access within a TRPG, if applicable, for single TRP selection and/or for multiple TRP selection (e.g. for aggregation and/or multiple connectivity).

Examples may be provided for some (e.g. most) applicable control plane functions, e.g., individually. A function may be described with reference to its applicability to these non-limiting characterizations.

High-level modeling of a control plane for NR may be provided. Functions and/or components may, for example, be logically grouped.

A multi-plane architecture may be provided. For example, functions and/or components supporting an NR system may be logically grouped, for example, in terms of an Access Plane (AP), a Central Control Plane (CCP) and/or a Central User Plane (CUP). A description of example realizations of user plane components is described herein.

Logical grouping of functions may enable different components and/or functions of a system to be isolated from each other. Isolation may (e.g. further) enable components and/or functions to be controlled, configured, modified and/or operated separately from each other. Separation may be applied for components and/or functions associated with a specific WTRU, per TRP/NR-eNB, per TRPG, per TRPGs, per group of NR-eNBs, per LCH (and/or equivalent), per slice, etc. Separation between centralized and access-related grouping may enable coordination between different instances of a function (e.g. system information provisioning, bearer configuration and/or equivalent) and/or between different instances of different functions (e.g. core network connectivity and/or user plane/bearer instances).

Figure 5:
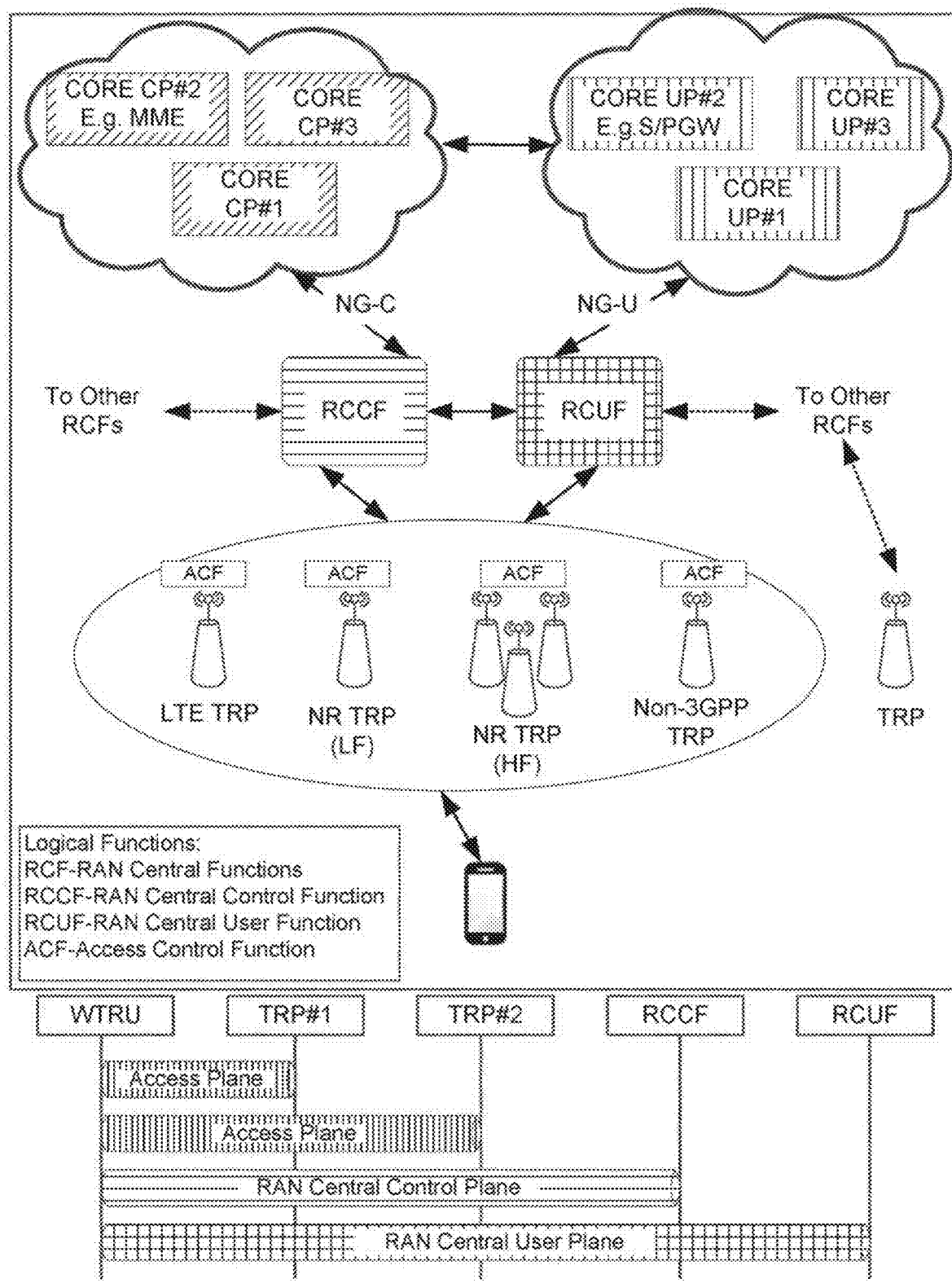
FIG. 5 is an example of tri-plane architecture.

FIG. 5 is an example of logical grouping. There may be an architectural aspect and/or approach to a functional split. For example, FIG. 5 shows an example of a tri-plane architecture.

Different principles for a functional split between an access control plane and a central control plane may be considered.

For example, there may be a single access plane per RAT and/or central control per one or more, or multiple RATs. For example, an access control plane may include control functions specific to the access technology (e.g. beamforming control function, control function specific to LTE, non-3GPP control function, etc.). A central control plane may include control functions that are agonistic to an air interface. A common central control plane may be associated with one or more, or multiple TRPs with diverse access technologies, for example, for LTE/LTE-A/LTE-Evo air interface, a flexible 5G air interface, a beamformed air interface for higher frequencies, a non-3GPP access (e.g. 802.11 family such as WiFi), License assisted access (LAA), a narrow band air interface, etc.

For example, there may be one access plane per TRP/cell and/or central control per one or more, or multiple TRPs. For example, an access control plane may include control functions specific to a TRP/cell. A central control plane may include control functions applicable to more than one TRP. This approach may simplify inter-TRP coordination for efficient radio resource management, RAN mobility management and/or self-organizing functions, etc. A central control plane may (e.g. in one or more cases) lead to cost effective deployments, for example, as it might not require additional interface between TRPs.

For example, an access control plane may be responsible for establishment, maintenance and/or release of a layer 1/layer 2 (L1/2) connection, allocation of a temporary identifier to identify a WTRU uniquely within a TRP, common and/or dedicated L1 and/or L2 resource configuration specific to a TRP, etc. A central control plane may be responsible for configuring L3 signaling flows and/or abstraction thereof (e.g. signaling radio bearers), configuration of higher layer data flows and/or abstraction thereof (e.g. data radio bearers), security functions (e.g. may include key management), radio resource configuration (e.g. may be common across two or more TRPs), mobility functions (e.g. may include WTRU measurement control), handover control, context transfer, paging, etc.

QoS management functions may be controlled by a central control plane and/or may be enforced by an access control plane. QoS management functions may be part of a user plane control function, if applicable.

A system information broadcast function may be shared between an access control plane and a central control plane. For example, an access control plane may be responsible for scheduling and/or transmission of TRP specific system information related to accessibility, physical channel configuration, SC-PTM configuration, etc. An access control plane may be responsible for transmission of MIB and/or for handling dedicated system information procedure.

A central control plane may, for example, determine the contents of system information for cell (re)-selection information, intra-frequency, inter-frequency and/or inter-RAT neighbor information, MBMS information, side link information etc. Common and/or shared channel related configuration may be coordinated between the access control plane and central control plane. For example, a configuration for layer 2 RAN functions located in TRPs may be configured and/or controlled by the access control plane (e.g. for MAC, physical layer) while layer 2 RAN functions placed in the central user plane entity may be configured and/or controlled by the central control plane (e.g. for PDCP, RLC, bearers and/or similar and/or access table for a TRPG, if applicable).

A service/QoS-based functional location may be provided for a function in an access plane and/or a control plane. For example, control functions that may be time sensitive with a strict deadline may be placed in TRPs while other control functions may be placed in the central control plane. This approach may relax latency requirements on the fronthaul interface between the central unit and the TRPs and/or may enable cost efficient deployments.

Another example of a functional split may be applied, for example, when RAN level slicing is supported. For example, control functions that are common across two or more slices may be placed in the central control plane while control functions that are specific to a slice may be placed in the access control plane. In this approach, mobility control, WTRU context handling, etc. may be a part of a central control plane while the access control plane may include slice specific system information broadcast, slice specific authentication and/or security management, and/or slice specific QoS enforcement, etc.

A WTRU may be able to determine how to exchange signaling with different endpoints and/or with specific instances of a function, for example, based on these modeling examples. Such may be realized using different multiplexing procedures such as those described herein.

Access control functions (e.g. from the perspective of an overall RAN architecture) may be (e.g. conceptually) defined as set of logical functions, parameters and/or procedures that enable a WTRU to be uniquely addressed and/or identified by one or more TRPs. A WTRU may (e.g. further) generate and/or exchange data and/or signaling with those TRPs. Access control functions may provide distributed/edge control and/or user plane functions that may be specific to a TRP and WTRU pair. An (e.g. one or more, or each) access control function may be associated with a scheduler instance controlling one or more TRPs (e.g. over ideal backhaul). Such function may be part of a radio resource control protocol (e.g. RRC). Such function may be performed by a RRC entity e.g. located in a TRP. A WTRU may (e.g. from the WTRU perspective) be configured to associate a specific signaling bearer and/or equivalent (e.g. a transport path/procedure) for control of a MAC entity with the concerned MAC entity. The function may be part of a Medium Access Control (e.g. MAC) protocol. This function may be performed by a MAC entity. The Access Plane function may use transport services of MAC protocols (e.g. as MAC Control Elements, as MAC Control PDUs, and/or similar), for example, when the MAC entity perform the functions associated to the Access Plane.

An access plane may be considered to be established, for example, when a WTRU may be uniquely identified by access control functions. An access plane may be established, for example, when a WTRU can start transmission of user plane data. An access plane may be established, for example, when a WTRU receives a response that configures a capability for the WTRU to start performing (receiving and/or transmitting) dedicated transmissions, which may include when security is activated (if applicable) for the concerned configuration.

High level scoping of an access plane may be performed. For example, a WTRU may be configured to access resources associated with one or more radio access network nodes (e.g. TRP(s), TRPG(s) and/or NR-eNB(s)) using one or more of a set of functions, parameters and/or procedures.

For example, such procedures may include capabilities for a WTRU to perform an initial access (e.g. to establish access plane connectivity), perform a random access procedure and/or similar, for example, to obtain uplink timing alignment and/or further resources for uplink transmission, to select a suitable network node (e.g. based on measurements of downlink signals and/or based on reception of one or more responses to the initial request such as one or more RARs), to obtain a unique identifier (e.g. a dedicated RNTI), to obtain a configuration (e.g. for physical layer operation), to enable transmission of control signaling (e.g. a signaling radio bearer and/or equivalent) and/or to establish a Uu interface and/or equivalent with a corresponding network node.

An access plane may terminate a control signaling protocol. An access plane may be provided for component-specific applicability. For example, an access plane may control aspects related to (e.g. at most) an (e.g. one) access network node. For example, an access plane may provide services for control and/or configuration of a physical layer and/or configuration of a MAC instance associated with a (e.g. one) TRP/NR-eNB. Coordination between one or more, or multiple access nodes might not be assumed and/or useful, for example, in this case.

An access plane may be provided for plural-component applicability. For example, an access plane may control aspects related to one or more access nodes. For example, an access plane may provide services for control and/or configuration for a physical layer for one or more cells and/or configuration of a MAC instance, where (e.g. potentially) one or more, or each may be associated with applicable TRPs/NR-eNBs. For example, an access plane may support coordination of one or more aspects between different network nodes. Coordination may be per TRPG, per area, per signature and/or per set of access parameters. Coordination may be provided, for example, using a (e.g. single) MAC entity (e.g. with a coordinated scheduling function such as carrier aggregation-like assuming ideal interfaces) and/or by a control function that may interface with a WTRU for the configuration of one or more, or multiple MAC instances, e.g., when applicable (e.g. a multi-connectivity approach).

A central control plane (e.g. a RAN control plane) may be provided. RAN Central Control Functions (RCCF) may include control functions, protocols and/or context that may be WTRU specific and/or applicable to one or more TRPs/ACFs. A central control plane may be considered as an anchor control function that may terminate a control interface towards the core network (e.g. through configuration/setup of routing paths and transport paths, for example, based on tuples configured for a WTRU). An RCCF may (e.g. additionally) include control functions related to selection of a core network slice, CN-RAN interfaces, QoS management, security (e.g. master key management and/or key derivation, which may be per group of TRPs/NR-eNBs), WTRU capability management and/or WTRU reachability within RAN.

WTRU context may be setup at RCCF (e.g. after CORE/NAS interaction). From RCCF point of view: a WTRU (e.g. from RCCF perspective) may have a known TRP(G) granularity (e.g. when access plane is active).

Central User Plane control functions may be (e.g. conceptually) defined as set of logical functions, parameters and/or procedures that may enable a WTRU to transfer user plane data with a network. Functions may be applicable to one of more user plane components (e.g. bearers, L2 transport path, flow-based routing entry, slice instance managing such, etc.). One or more functions may be part of the set of central control plane functions and/or may be logically separated therefrom.

Signaling may be generated and/or exchanged with one or more TRPs that may be part of a concerned user plane component. Central user plane functions may provide control for aspects that may be specific to a service, a slice, a bearer and/or a set of processing steps configured for the transport of one or more (e.g. specific) flows, which may be determined by configured tuples. A (e.g. one or more, or each) control function may be associated with a scheduler instance controlling one or more TRPs (e.g. over ideal backhaul). A WTRU (e.g. from its own perspective) may be configured to associate a specific central user plane instance with a signaling bearer and/or equivalent (e.g. a transport path/procedure) for control of a user plane component with one (e.g. single path/Uu) or more (e.g. multi-path/Uu) applicable MAC entities. A function may use transport services of corresponding MAC protocols, for example, as MAC Control Elements and/or similar.

An efficient data path may be setup between a TRP and a RAN Central User Function (RCUF) and/or between different RCUFs, e.g., when applicable. Connection oriented and/or connection-less user plane (e.g. WTRU assisted packet-based routing) may be supported.

RAN central user plane functions may comprise, for example, functions, protocols and/or parameters that may be service and/or data traffic specific.

There may be interactions between different control functions and components. A timing relation between access plane establishment and central control plane establishment may, for example, depend on a WTRU state. For example, a WTRU in a passive or IDLE state may transition to connected state by (e.g. first) establishing an access plane, e.g., using control signaling interaction with one or more access control functions (ACFs). For example, an access plane may be established as a result of an association procedure between a WTRU and a network. A WTRU may (e.g. then) trigger central control plane establishment, for example, using control signaling interaction with one or more central control functions. For example, a WTRU may establish a central control plane (e.g. only) and/or may establish a central control plane and a central user plane, for example, based on whether the WTRU has signaling traffic and/or data traffic. In an (e.g. another) example, a WTRU may (e.g. directly) transmit data without access plane establishment, for example, when the WTRU (e.g. in a loosely connected state) may have a central control context without an access plane established.

A WTRU may store a Central control plane context, for example, even after an access plane may be deactivated. Central control functions may (e.g. similarly) retain a WTRU context, for example, even after the access control functions release WTRU context and/or WTRU specific connectivity between access control functions and central control functions. Central control functions may (e.g. additionally) retain WTRU context, for example, even after central user functions release WTRU context and/or WTRU specific connectivity between central user plane functions and core network user plane functions. In other words, for example, a RAN control plane (e.g. SRBs) may exist without an active user plane (e.g. DRBs). For example, a WTRU may attach to a network without a corresponding data bearer establishment. A WTRU may (e.g. be required to) maintain central user plane context, for example, (e.g. only) when the central control plane context is active.

An access plane may be dynamically activated/deactivated, e.g., by access control functions and/or by central control functions, for example, when a control plane context is active.

WTRU connectivity may have one or more supported states. For example, a WTRU may operate according to one or more of the following states: idle mode; idle mode with connectionless transfers; and/or connected mode and/or loosely connected mode.

In an IDLE mode, for example, a WTRU might not have established connectivity with a network (e.g. a WTRU might not have ACF/ACP, RCCF/RCCP and/or RCUF/RCUP established).

In an IDLE mode with Connectionless Transfers, for example, a WTRU may have some connectivity with a network (e.g. it may have at least one ACF/ACP established with at least one user plane component, e.g., with a default configuration, e.g., for routing and/or security). A WTRU may have RCCF/RCCP established (e.g. a security context, access tables).

In a connected mode, for example, a WTRU may have complete connectivity with a network (e.g. it may have at least one ACF/ACP, RCCF/RCCP and/or RCUF/RCUP (e.g. when applicable) established with at least one user plane component).

In a loosely connected mode, for example, a WTRU may have some connectivity with a network (e.g. it may have at least one RCCF/RCCP established, e.g., a security context, access tables).

Connectionless data transfer may be provided. A WTRU may establish an L3/RRC connection to transmit data PDUs irrespective of the size of the data packet. Establishing a connection may be difficult relative to one or more of: overheads associated with signaling to establish a connection at the RAN and/or Core network before the start of a small packet transfer; overhead associated with tearing down a connection after periods of inactivity; and/or WTRU battery drain to stay in connected mode for extended periods of time.

A WTRU may (e.g. directly) perform connectionless data transfer in a loosely connected state, for example, using a pre-existing context with a central control plane function. A pre-existing context may include (e.g. at least) a security context, WTRU subscription and/or WTRU capability configuration. A WTRU may (e.g. also) perform connectionless data transfer from an idle connectionless state, e.g., using a pre-existing context with the core network control function.

A WTRU may (e.g. in this example) not have a RAN central context established. For example, a WTRU may be associated with (e.g. only) a default slice and/or a core network control function and may still transmit connectionless data. A WTRU may (e.g. in this example) include additional session information with a data PDU.

Connectionless data transfer may allow a WTRU to transmit data, for example, with one or more following characteristics/properties: without requiring access plane establishment; using modified msg1 (e.g. modified RACH preamble+data, multi-user non-orthogonal data channel, etc.); without receiving an explicit grant (e.g. contention based UL shared data channel); after UL synch (e.g. using piggybacked data with and/or as msg3); before UL synch to the network (e.g. using asynchronous access channel); and/or transmitting additional context information associated with the data PDU.

A WTRU may use a simplified security procedure that may, for example, involve one or more of: using stored context, which may be result of previous network interaction and/or hard coded security context in SIM; and/or explicit indication of security algorithm used.

A connectionless data transfer mode may allow a WTRU to transmit data PDUs earlier than connection oriented data transmission. Such data PDUs may be referred to as early data PDUs.

For example, a connectionless data transfer mode may (e.g. also) be used for downlink transmissions. For example, a WTRU may receive data PDUs in the same TTI with a paging message and/or along with the paging message itself. A network may trigger such connectionless downlink transfer, for example, when a WTRU location is known at a fine granularity and/or the size of the data packet is small.

A WTRU may trigger connectionless data transfer, for example, based on one or more of the following criteria: a service (e.g. low overhead service and/or a low latency service, etc.); a size of a packet (e.g. when the size of the packet is less than a predefined number of bytes); WTRU buffer occupancy (e.g. when a WTRU buffer size is less than a predefined number of bytes); latency experienced by the packet (e.g. when the packet exceeds latency budget); packet filtering (e.g. WTRU may be configured with a packet filter/TFT to identify packets matching specific criteria, such as IP address, protocol, port number, type of service, flow label and/or a preconfigured session ID); absence of valid/configured logical connection (e.g. EPS bearer/Radio bearer); type of PDUs (e.g. initial signaling messages may use connectionless); WTRU mobility state (e.g. when WTRU speed and/or number of reselections/HO per second exceeds a threshold, which may be used to limit the number of handovers for medium/fast moving WTRU); a WTRU category; and/or an access class.

For example, a WTRU may (e.g. always) trigger a connectionless transfer, e.g., by default and/or as configured by an access table. A WTRU may (e.g. subsequently) transition to connection oriented transfer, for example, based on WTRU and/or network procedures described herein.

A WTRU may determine L1 and/or L2 configuration for connectionless transfer, for example, using one or more of the following procedures: a WTRU may apply a default configuration; a WTRU may apply a predefined configuration acquired via system broadcast (e.g. access table and/or system signature based) that may be specific to a access control function, to a central control function and/or to a TRP or a group of TRPs; a WTRU may apply a stored configuration (e.g. received upon establishing central control plane context) that may be dedicated for a WTRU or a group of WTRUs where the same configuration may be used across one or more, or multiple TRPs; and/or a WTRU may (e.g. explicitly) request connectionless transfer and/or may obtain specific configuration that may include transmission resources (e.g. contention based/non-orthogonal resources, layer2 configuration, etc.).

A layer 2 configuration may (e.g. in addition to a physical layer time/frequency resource configuration) include a max data rate restriction, bucket size, RLC mode, PDPC discard timer, security algorithm, etc. For example, specific MAC instances may be configured for connectionless transfer.

One or more connectionless configuration parameters may be associated with a validity timer. A WTRU may start a validity timer, for example, upon receiving configuration parameters. A WTRU may consider configurations, for example, (e.g. only) when the timer is running. A WTRU may delete/release configurations, for example, upon the expiration of a validity timer.

A WTRU may include additional context information with a data PDU, for example, to assist a network with processing and/or routing a data packet to an appropriate destination. Additional context information may be included, for example, in a layer 3 message and/or as a part of a layer 2 header field. For example, a layer3 message type may be defined to identify connectionless data. An IE (e.g. connectionless-data-IE) may be introduced in a layer 3 message (e.g. UL information transfer).

A WTRU may include one or more types of information as context information in an early data PDU.

For example, context information may comprise WTRU Identity information, which may comprise, for example, one or more of the following: an L3 identity that may have been allocated by a central control function during a previous interaction; an associated Identity of the central control function and/or an NAS level identity; an implicit indication of a portion of and/or a whole identity, e.g., using the selection of time/frequency resource; and/or a demodulation reference signal and/or unique word that may be a function of WTRU ID.

For example, context information may comprise a more data left indication and/or last PDU indication, which may indicate whether there are additional PDUs in WTRU buffer along with the early data PDU.

For example, context information may comprise one or more of: QoS related information, e.g., an indication to treat the early data PDU as a default QoS and/or as a non-default bearer data PDU; a low latency indicator, e.g., to allow a network to use low latency and/or an efficient data path; and/or a low overhead indicator, e.g., to allow a network to use a low overhead mechanism for transfer (e.g. a connectionless transport).

For example, context information may comprise application description and/or session related information, such as a predefined session ID, e.g., so a network knows which session a data PDU is associated with.

For example, context information may comprise forwarding/routing/transport layer information (e.g. a general packet radio service tunneling protocol (GTP) tunnel and/or a flow table entry and/or an index to flow table entry.

For example, context information may comprise security context information.

For example, context information may comprise destination ID, such as a control plane ID and/or a user plane entity ID, e.g., perhaps depending whether a PDU is a signaling PDU or data PDU.

For example, context information may comprise user plane entity ID (e.g. when one already exists to avoid signaling towards RAN control plane entity), for example, for a RAN and/or Core user plane entity.

For example, context information may comprise control plane entity ID (e.g. entity with a valid WTRU context including subscription, security, etc.), for example, for a RAN Control entity and/or a core (e.g. MME ID+WTRU ID within the MME service area).

For example, context information may comprise slice identity, e.g., when a WTRU is already configured with a specific slice for connectionless transfer.

A WTRU may receive and/or may process feedback for a connectionless data transfer, where processing may be different from a connection oriented data transfer. A WTRU may (e.g. implicitly) determine the resources for feedback, for example, as a function of UL time/frequency resources used for early data PDU transmission and/or as a function of WTRU ID included in the data PDU.

Feedback (e.g. for data transmitted using connectionless/early data transfer based mode) may be associated with additional information, including, one or more types of additional information.

For example, additional information may comprise a WTRU ID for which feedback is sent (e.g., copied from UL Data PDU), e.g., where WTRU may verify the WTRU ID present in the feedback before processing the feedback message.

For example, additional information may comprise a timing advance (e.g. for async/contention based UL).

For example, additional information may comprise a power control command.

For example, additional information may comprise an ACK/NACK, e.g., where additional resources may be granted for retransmission for NACK.

For example, additional information may comprise a collision/contention indication, e.g., when WTRU action is based on a contention indicator, such as one or more of: when WTRUs can be distinguished at eNB (e.g., by orthogonal DMRS) and/or when WTRU receives other WTRU IDs in the feedback, a WTRU may transmit at next opportunity; and/or when WTRU receives a contention indication, the WTRU may perform, for example, a random back off and/or fallback to connection based data transfer.

For example, additional information may comprise an indication to trigger access plane establishment and/or fallback to connection oriented mode.

For example, additional information may comprise additional UL resource grants and/or an Indication to go back to idle mode (and/or implicitly an ACK may be used to go back to idle mode), for example, depending on last PDU indication.

For example, additional information may comprise a request for WTRU identity and/or additional authentication procedure, e.g., when WTRU context might not be fetched and/or when WTRU may be unknown at the RCCF and/or the security check failure, etc., where a WTRU may respond to the authentication procedure and/or provide additional context information.

A WTRU may (e.g., in connectionless transfer mode) trigger a transition to connected oriented mode, for example, based on one or more of the following criteria and/or events: when a WTRU spends more than a predefined time in connectionless mode; when a WTRU receives a data packet with more than predefined number of bytes; when a WTRU transmits more than a predefined number of bytes in connectionless mode; when a WTRU buffer size exceeds a threshold; when a latency of buffered data exceeds a threshold; when a number of NACKs/retransmissions for an early data PDU exceeds a threshold; when a data rate over a predefined time window exceeds threshold; and/or when an activity timer exceeds a threshold, e.g., when an activity timer that may be (e.g. always) running when a WTRU enters connectionless transfer mode, where the activity timer may be reset to zero and started again, perhaps for example when the time between two consecutive packets exceeds a threshold.

For example, a WTRU may be configured to report one or more events. A network may determine whether to transition the WTRU to connection oriented mode. A WTRU may events, for example, using a control message and/or signal and/or piggyback indication in a connectionless data PDU. A network may (e.g., also) trigger a transition to connection oriented mode, for example, based on policies, type of services, WTRU subscription, WTRU mobility, etc. For example, a WTRU may transition from connection oriented mode to connectionless mode, for example, based on a network command (e.g., based on inactivity).

A user plane component may be (e.g., conceptually) represented as a transport path. A transport path may include, for example, one or more of the following: one or more Uu (which may be associated with a specific SOM and/or physical layer QoS) and/or a configuration thereof; a QoS profile (e.g., in terms of maximum latency, jitter, packet loss rate and/or the likes) and/or a configuration thereof; an association with one or more data flows and/or service (e.g., as indicated by a multiplexing function that may be based on logical radio bearer, tuples and/or a configuration thereof); routing table entries (e.g., in the network); a list and/or set of one or more matching rules; and/or a list and/or set of one or more tuples (e.g., to determine what logical path a packet may be directed to).

A distributed control plane for NR may have functions and/or components, which may be discussed from the perspective of their different applicability.

For example, a WTRU-specific function may be associated with an anchor control function. An RCCF may manage connectivity of a WTRU with a core network (e.g., PDN connectivity, reachability, etc.).

For example, a component-specific function may operate on one or more aspects of a single instance of a component for a given WTRU.

For example, a plural-component function may operate on one or more aspects of one or more, or multiple instances of a component for a given WTRU.

For example, control functions may be associated with MAC instances that may (e.g. also) map to a set of access control functions.

For example, control functions may be associated with a single MAC instance.

System information may be acquired, for example, as a WTRU-specific function, as a component-specific function and/or as a plural-component function.

A component of System information acquired as a WTRU-specific function, for example may include, a cell, TRP, and/or TRPG and/or groups thereof (e.g. everything a WTRU may find useful). On-Demand procedures, including requests and/or combination with already known SysInfo (pre-provisioning and/or acquired) may be described. SysInfo split may be supported. Out-of-band SysInfo may be supported.

A component of system information acquired as a Component-specific function may be, for example, a cell and/or a TRP. SysInfo split may be supported. Out-of-band SysInfo may be supported.

A component of system information acquired as a Plural-component function may be, for example, one or more, or multiple cells, one or more, or multiple TRPs, one or more, or multiple TRPGs, and/or one or more, or multiple NR-eNBs, etc. SysInfo split may be supported. Out-of-band SysInfo may be supported.

System information may be acquired, for example, using one or more approaches and/or procedures.

For example, system information may be acquired by broadcast, e.g., similar to LTE.

For example, system information may be acquired by splitting information in a first set of information and in a second set of information. Such information may comprise one or more system parameters. Such split of information may be based on one or more characteristics of the concerned information. Such characteristic may include whether or not the information is essential for accessing the concerned network resources, whether or not the information relates to a feature and/or function available using the concerned network resources, whether or not the information relates to a feature and/or function for low-latency access (e.g. URLLC), whether or not the information may enable specific UE procedures such as camping, measurements, and/or the like. Such first set may be further referred to as "Essential" information and/or such second set may be further referred to as "Non-essential" information. In some solutions, "Essential" information may be referred as Minimum-SI and/or "Non-essential" information may be referred as Other-SI. Such split may be network-controlled and/or vary from one area to another, where essential system information (if any) may be broadcast (e.g. to enable a WTRU to access the system and/or obtain further system information through dedicated resources. Broadcast information may comprise MIB, SIB1 (access-related information e.g. PLMN, TAC, CellID, p-Max, frequency band indicator), SIB2 (access barring information, RACH parameters, UL power control). The amount of broadcasted system information may vary (e.g., depending on the split between "Essential" and "Non-essential" information). For example, the amount of system information included in the broadcast may be one or more of the following: no broadcasted system information (e.g., pre-provisioning, acquired, and/or on-demand); MIB; MIB+SIB1; MIB+SIB1+SIB2; (v) MIB+SIB1+SIB2+combination of remaining SIBs (e.g., SIB3 may be broadcasted to support cell reselection, etc.); and/or other combinations of "Essential" and "Non-essential" information. In some examples, there may be no "Essential" system information broadcasts. On-demand (dedicated) information may comprise obtaining remaining system information through dedicated resources (e.g. triggered through PRACH), where, on-demand acquisition may be based on a service (e.g. camping/paging etc.), WTRU capability, slice, etc.

For example, system information may be acquired by splitting information across broadcast and dedicated transmissions. A split may be network-controlled and/or may vary from one area to another. A flexible mechanism may be provided to support variable split between broadcast and dedicated information.

For example, system information may be acquired by system information modification, which may provide one or more mechanisms, for example: to update the delta, whether pushed and/or on-demand (e.g. WTRU-initiated and/or NW-initiated by control signaling ordering WTRU to start the procedure); and/or to request a specific element of system information (e.g. SIB).

For example, system information may be acquired by variable acquisition, for example, based on location and/or frequency band (e.g. system information applicable in one location and/or for one carrier may be received in different locations and/or carrier).

Broadcast information may include specific information components related to specific services, such as a configuration for low latency access and/or for connectionless data transfers.

Essential information may be broadcast. Essential information may include, for example, MIB, SIB1 (access-related information e.g. PLMN, TAC, CellID, p-Max, frequency band indicator), SIB2 (access barring information, RACH parameters, UL power control). A WTRU may acquire broadcast system information and/or may request further system information, e.g., using an on-demand procedure.

More information (e.g. beyond essential information) may be broadcast, for example, based on capacity/load. For example, more system information may be broadcast, for example, perhaps when the system has the capacity and broadcast capacity is limited. A WTRU may acquire broadcast system information and/or may request further system information, e.g., using an on-demand procedure.

System information may be modified (e.g. changed and/or updated). For example, system information modification may be triggered by paging for WTRUs in RRC_IDLE and/or WTRUs in RRC_CONNECTED. A WTRU (e.g. when WTRU receives notification of system information modification) may identify a delta and/or may acquire modified/new system information, for example, by one or more procedures, such as broadcast (e.g. when a delta is broadcast) and/or on-demand (e.g. when a delta is not broadcast).

Variable acquisition may be based on location and/or frequency band. For example, deployment scenario may include macro and/or micro, wherein system information (e.g. for the macro and/or micro) may be broadcast over the macro. A WTRU may (e.g. when not in coverage of a macro) acquire system information from a micro.

System information may be variable portioned. Essential system information (if any) may be broadcast, for example, to enable a WTRU to access the system. A WTRU may acquire further system information through dedicated resources.

For example, more than essential system information (if any) may be broadcast, for example, when the system has significant excess capacity, when many WTRUs are acquiring system information and/or when a use arises to broadcast new system information that is essential for system access. It may be beneficial to support acquisition procedures allowing a variable/dynamic split between broadcast and on-demand information acquisition.

System information may be grouped and/or may be controlled, for example, by different logical functions, e.g., based on periodicity, latency, feature, etc.

In one or more groupings, a default set may comprise, for example, information that may be essential for system access, camping, mobility, etc. Essential information may comprise, for example, common and shared channel information (e.g., similar to MIB, SIB1, SIB2 in LTE). Essential information may comprise, for example, cell selection/reselection information (e.g. similar to SIB3, SIB4, SIB5(E-UTRA), SIB6(UTRA), SIB7(GERAN), SIB8(CDMA2000) in LTE).

In one or more groupings, a common set may comprise, for example, information that may be required by most devices, such as one or more of the following: HNB name (e.g. similar to SIB9 in LTE); ETWS (Earthquake and Tsunami Warning System) primary notification (e.g. similar to SIB10 in LTE); ETWS secondary notification (e.g. similar to SIB11 in LTE); and/or Commercial Mobile Alert System (CMAS) warning notification (e.g. similar to SIB12 in LTE).

In one or more groupings, a feature set may comprise, for example, information that may be required for particular features/device categories, such as one or more of the following: MBMS (e.g. similar to SIB13 in LTE); extended access barring for access control (e.g. similar to SIB14 in LTE); mobility procedures for MBMS reception (e.g. similar to SIB15 in LTE); GPS time and UTC time (e.g. similar to SIB16 in LTE); for traffic steering between E-UTRAN and/or WLAN (e.g. similar to SIB17 in LTE); sidelink communication (e.g. similar to SIB18 in LTE); sidelink discovery (e.g. similar to SIB19 in LTE); and/or SC-PTM e.g. similar to SIB20 in LTE.

For example, a WTRU may receive System Information (SI) applicable to a cell/TRP (and/or similar) and/or to a plurality thereof. A WTRU may receive SI, for example, by broadcast transmissions and/or by dedicated transmissions. For example, a WTRU may receive SI applicable to a cell/TRP on a transmission, for example, using resources associated with a different cell/TRP. SI applicable to a cell/TRP may include a (e.g. first) portion that may correspond to a (e.g. first) set of functions (e.g. access parameters, location tracking, WTRU-autonomous mobility related parameters, signature detection/measurement) and/or a (e.g. second) portion that may correspond to a (e.g. second) set of functions (e.g. supported features, supported services, etc.). The set of functions included in a (e.g. one or more, or each) portion may be a configuration aspect of the system and/or may be explicitly indicated in the corresponding transmission. Additional information may be included, for example, to indicate whether there is further SI (e.g. a second portion) applicable and/or the identity/type of further available SI (e.g. a bitmap representing the different SIBs). Additional information may, for example, include an indication whether a WTRU is required to acquire remaining information (e.g. one or more, or all remaining SIBs) and/or a subset thereof (e.g. SIB-based indication), which may be accompanied by an indication of an applicable procedure (e.g. DL broadcast and/or using an on-demand mechanism). Additional information may include a validity criteria for the SI.

For example, a WTRU may acquire SI for a cell, for example, using a broadcasting channel. A WTRU may (e.g. further) perform an initial access, e.g., to establish connectivity with the access network (e.g. ACP and/or RCCP). A WTRU may (e.g. subsequently) receive SI for one or more cell(s), TRP(s), etc. (e.g. similar and/or the like), for example, using a (e.g. dedicated) transmission such as a reconfiguration procedure. SI may be indexed, for example, using a characteristic associated with a reference signal (e.g. a signature, a positioning signal, etc.) that may be applicable. SI may be indexed, for example, for one or more, or each of the concerned cell(s)/TRP(s) and/or TRPGs. An SI may include (e.g. only) a portion of the information associated with a cell/TRP, such as access parameters. A WTRU may (e.g. subsequently) detect a reference signal associated with a configured SI. A WTRU may perform acquisition of further SI, for example, from a downlink broadcast channel (e.g. when applicable) and/or by initiating an access using the access parameters that are part of the configured SI for the concerned cell/TRP and/or detected reference signal/signature.

Additional SI may be acquired immediately. For example, a WTRU may initiate reception of broadcast system information, for example, when it determines that a broadcast channel may be available. A WTRU may initiate a procedure to request activation of a broadcast channel. A WTRU may (e.g. when it cannot receive broadcast SI using resources associated with the cell/TRP) initiate an access, for example, using access parameters that may be part of a configured SI for a concerned cell/TRP and/or detected reference signal/signature. A WTRU may initiate a procedure to request remaining SI for the concerned cell/TRP using dedicated resources thereof.

Additional SI may be acquired immediately, for example, when instructed and/or configured to do so. For example, a WTRU may initiate reception of broadcast system information, for example, when the WRTU determines that it is required (e.g. based on information in a first portion of the configured SI) to initiate such a procedure upon detection of a suitable reference signal (e.g. corresponding to a "known"/configured signature and/or received with sufficient power). A WTRU may use an applicable SI acquisition procedure, e.g., when configured.

Additional SI may be acquired on demand. A WTRU may acquire system information, for example, through dedicated resources (e.g. triggered through PRACH). On-demand acquisition may be based on service, WTRU capability, slice, etc.

A WTRU may initiate on-demand acquisition of additional SI, for example, after initial access. A WTRU may request a default set of SI messages, for example, based on WTRU capability and/or based on previously used services.

A WTRU may initiate on-demand acquisition of additional SI, for example, when a WTRU initiates new services. A WTRU may request additional SI messages, for example, when the associated SI messages have not already been acquired.

A WTRU may initiate on-demand acquisition of additional SI (e.g. specific SI messages), for example, when a WTRU determines that stored SI messages are no longer valid, e.g. upon receiving a modification indication for one or more SI messages and/or upon receiving an unknown system signature.

A WTRU may initiate on-demand acquisition of additional SI, for example, based on expiration of a timer. A timer may be associated with the validity of stored system information.

In a WTRU terminated example, a WTRU may (e.g. at reception of service requests) request additional SI messages, for example, when associated SI messages have not already been acquired.

In a WTRU terminated example, a WTRU may receive control signaling (e.g. paging/PDCCH-order) that may trigger an acquisition/update. The procedure may be included in the signaling/order. Signaling may provide an indication of an applicable information component (e.g. one or more components to be updated).

For example, a WTRU may activate transmission of system information, for example, by transmitting an uplink signal. An uplink signal may be transmitted in resources that may be reserved for system information activation. For example, a specific time/frequency resource and/or a UL physical channel may be reserved for system information activation. In an (e.g. another) example, a WTRU may transmit a reserved RACH preamble, for example, to indicate a system information activation request. In an (e.g. another) example, a WTRU may transmit a UL signal on an asynchronous resource that may be reserved for system information activation. UL resources for system information activation may be specific to a TRP, a group of TRPs and/or a MAC instance. A WTRU may use a system information activation procedure, for example, to indicate interest in acquiring system information. WTRU identification by the network may be optional during a system information activation procedure.

A WTRU may receive configuration for system information activation at different levels of granularity. For example, a WTRU may trigger different system information transmission behavior from a network based on UL signal type, UL resource selection, UL preamble selection, etc. Transmission behavior may include transmitting (e.g. only mandatory) system information, transmitting system information belonging to a specific slice, transmitting specific group of system information, etc. Transmission behavior may be, for example, one shot (e.g. for one or more, or each activation request one instance of the associated system information may be transmitted) and/or multi-shot (e.g. for one or more, or each activation request one or more, or multiple instances and/or repetition of the associated system information may be transmitted). For example, UL resources may be, for example, specific to a TRP and/or common to a group of TRPs. A WTRU may trigger TRP specific system information and/or TRP group specific system information, for example, based on the corresponding selection of UL resource.

The terms system information request and Other-SI request may be used interchangeably. For example, a WTRU may transmit a (e.g. an explicit) request message to trigger system information transmission. For example, a request message may include WTRU identity and/or type of system information requested. For example, a network may trigger security procedures, e.g. authentication as a response to a system information request procedure. A procedure may enable secure delivery of system information message. For example, a WTRU may acquire common system information via broadcast and/or activation procedure. A WTRU may (e.g. for slice specific system information) trigger a system information request procedure. A WTRU may (e.g. be required to) establish an access control plane, for example, to trigger a system information request message. For example, a WTRU may transmit its capability information (e.g. along with a system information request), for example, so a network may provide (e.g. only) the system information applicable for a WTRU capability.

For example, a WTRU may piggyback an SIB request together with a control signaling procedure. A WTRU may (e.g., implicitly) indicate a desire and/or usefulness for system information, for example, by transmitting additional indication with the control signaling procedure. For example, a WTRU may transmit a system information request bit/bitmap (e.g., along with a service request procedure), for example, to indicate a desire and/or usefulness for system information for that procedure. For example, a WTRU may include a value tag (and/or value identifier) associated with stored system information (e.g., along with a control procedure), for example, so a network may provide additional system information, e.g., when the value tag doesn't reflect the latest system information. A WTRU may trigger a control procedure, for example, by requesting system information associated with a control procedure.

A WTRU may trigger an other-SI request (e.g., towards a serving cell) to obtain other-SI associated with a neighbor cell. A WTRU may include identity and/or information associated with the neighbor cell (e.g., physical cell ID, EARFCN, global cell ID, and/or parts of MIB etc.) in the other-SI request. A WTRU may include a reference ID and/or a value tag of the neighbor cell in the other-SI request. A WTRU may include more than one neighbor cell identity in a single other-SI request message (e.g., to obtain other-SI for one or more, or multiple neighbor cells in a single procedure). Neighbor cell SI acquisition may be useful for the WTRU to perform autonomous mobility decisions towards that neighbor cell.

A WTRU may trigger an other-SI request to obtain other-SI associated with one or more beams. A WTRU may include identity and/or information associated with the beam, (e.g., beam ID, a reference signal associated with the beam, and/or parts of MIB in the beam etc.), in the other-SI request. A WTRU may include more than one beam identity in an other-SI request message to obtain other-SI for one or more, or multiple beams (e.g., in a single procedure).

A WTRU may include information about the stored SI in the other-SI request. For example, a WTRU may indicate the version and/or validity tag of SI stored in the WTRU memory during the transmission of other-SI request. The network may transmit (e.g., only) the delta and/or updated portion of the other-SI. Signaling overhead and/or acquisition time associated other-SI may be reduced.

A WTRU may include additional information in the other-SI request to request characteristics of other-SI broadcast. For example, a WTRU may indicate one or more aspects related to downlink signal quality in the other-SI request. Such indications may be used by the network to adapt the periodicity, for beamforming, for repetition, and/or MCS for the other-SI broadcast transmission. For example, a WTRU may indicate the desire and/or usefulness for more repetition and/or robust MCS when in a poor condition (e.g., cell edge and/or high path loss conditions). Also, as an example, a WTRU may indicate such a request based on a preamble selection, RACH resource selection, in the message portion of an enhanced RACH format, and/or in a field in a msg3 carrying other-SI request.

A WTRU may trigger a system information request procedure in any state (e.g., idle, inactive, and/or connected). A WTRU may or might not transition to a connected state to acquire the other-SI. A WTRU may perform a system information request by for example using a dedicated resource and/or a contention based resource.

A WTRU may be configured with one or more rules for transmission of on-demand system information request that may be saved in memory as instructions executable by a processor. A WTRU may trigger (e.g., only) if one or more of the following conditions are satisfied. An example condition for triggering an on-demand system information request may be the status of essential SI. For example, a WTRU may request for other-SI (e.g. only) when the WTRU has up to date essential system information. A WTRU may abort any ongoing other-SI request if it determines a change in essential SI. A WTRU may acquire the essential SI and/or reacquire the other-SI according to the updated essential SI.

An example condition for triggering an on-demand system information request may be the absence of required information. For example, a WTRU may determine that the system information transmitted in the essential SI is not sufficient (e.g., for a specific procedure and/or operation in a WTRU state). A WTRU may determine that system information stored in the WTRU (e.g., based on previous other-SI request procedure and/or based on network assistance) is not sufficient (e.g., for a specific procedure and/or operation in a WTRU state). A WTRU may trigger other-SI request when a new procedure is triggered/started (e.g., for which the WTRU does not have a valid and/or stored SI associated with such procedure). For example, a WTRU may start a procedure, which may require operation in a numerology/SOM different from the current numerology/SOM. A WTRU may trigger an other-SI request to obtain system information relevant for the new numerology/SOM and/or may request system information for a specific numerology/SOM. For example, a WTRU may implicitly indicate request for a specific numerology/SOM based on the choice of resources (e.g. time/frequency or preambles) for other-SI request.

A WTRU may be preconfigured (e.g., saved in memory) with the list of SIs required for the supported procedures and/or operation in a WTRU state.

An example condition for triggering an on-demand system information request may be the absence of broadcast Other-SI; a WTRU may determine that the other-SI is not broadcasted. For example, a WTRU may determine the presence of other-SI based on scheduling information in the essential SI. For example, a WTRU may trigger other-SI request if a WTRU may determine that the broadcast of other-SI is stopped before the WTRU can acquire the required other-SI and/or if a WTRU determines that one or more specific other-SI required by the WTRU is not present in the current schedule of other-SI broadcast.

An example condition for triggering an on-demand system information request may be the support/presence of the other SI. For example, a WTRU may trigger the request for other-SI if (e.g., only if) transmission of such other SI is supported by the network. For example, a WTRU may determine the support of specific type of other-SI from the essential SI.

An example condition for triggering an on-demand system information request may be the WTRU not being prevented by access control from making such a request. For example, a WTRU may belong to one or more of many access classes. A WTRU may determine (e.g., may be required to determine) if requesting other-SI is not forbidden for its access class. For example, such forbidden access class for other-SI request may be broadcasted as a part of essential SI.

An example condition for triggering an on-demand system information request may be the presence of UL resources for other-SI request(s). For example, a WTRU may determine and/or receive the configuration of UL resources for system information request procedure. The configuration may include, e.g. UL RACH resources, RACH formats (e.g. including enhanced RACH formats).

An example condition for triggering an on-demand system information request may be the WTRU detecting change/update of other-SI and/or when WTRU determines the stored other-SI is invalid: a WTRU may monitor for the change in other-SI via signaling in broadcast message (e.g., MIB and/or essential SI and/or a paging message). A WTRU may monitor a change only for other-SI that are acquired and/or stored by the WTRU. A WTRU may receive the signaling indicating whether the modified other-SI is broadcasted and/or whether a system information request procedure is desired and/or useful. A WTRU UE may trigger other-SI request (e.g., only) if so indicated by the network. For example, a WTRU may apply stored other-SI instead of request for other-SI, upon determining the validity tag and/or similar matches (e.g., substantially corresponds) with the stored SI.

An example condition for triggering an on-demand system information request may be the discovery of a neighbor cell. For example, a WTRU may trigger other-SI request upon discovery of a neighbor cell for which the WTRU does not have a valid and/or stored system information. The WTRU may trigger an other-SI request based on quality of neighbor cells being above (or below) a predefined threshold.

A WTRU may start a timer A and/or a timer B (e.g., where timer A time> timer B time), when the first other-SI request message is transmitted. A WTRU may stop timer A and/or timer B when the WTRU completes the acquisition of other-SI. Upon expiry of timer B, a WTRU may retransmit the other-SI request message and/or restart timer B. A WTRU may be configured with a predefined number of retransmissions to acquire the other-SI until expiry of timer A. Upon expiry of timer A, a WTRU may consider the cell to be barred for a predefined duration (e.g., not use that cell). While timer B is running, a WTRU may monitor for the presence and/or scheduling of other-SI via a broadcast signaling (e.g., minimum SI, paging message, and/or via unicast signaling via downlink control channel).

As a step (in msg1), a WTRU may transmit a reserved RACH preamble to request system information. For example, such reserved RACH preambles may be used to indicate a specific system information block and/or group thereof, indicate the WTRU state (e.g., RACH preambles are associated to a WTRU state), indicate the system information for a type of service and/or group thereof, indicate aspect related to timing/latency for acquiring system information, and/or indicate that WTRU may perform data transmission following acquisition of system information.

A WTRU may be configured (e.g., programmed with executable instructions by a processor) to transmit an enhanced first message and/or msg1 for requesting other-SI. A WTRU may, in addition to a preamble portion in the enhanced first message, may include additional bits in a message portion. A WTRU may be configured (e.g., programmed with executable instructions by a processor) with predefined relations (e.g., in time and/or frequency between the preamble portion and message portion). A WTRU may indicate a request for other SI (e.g., based on a selection of a preamble sequence). A WTRU may indicate a specific type/group of other-SI requested (e.g., based on the reserved identity in the message portion). For example, a WTRU may transmit a preamble from a common pool and/or indicate the request for other-SI and/or specific type of other-SI (e.g., using the reserved identity in the message portion). A WTRU may be preconfigured (e.g., programmed with executable instructions by a processor) with the mapping of reserved identities to the types of other-SI. One or more WTRU identities may be reserved for such purpose. A WTRU may receive the configuration of reserved identity usage from minimum SI. The preamble may indicate the request for other-SI and/or the message portion may indicate connection establishment cause. A WTRU may be configured (e.g., programmed with executable instructions by a processor) to receive other-SI associated with a specific connection establishment cause, save such information and/or execute such received instructions. A WTRU may fallback to a normal msg1 (e.g., without message portion) if the retransmission of enhanced msg1 exceeds a threshold.

A WTRU may be configured to monitor for the MSG2 containing a response to the other-SI request. For example, a WTRU may be configured to monitor for a temporary identifier (e.g. a RNTI) specific to the other-SI request. For example, the temporary identifier may include a component specific to the other-SI request and/or the time/frequency and/or the preamble resource used for the other-SI request. For example, a WTRU may be configured to monitor a (e.g., single) temporary identifier that may be predefined for one or more, or all, other-SI requests, perhaps irrespective of the time/frequency/preamble resources used for the other-SI request transmission.

A WTRU may be configured to process the received MSG2, perhaps for example in response to an other-SI request. For example, the MSG2 format may be specific to the other-SI request, perhaps indicated by a separate type field. For example, the MSG2 response to the other-SI request may include the identity of the preamble associated with the other-SI request and/or may directly include an indication of the other-SI type. For example, the MSG2 might not include the timing advance, UL grant, and/or temporary identity. The MSG2 may include a bitmap of one or more, or all, the other-SI types that may be transmitted in an upcoming other-SI window.

A WTRU may be configured to process one or more MSG2 within a predefined time window, perhaps for example to determine the transmission status of one or more other-SI types. This may occur irrespective of whether the MSG2 corresponds to the MSG1 transmitted by the WTRU. The predefined time window may be configured, for example, in the minimum SI. The predefined time window may be related to the SI window of the SI being requested (e.g. a number of frames/subframes prior to the start of the SI window). This may be useful for the WTRU to determine one or more other-SI windows that may contain other-SIs of interest to the WTRU. This may include one or more other-SIs of interest for which the WTRU might not have been able to transmit the other-SI request. For example, a WTRU may be configured to monitor and/or process MSG2, perhaps until the WTRU receives the MSG2 including the response to requested other-SI and/or interested other-SI, and/or until the end of a predefined time window.

A WTRU may be configured to receive a MSG2 that may include a response to normal access by other WTRUs and/or a response to other SI request(s). The WTRU may distinguish the different responses in the same MSG2, perhaps for example based on the RAPID (ID of the RACH preamble). The WTRU, perhaps for example depending on whether it has performed access and/or SI request, may read the RAR (e.g., only the RAR) associated with the RAPID for which it transmitted a MSG1 (e.g., preamble).

A WTRU may be configured (e.g., programmed with executable instructions by a processor) with one or more actions/behaviors based on reception on a second message as follows. If no response is received by the WTRU (e.g., msg2 was not received), and/or the requested system information has not been received either through broadcast and/or through dedicated signaling within a certain period, the WTRU may re-transmit the system information request in msg1. If a WTRU receives the response in msg2, with indication that the requested system information is not available, and/or no further system information is available, the WTRU may perform no further actions for this procedure. The WTRU may receive a response in msg2. The response in the msg2 may indicate whether the WTRU should request in msg3 the specific SI the WTRU wants. For example, the WTRU may receive an indication that some or all other SI will be broadcast by the network, in which case the WTRU will not transmit msg3, and/or an indication that may instruct the WTRU to transmit msg3 with the specific other-SI to be requested.

If a WTRU receives the response in msg2, with indication that the requested system information will be broadcasted, the WTRU may obtain the scheduling information from the "Essential" system information and/or may acquire the applicable system information from the broadcast. These approaches may provide power savings and/or signaling overhead reduction (e.g., WTRUs in Idle mode or Inactive mode can acquire the system information while remaining within the respective state).

If a WTRU receives the response in msg2, with scheduling information of the requested system information, the WTRU may acquire the broadcasted system information using the scheduling information included in msg2. The WTRU may acquire the system information faster instead of obtaining the scheduling information from the next broadcasted "Essential" system information and then acquire the application system information.

If a WTRU receives the response in msg2, with an entry/index to the access table, the WTRU may retrieve the applicable system information from the access table. The WTRU may have low latency and/or resource efficiency since the WTRU had previously already acquired the access table.

If a WTRU receives the response in msg2, with timing advance, grant and/or indication to transition to the connected state in order to acquire the system information, the WTRU may transition to the connected state and acquire the system information using dedicated resources. The WTRU may have resource efficiency (e.g., when few WTRUs are requesting system information/accessing the system). The WTRU may have indicated (e.g., based on the selection of the reserved RACH preamble) that data transfer may occur after acquisition of system information.

A WTRU may receive the response in msg2 (e.g., the msg2 may carry complete and/or parts of other-SI). For example, a msg2 may schedule DL time/frequency resources that carry other-SI. DL resources may be either multiplexed in the same TTI as the msg2 and/or at an offset from the TTI carrying msg2.

A WTRU may be configured to monitor the minimum-SI after transmission of other-SI request (e.g., for a pre-defined time interval). A WTRU may determine the scheduling configuration for broadcast of other-SI transmission based on the received minimum-SI.

A WTRU may be configured to monitor a paging message after transmission of other-SI request (e.g., for a pre-defined time interval). A WTRU may determine the scheduling configuration for broadcasting an other-SI transmission based on the received paging message.

A WTRU may transmit the Other-SI request in a MSG3. For example, a WTRU may be configured to transmit an other-SI request in MSG3, perhaps for example if no RACH resources are configured for the specific other-SI and/or combinations of other-SIs desired by the WTRU. A WTRU may be configured to use a specific RACH resource to transmit an other-SI in MSG3. A WTRU may be configured to utilize one or more, or any, RACH resource to initiate the procedure for other-SI in MSG3. The WTRU may select a RACH resource which has a specific timing relation (e.g., configured and/or specified/static) in relation to the SI window of the other-SI that may be requested. For example, the WTRU may perform an other-SI request by utilizing one or more, or any, RACH resource associated to a subframe/frame which may occur a certain time, and/or within a certain window, prior to the start of the SI window associated with the other-SI being requested. This can also be applicable for other-SI requests made using the techniques that use the MSG1.

A WTRU may indicate the reason for message3 transmission in msg1 (e.g., using either RACH resource/preamble resource selection and/or using an indication in the message portion of enhanced msg1). A WTRU might not provide any indication in msg1. A WTRU may utilize the grant received in msg2 for the transmission of other-SI request in msg3. The other-SI request may be an RRC message. A WTRU may receive msg4 as a response. The msg4 may be a RRC message carrying other-SI. The msg4 may carry an indication of whether the WTRU wishes, desires, and/or may find useful, to transition to a connected state or stay in the current state (e.g., idle, inactive etc.). Using RRC message for other-SI request may support Other-SIs (e.g., that could be introduced).

The WTRU may transmit the other-SI request in a msg3 and/or receive in msg4 information (e.g., information for obtaining other-SI). The information could include, for example, an RNTI to be used to receive the other-SI, time/frequency information about where to look for the other-SI (e.g., a specific subband of the control and/or data channel), validity information and/or validity tag associated with other-SI, and/or other parameters required to allow the WTRU to decode and/or receive the other-SI once it is transmitted. The WTRU may receive other-SI following reception of msg4 using the received information.

A WTRU may use multi-stage RACH for an other-SI request.

A WTRU may transmit a request for other-SI with one or more, or multiple RACH transmissions and/or transmissions on contention-based resources.

For example, a WTRU may transmit a first RACH preamble to indicate the desire for other-SI, and/or the WTRU may use a subsequent RACH preamble to request the other-SI that should be transmitted. In the transmission of the preamble (e.g., first preamble and/or in the transmission of the subsequent preamble), a WTRU may use the selected preamble and/or the resources on which the preamble is transmitted (e.g., to indicate the desire for other-SI and/or the specific other-SI being requested).

The potential collision of msg3 transmissions by one or more, or multiple WTRUs transmitting other-SI requests simultaneously when a WTRU requests specific SI to be transmitted using msg3 may be avoided. The network broadcast of some or all the other-SI (e.g., if only a single preamble was used to request some or all other-SI in msg1) may be avoided.

A WTRU may use an initial RACH transmission.

A (e.g., first) RACH transmission may be performed using a preamble and/or on a PRACH resource (e.g., which is dedicated for initiating a multi-stage RACH procedure for other-SI request). This may be determined by the WTRU from broadcast signaling (such as in the Minimum SI) and/or preconfigured in the WTRU. The WTRU may initiate a multi-stage MACH transmission for other-SI request by selecting the dedicated preamble and/or RACH resource configured for such purpose and/or performing the RACH transmission (e.g., first RACH transmission).

A WTRU may be programmed with a processor with instructions for responding to a response to a RACH transmission (e.g., initial RACH transmission).

A WTRU may receive, in msg2, following a RACH transmission (e.g., initial RACH transmission), an indication of the presence of additional RACH resources and/or contention-based resources for transmitting request for other-SI. An indication may also include configuration information of the RACH resources, such as a preamble and/or resources to be used; mapping between preamble and/or resources and the other-SI to be requested; timing information related to the validity of the RACH resources and/or contention-based resources; timing information related to the reception of the other-SI; and/or C-RNTI and/or other identifier to be used for monitoring transmission of the other-SI.

A WTRU may receive an indication of whether to request other-SI using a second stage of RACH transmission and/or a transmission on contention-based resources and/or whether the WTRU should expect to receive other-SI (e.g., some or all other-SI) following the transmission of the RACH transmission (e.g. initial RACH transmission). For example, an msg2 message may indicate that additional RACH resources for indication of the other-SI requested will not be provided and/or the WTRU should receive some or all other-SI based on scheduling information of the other-SI, which the WTRU may have determined in the minimum SI.

A WTRU may have a processor programmed with instructions for determining RACH resources for second stage RACH transmission.

The WTRU may be configured (e.g., following transmission of the first RACH) with additional RACH resources and/or with contention-based resources (e.g., for indicating the specific other-SI being requested by the WTRU). The configuration of the additional RACH resources and/or contention-based resources used for requesting other-SI may be determined by the WTRU based on one or more of: msg2, preconfigurations and/or configurations of minimum SI, function of identity, and/or function of timing.

For received in msg2 configurations, the WTRU may receive a configuration of resources and/or preambles from the network in msg2 following transmission of a RACH transmission (e.g., initial RACH transmission). The configuration may be provided as an index into a table of specific RACH resources and/or preamble configurations known to the WTRU. The WTRU may receive several such indices representing one or more, or multiple configurations. The WTRU may receive the resources to use for the subsequent RACH transmission through an explicit grant. The grant may be accompanied by an indication that the grant is for transmission of a preamble identifying the other-SI being requested.

For preconfigurations and/or configurations of minimum SI, the WTRU may be pre-configured and/or configured by minimum SI to use defined RACH resources and/or RACH preambles for the other-SI. The WTRU may assume such resources are enabled/validated upon reception of an indication (e.g., RACH resources/RACH preambles activated). The indication may be received by the WTRU in msg2 and/or in a message in a separate PHY control channel.

For function of identity, the WTRU may determine the configuration of resources (time/frequency) for the second stage RACH resources based on an identity. The identity may be the cell identity, WTRU identity (e.g., temporary and/or provided in msg2), and/or network identity.

For function of timing, the WTRU may determine the configuration of resources (time/frequency) from the timing of msg2 reception and/or msg1 transmission. For example, the time location of the activated RACH resources may be configured as a predefined pattern of resources, which is offset from msg2 reception time by a specific amount.

The WTRU may map preamble/resources in second stage to other-SI.

The WTRU may indicate the other-SI it is requesting (e.g., through the selection of the preamble) including the preamble sequence and/or other transmission characteristics of the preamble such as preamble length, numerology, and/or power. The WTRU may select a preamble based on the other-SI that the WTRU requires. The WTRU may randomly select a time/frequency resource for transmitting the selected preamble.

The WTRU may indicate the other-SI being requested through the selection of the resources used for transmission of the preamble from the set of RACH resources available for transmission of the second stage RACH. For example, the WTRU may determine the other-SI it requires to request and/or may select a resource from the set of configured time/frequency resources, which corresponds to the specific other-SI being requested. The WTRU may (e.g., randomly) select a preamble to transmit on that specific resource.

The WTRU may indicate the other-SI requested through a combination of the selection of preamble and resources. For example, a combination of a specific preamble and a distinct resource on which that preamble is transmitted may indicate the request for a specific SI.

Specific combinations of preamble and resources may be reserved for the WTRU to request one or more, or multiple other-SI and/or a set of SIBs (e.g., a set of SIBs and/or SI related to a specific feature).

The mapping between resources/preamble and specific other-SI (e.g., SIB and/or SI message) may be determined by the WTRU based on one or more of: reception of the mapped information in the minimum SI (e.g., the information related to the other-SI which is provided in minimum SI may provide such mapping); a preconfiguration and/or a fixed definition; a WTRU category (e.g., a WTRU of one category may have a different mapping compared to a WTRU of a different category); stored information (e.g., the WTRU may have stored mapped information from the same or a different cell's broadcast and/or may determine that such information is still valid); and/or specific ordering (e.g., the WTRU may assume one or more, or each other-SI (e.g., SIB number) corresponds to a preamble and/or a resource in increasing order). For specific ordering, the WTRU may associate a specific starting preamble and/or resource to the first SIB, which may be requested as other-SI, and/or the next SIB may use the next preamble and/or resource, etc. based on some ordered numbering. The SIB numbering may further be based on the SIBs that the cell has available. Availability information can be determined by the WTRU in the minimum SI.

The mapping of resource/preambles and other-SI requested by the WTRU may depend on information provided by the WTRU in the RACH transmission (e.g. initial RACH transmission). For example, the WTRU may have provided, (e.g., in the initial RACH transmission), some information pertaining to the other-SI that the WTRU would request in the second RACH transmission. The WTRU may provide a subset or a group of the other-SI in the initial RACH transmission. The WTRU may have provided this information through the specific preamble, resource selected in the initial RACH transmission, and/or using a RACH procedure (e.g., 2-step RACH procedure whereby additional data was transmitted along with the preamble). The WTRU may determine the mapping of the preamble and/or data to use and/or the other-SI requested using the second stage RACH transmission based on the subset or group which was selected in the first stage. For example, in case the preambles and/or resources are based on a specific ordering, the ordering may be applied (e.g., only) to the subset or group indicated by the WTRU in the first RACH transmission.

A WTRU may have a processor configured with executable instructions for the validity of second-stage RACH resources.

The resources for transmission of the second-stage RACH for request of other-SI may have a specific validity time. For instance, the WTRU may assume such resources are available upon reception of msg2 and/or upon transmission of msg1. Such resources may then be valid for a finite period of time following message receipt. A WTRU may assume the validity of received and/or enabled/validated resources based on a timer. For example, a WTRU may set a timer upon reception of msg2 with RACH resource activation indication and/or may (re)transmit other-SI requests using the configured RACH resources until expiry of a timer.

A WTRU may perform requests for other-SI using transmission of one or more, or multiple preambles in different RACH resources (e.g., in order to request different (e.g., possible sets of) other-SI). For example, a WTRU may transmit a specific preamble for one or more, or each, of the other-SI (e.g., SIB and/or SI message) used (e.g., required) by the WTRU and/or may continue to perform one or more, or all, preamble transmissions until the expiry of validity of the second-stage RACH preambles and/or until it may have received some or all of the required other-SI.

Distinct WTRUs may be programmed to transmit one or multiple requests for other-SI through regularly-occurring RACH resources, which may be temporarily reserved and/or configured for such by the network. Upon expiry of the timer, the network may then re-use such resources for normal scheduling. The configuration of RACH resources for the purposes of other-SI request will be provided (e.g., only) during the periods of time where the network knows there will be WTRUs using them (as a result of transmission of the first RACH by one or more WTRUs).

A WTRU processor may be programmed for retransmission of other-SI requests.

A WTRU may be configured with one or more retransmissions upon transmitting/attempting to transmit other-SI request via a random access preamble, which implicitly and/or explicitly indicates other-SI request a during single, a multi-stage RACH transmission, and/or requests resources for other-SI transmission in msg3. A WTRU may retransmit other-SI request in a contention based and/or grant-free channel.

Upon transmission of other-SI request, a WTRU may be configured to monitor a minimum-SI for a predefined time interval to determine the presence of scheduling information associated with the requested other-SI. For example, the predefined time interval may correspond to a random access response window. A WTRU may retransmit the random access preamble (e.g., with power ramping) when one or more of the following conditions may be true: if no random access response is received within a response window; if the received random access response does not correspond to the requested other-SI, which may or might not correspond to the transmitted other-SI request preamble/message; if the minimum-SI does not indicate a schedule for requested other-SI during the predefined time interval; and/or if the maximum preamble counter associated with an other-SI request transmission is not reached.

A WTRU may consider the other-SI procedure to be successful and/or stop retransmissions of other-SI request, when one or more of the following may be true: if a received random access response corresponds to the requested other-SI, wherein the random access response may or might not correspond to the transmitted other-SI request preamble/message; and/or if a received minimum-SI indicates the presence of scheduling information for requested other-SI.

A WTRU processor may be programmed for actions related to reception of broadcast other-SI. A minimum-SI may refer to transmissions in one or more logical broadcast channels mapped to one or more physical channels providing system information (e.g., essential) directly and/or indirectly (e.g., via indexes to stored/pre-acquired information) for the WTRUs to utilize services (e.g., to camp, reselect, perform initial access, and/or request further system information) from a cell. For example, realization minimum-SI may include Master System Information Block (MIB) and/or one or more SI messages carrying one or more SIBs and/or downlink signals indicating one or more aspects related to a minimum-SI transmission. The SIBs not carried in the minimum-SI may be called other-SI. A WTRU may be configured to receive other-SI transmitted via broadcast, multi-cast (e.g., to a group of relevant WTRUs), simulcast (e.g., from two or more transmission points using SFN) and/or unicast (e.g., to a specific WTRU). Depending on the transmission protocol, a WTRU may be configured to receive other-SI on the same physical channels as minimum-SI and/or a different physical channel(s). WTRUs may be classified into the following different groups based on status of system information available at one or more, or each, of: WTRU: NULL WTRU; MSI WTRU; OSI UE; and/or FULL UE.

A NULL WTRU may be a WTRU without a valid minimum-SI and/or other-SI associated with the serving cell. For example, a NULL WTRU may have acquired and/or stored incomplete minimum SI and/or other-SI associated with the serving cell.

An MSI WTRU may be a WTRU with a valid minimum-SI but without other-SI associated with the serving cell. For example, an MSI may have acquired and/or stored minimum-SI, but not required other-SI for the ongoing procedures at the WTRU.

An OSI WTRU may be a WTRU with a valid minimum-SI and/or in the process of acquiring (e.g., re-acquiring) other-SI associated with the serving cell. For example, an OSI WTRU may or might not have triggered an other-SI request.

A FULL WTRU may be a WTRU with a valid minimum-SI and/or valid other-SI associated with the serving cell. For example, a FULL WTRU may have acquired and/or stored some or all the other-SI associated with serving cell and/or other-SI relevant for ongoing procedures at the WTRU.

An OSI WTRU may be configured to acquire other-SI transmitted as a response to an other-SI request. An OSI WTRU and/or a FULL WTRU may be configured to acquire other-SI transmitted as a result of update/changes to the other-SI. A NULL WTRU may be configured to pre-acquire other-SI before completion of minimum-SI acquisition.

A WTRU may determine the presence of other-SI scheduling information upon receiving an indication in a paging message. A WTRU may determine a change in value-tag associated with other-SI upon receiving an indication in a paging message. A WTRU may be configured with a timing relation between the other-SI request in the uplink and possible presence of other-SI schedule in the downlink. A WTRU may use the timing relation to determine the starting point for monitoring the presence of an other-SI schedule in a minimum-SI. For example, the timing relation may be expressed via a modification period. The timing relation may be expressed in relation to a paging occasion (e.g., the timing relation may be expressed as an offset in terms of timing units like a subframe and/or a radio frame). A WTRU may be configured with a timing relation in a paging message and/or in a response message to other-SI request.

A WTRU may be configured to suppress transmission of other-SI request based on reception of one or more downlink signals. For example, a WTRU may suppress the transmission of an other-SI request if a minimum-SI carries scheduling information for corresponding other-SI. A WTRU may suppress transmission of other-SI request if a minimum-SI indicates that the corresponding other-SI may be scheduled in the future. Suppression may be used to prevent duplicate transmissions of other-SI request (e.g., when a network is preparing for transmission of broadcast other-SI based on a previous other-SI request possibly from a same and/or different WTRU).

A WTRU may be configured to acquire the broadcasted other-SI using one or more signaling aspects common to minimum-SI transmission. For example, a WTRU may be configured to receive the scheduling information for an other-SI broadcast and/or a minimum-SI broadcast (e.g., from a common minimum-SI). A WTRU may be configured to determine the presence of an other-SI schedule in the minimum-SI (e.g., via a change in the value tag associated with the minimum-SI). A WTRU may be configured to receive the dynamic time/frequency resources for minimum-SI and/or other-SI broadcast using the common control channel characteristic (e.g., search spaces, RNTI and/or the like). A WTRU may be configured to receive the other-SI broadcast transmission in time windows overlapping with the minimum-SI transmissions. WTRUs not interested in the other-SI broadcast may be triggered not to perform unnecessary receptions.

A WTRU may be configured to acquire the broadcasted other-SI using one or more signaling aspects decoupled from the minimum-SI broadcast.

A WTRU may be configured to determine the presence of other-SI broadcast (e.g., via the presence of scheduling information in a minimum-SI message). For example, a minimum-SI may carry scheduling information for minimum-SI and other-SI. A WTRU might not assume a change in the value-tag associated with the minimum-SI due to the addition and/or removal of other-SI scheduling information in the minimum-SI. In another example, the minimum-SI (e.g., MSI-M) carrying scheduling information for minimum-SI may be different from minimum-SI (e.g., MSI-O) carrying scheduling information for other-SI. A WTRU may be configured with separate value tags associated with one or more, or each, of MSI-M and/or MSI-O.

Figure 6:
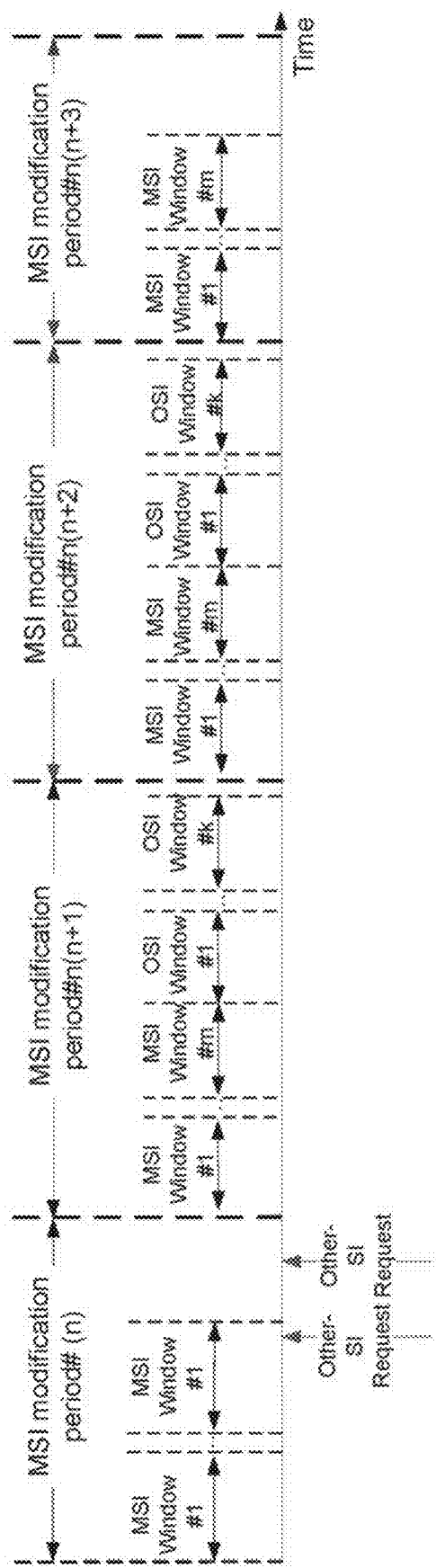
FIG. 6 is an example of non-overlapping windows for minimum-system information (SI) and other-SI.

A WTRU may be configured with non-overlapping time windows for a minimum-SI broadcast and/or an other-SI broadcast. For example, a WTRU may be configured with the first other-SI time window after the last minimum-SI time window (e.g., a WTRU may be configured with one or more other-SI time windows with one or more unused minimum-SI time windows). For a specific other-SI message, a WTRU may determine a number "n+m" where "n" may correspond to the order of entry in the list of SI messages scheduled by a scheduling information list associated in MSI-O. "M" may correspond to the highest index associated with the list of minimum-SI messages in MSI-M. For example, a WTRU may be configured with the same RNTI for minimum-SI reception and/or other-SI reception (e.g., a WTRU may be configured with the same control channel search space in time and/or frequency associated with minimum-SI and/or other-SI scheduling). An example of non-overlapping windows for minimum-SI and other-SI is shown in FIG. 6.

Figure 7:
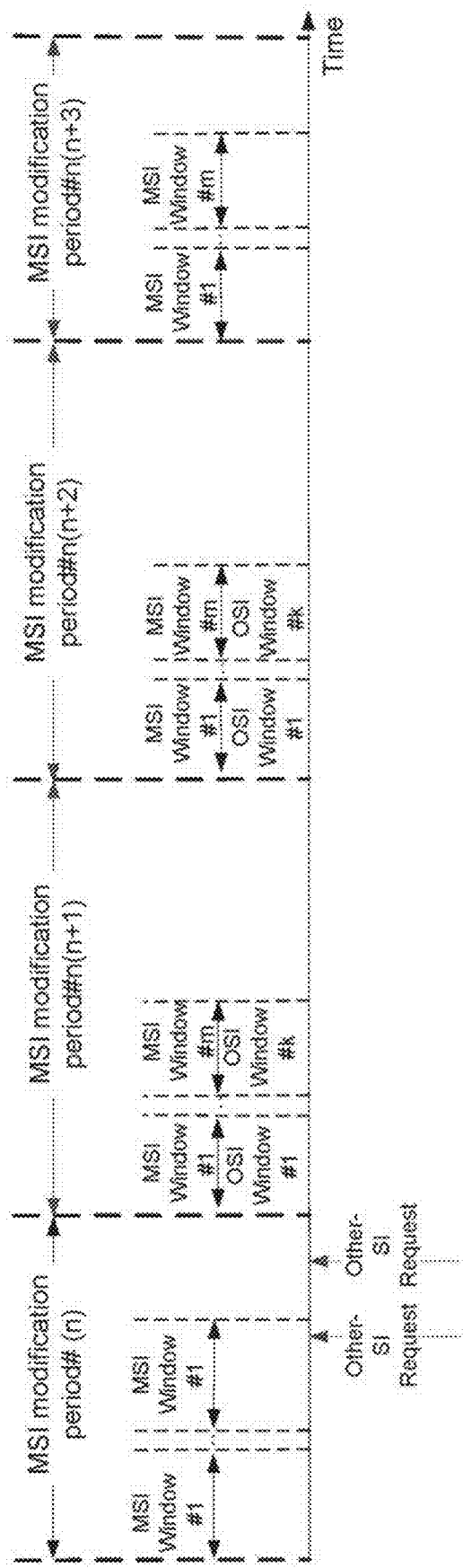
FIG. 7 is an example of overlapping windows for other-SI and minimum-SI.

A WTRU may be configured with one or more other-SI broadcast time windows partially and/or wholly overlapping with one or more time windows for a minimum-SI broadcast. A WTRU may be further configured with one or more aspects to avoid unnecessary reception of other-SI (e.g., when monitoring for minimum-SI). For example, a WTRU may be configured with an aspect of control channel monitoring that is different for minimum-SI as compared to other-SI acquisition (e.g., a WTRU may be configured with a separate RNTI associated with other-SI scheduling different from RNTI associated with minimum-SI scheduling). A WTRU may be configured with a control channel search space in time and/or frequency associated with other-SI scheduling different from control channel search space associated with minimum-SI scheduling. A WTRU may be configured with the other-SI transmission window length to be different than the transmission window length associated with minimum-SI. For example, overlapping windows for minimum-SI and other-SI is shown in FIG. 7.

A WTRU may determine beamforming applicability to system information delivery. A WTRU may be configured to determine whether beamforming is applicable for transmission of one or more system information messages. A WTRU may determine that system information delivery is beamformed (e.g., based on the carrier frequency). A WTRU may be configured with a predefined relationship between the frequency band and the nature of transmission. For example, a WTRU may consider system information to be beamformed for frequency bands higher than 6 GHz.

A WTRU may determine that system information delivery is beamformed (e.g., based on the characteristic of a downlink signal). The downlink signal may include a synchronization signal and/or any other reference signal. For example, characteristics of the downlink signal may include a type of the synchronization signal (e.g., a ZC sequence and/or a binary sequence), system signature, a root and/or basis sequence, and/or one or more predefined sequence numbers.

A WTRU may determine the nature of a system information transmission based on a relation between two or more synchronization signals in time and/or frequency. A WTRU may determine that system information delivery is beamformed (e.g., based on the information carried in a broadcast message). For example, a master system information block, a first system information message, and/or an essential system information (if any) may contain an indication that one or more system information may be beamformed. A WTRU may apply receive beamforming for system information reception (e.g., based on the measurements made on downlink signal quality). For example, a WTRU may apply receive beamforming for system information reception when the received power of a reference signal, a synchronization signal, a master system information block, and/or an essential system information (if any) is below (or above) a predefined threshold.

A WTRU may use uplink assistance to beamforming for system information delivery. A WTRU may provide uplink assistance information to a network element to assist the network element in performing system information delivery. A WTRU may transmit assistance information in an UL signal and/or an UL message (e.g., a transmission for system information activation, system information request, and/or a measurement report). A WTRU may provide transmit assistance information in a deployment applying beamformed transmissions for system information messages. A WTRU may be configured to acquire system information (e.g. using beamformed transmissions). WTRU assistance may help reduce on-demand system information overhead (e.g., reduce required number of beamformed transmissions) and/or reduce the time required for beamformed on-demand system information acquisition. A beam sweep may refer to transmission and/or reception of system information in a plurality of TX and/or RX beams associated with a transmission point and/or reception point (e.g., multiplexed in time, frequency and/or space). A WTRU may receive synchronization signal, master system information, and/or essential system information (if any) in a beam sweep operation. A WTRU may receive on-demand system information in a subset of beams used for transmission of synchronization signal, master system information, and/or essential system information.

A WTRU may determine assistance information (e.g., based on the measurement of one or more aspects related to downlink transmission). For example, the downlink beamformed transmission may include one or more of: a reference signal transmission (such as a reference signal specific to a beam, antenna port, cell and/or sector etc.), a synchronization signal transmission, a transmission of a master system information block, and/or a transmission of one or more essential system information, any other periodic system information transmission associated with the DL beams, and/or an initial transmission of on-demand system information. A WTRU may measure a received energy metric based associated with the downlink transmission (e.g., RSSI (Received Signal Strength Indication)). A WTRU may measure a quality metric associated with the downlink beamformed transmission. For example, the quality metric may be based on received reference signal power (such as RSRP, RSRQ), signal to noise ratio (such as SNR), and/or a channel quality indication (e.g., CQI) etc. A WTRU may measure one or more spatial metric associated with the downlink beamformed transmission (e.g., angle of arrival of a downlink transmission). A WTRU may average the measurement results over a predefined time window. A WTRU may use the result to determine the assistance information. A WTRU may consider/favor the measurement samples that are most recent based on freshness/age criteria to determine the assistance information.

A WTRU may indicate (e.g., via the assistance information) the quality of the serving cell based on one or more measurement metrics described herein. A WTRU may indicate (e.g., via the assistance information) whether to beamform the on-demand system information transmissions (e.g., based on one or more measurement metrics described herein). For example, a WTRU may provide the indication in cell edge and/or in a poor link condition where beamforming may overcome the increased path loss. A WTRU may determine whether to beamform the on-demand system information transmission (e.g., based on the received quality of the downlink transmission). For example, a WTRU may request a beamformed transmission of on-demand system information when the quality of the serving cell is below (or above) a predefined threshold. A WTRU may determine the usefulness for beamformed on-demand system information transmission based on the WTRU's capability. For example, a WTRU may consider the receive beamforming capability and/or the antenna gain achievable with receive beamforming. For example, a WTRU may request a beamformed on-demand system information transmission, when the quality of the serving cell is below a threshold in the presence of receive beamforming. A WTRU may indicate (e.g., via the assistance information) the reception status/quality of one or more downlink beams based on one or more measurement metrics described herein. A WTRU may indicate (e.g., via the assistance information) one or more downlink beams to receive the on-demand system information (e.g., based on one or more measurement metrics described herein).

Figure 8A:
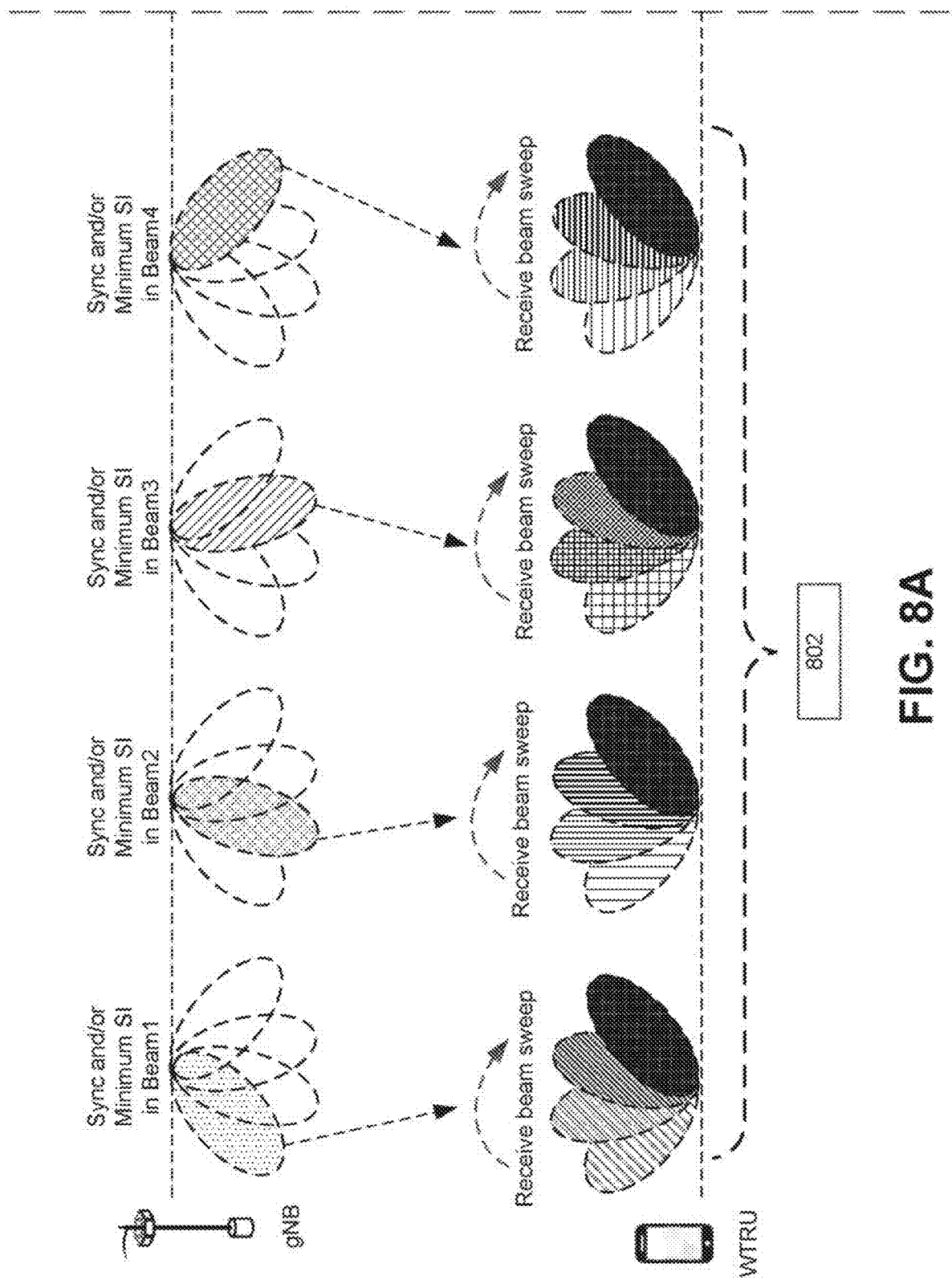
FIGS. 8A and 8B together illustrate an example of an on-demand SI request in a beamformed context.
Figure 8B:
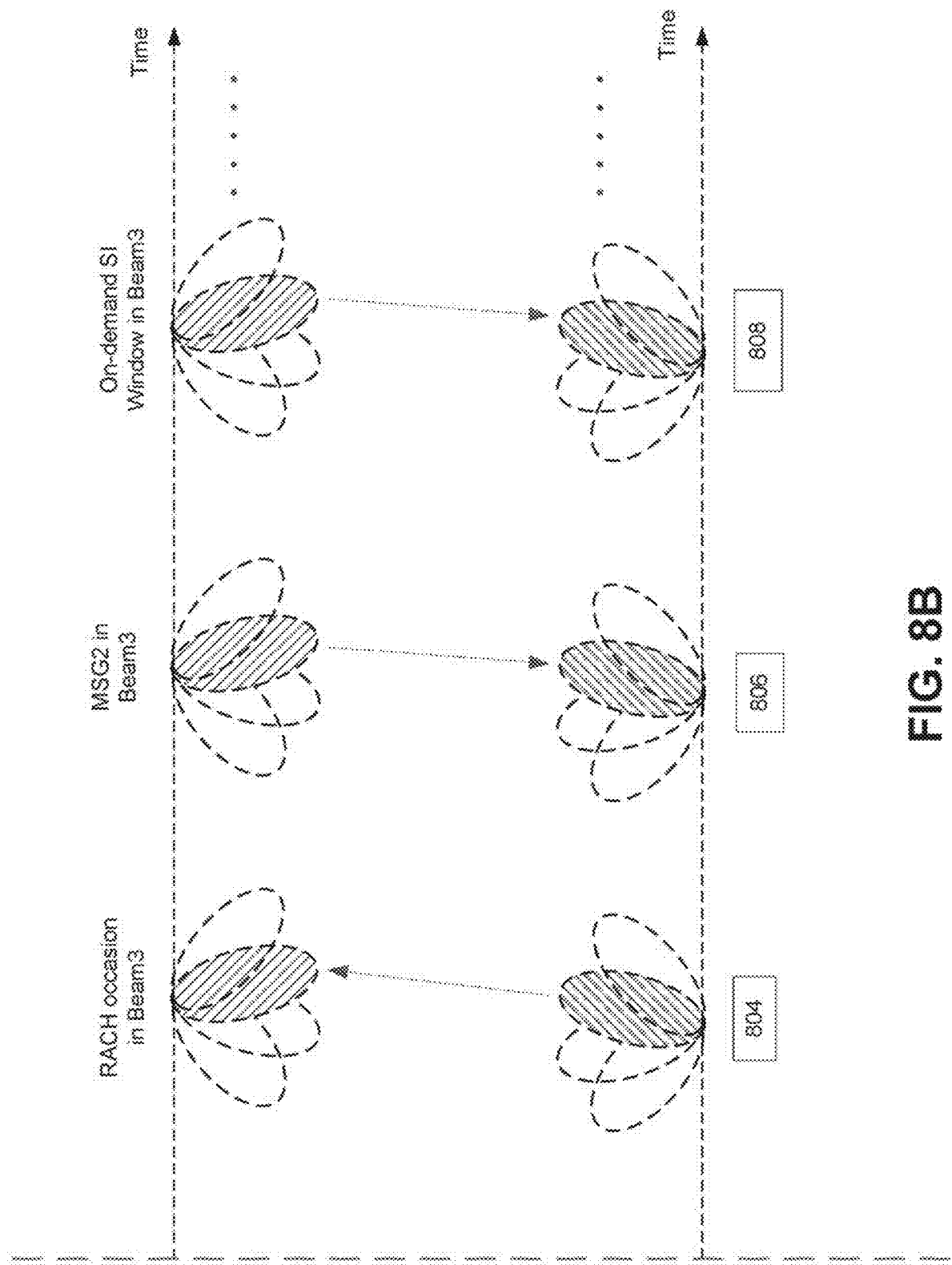

FIGS. 8A and 8B illustrate an example of an on-demand SI request in a beamformed context. At 802, a WTRU may determine one or more UL resources, perhaps for example based on one or more of: at least one (e.g., preferred) DL beam on which Sync and/or MIB and/or MSI and/or ESI may be received, an UL resource mapping to that DL beam, and/or one or more on-demand SI messages to be requested. At 804, the WTRU may transmit (TX) information for reception of the one or more on-demand SI messages using the one or more determined UL resources. At 806, the WTRU may receive a message (e.g., MSG2) that may be associated with the requested on-demand SI. At 808 the WTRU may monitor an on-demand SI window on Beam3 (e.g. a selected DL beam of one or more beams transmitted from the communication network) for the one or more on-demand SI messages.

A WTRU may transmit assistance information. A WTRU may organize the measurement results and/or send a measurement report to the network. A WTRU may include a list (e.g., of one or more, or all) the downlink beams above a predefined quality metric and/or energy metric in the measurement report. A WTRU may be configured to transmit a list of N beams (e.g., best beams) in a measurement report. A WTRU may determine the number of beams to be reported based on the size of measurement report resource.

A WTRU may request for on-demand system information to be transmitted (e.g., in one or more specific beams). For example, a WTRU may request for on-demand system information in a DL beam (e.g., from which the WTRU received a synchronization signal, a master system information block, and/or essential system information). A WTRU may transmit the request (e.g., in a layer 3 message and/or a layer 2 control element).

A WTRU may indicate one or more DL beams to receive on-demand system information (e.g., based on a choice of an UL resource and/or a transmission on that UL resource). For example, the UL resource may be a sounding reference signal and/or a random access resource. One or more, or each preconfigured UL resource may be associated with one or more DL beams. A WTRU may obtain the mapping between a DL beam and an UL resource in a broadcast message (e.g., an essential system information (if any) and/or a time/frequency relation based on identity associated with the DL beam).

The assistance information may be piggybacked with an on-demand system information request and/or system information activation procedure.

The WTRU may indicate the identity of DL beams in the assistance information. A WTRU may determine the identity of a DL beam based on one or more of the following: based on reference signal sequence associated with the DL beam; based on antenna port associated with the DL beam; based on time/frequency resources associated with the DL beam; based on synchronization signal associated with the DL beam; and/or based on an (e.g., explicit) identity carried in a known downlink transmission on the DL beam (e.g., a master information block and/or an essential system information (if any)).

A WTRU may transmit assistance information in a layer 3 message. For example, the assistance information may be transmitted on a default signaling radio bearer.

A WTRU may transmit assistance information in a MAC control element. For example, a new field in the MAC header (such as a predefined LCID) may indicate the presence of assistance information.

A WTRU may transmit assistance information in a physical channel reserved for layer 1 control signaling.

A WTRU may transmit assistance information on a contention based channel. Use of a contention based channel may be resource efficient. In case of collision of assistance information, at least the usefulness for on-demand system information may be conveyed by the presence of transmissions/signal energy in the contention based channel.

A WTRU may transmit assistance information before entering a connected state. For example, a WTRU may transmit assistance information on a common control logical channel.

A WTRU may transmit the assistance information in a message during connection establishment procedure. For example, a WTRU may include assistance information as a response to connection setup message.

A WTRU may transmit assistance information when an on-demand system information request and/or system information activation procedure is triggered.

A WTRU may transmit assistance information based on availability of measurement results. For example, a WTRU may start a timer upon achieving downlink synchronization to the cell. A WTRU may trigger on-demand system information with assistance information (e.g., if the measurement results are available before timer expiry). A WTRU may trigger on-demand system information without assistance information when the timer expires before the measurement results are available.

A WTRU may transmit assistance information when the acquisition of essential system information (if any) is complete.

A WTRU may transmit assistance information when explicitly requested by the network.

A WTRU may transmit assistance information based on an initial transmission of on-demand system information. Such assistance information may be included along with the feedback for such initial transmission.

A WTRU may determine DL resources for on-demand system information, for example, by using one or more of the following: a predefined timing relation between the system information request and start of control channel monitoring (e.g. a control channel may carry a scheduling grant for on-demand system information); and/or a predefined relation between time/frequency resources used for an SI request and start of data channel carrying on-demand system information.

For example, an identity (e.g. an RNTI) for an on-demand system information schedule may, for example, be specific to a WTRU that transmitted the request (e.g. a function of time/frequency resources used for UL SIB request). For example, an identity (e.g. an RNTI) for on-demand system information schedule may, for example, be specific to a cell and/or a predefined constant, which may allow opportunistic reception for WTRUs that did not transmit the SIB request. For example, an RNTI for periodic system information may be different from on-demand system information.

A WTRU may be configured with a temporary periodic resource and/or a semi-persistent resource for on-demand system information reception. For example, a WTRU may receive such a resource as a response to system information activation and/or an on-demand system information request. A WTRU may determine the end of an on-demand system information procedure.

For example, a WTRU may enter connected mode, e.g., to receive on-demand system information messages. A WTRU may be in a loosely connected state or idle connectionless state to trigger an on-demand system information procedure. A WTRU may determine the end of on-demand system information transmission using one or more criteria.

For example, a WTRU may determine the end of an on-demand system information transmission based on a predefined time-window. For example, a WTRU may consider the start of the time window as a start of a first DL transmission corresponding to on-demand system information and/or an end of the TTI containing the system information request. For example, a WTRU may consider end of on-demand system information upon the end of time-window.

For example, a WTRU may determine the end of an on-demand system information transmission, for example, based on explicit indication. For example, a WTRU may receive a special end-marker in the last TTI carrying on-demand system information.

For example, a WTRU may determine the end of an on-demand system information transmission based on a counter. For example, a WTRU may receive a countdown value in a (e.g. one or more, or each) on-demand system information. A WTRU may consider the system information carrying the countdown value as the last on-demand system information.

For example, a WTRU may determine the end of an on-demand system information transmission based on a candidate system information list. For example, a WTRU may be pre-configured with and/or may be signaled a candidate system information list to be acquired and/or associated with an on-demand system information procedure. A WTRU may consider end of on-demand system information transmission, for example, when (e.g. some or all) the system information in the list is received successfully.

For example, a WTRU may determine the end of an on-demand system information transmission based on an explicit release command. For example, a WTRU may (e.g. when the WTRU entered connected mode to receive the on-demand system information) consider an end of on-demand system information upon receiving a connection release command from the network.

A WTRU may process received on-demand system information. A WTRU may trigger a control procedure and/or transition back to idle mode at the end of on-demand system information reception.

A WTRU may consider a cell/TRP to be barred, for example, when a WTRU fails to acquire essential system information (if any) before the end of on-demand system information procedure.

A WTRU may start (e.g., first start) to apply received/ acquired system information or parts thereof. A WTRU may apply/activate the received on-demand system information (e.g., at a specific reference point in time determined by the WTRU).

A WTRU may apply system information received via an on-demand procedure (e.g., at a specific time offset from the TTI corresponding to end of on-demand system information procedure as described herein). Such time offset may be predefined and/or transmitted along with the system information.

A WTRU may apply the on-demand system information (e.g., at the modification boundary after the completion of on-demand system information procedure). For example, a WTRU may reuse the modification boundary defined for essential system information.

A WTRU may apply the on-demand system information upon receiving an explicit activation message. A WTRU may receive such activation message via layer 3 signaling and/or MAC/Layer 1 control signaling.

A WTRU may apply the on-demand system information upon entering a specific state. For example, a WTRU may apply on-demand system information relevant to connected mode operation upon entering connected state. A WTRU may apply on-demand system information relevant to light connected operation upon entering light connected state.

A WTRU may apply the on-demand system information upon transmitting an indication to the network. For example, a WTRU may indicate competition of on-demand system information acquisition to the network and/or may apply (e.g., subsequently) the stored on-demand system information.

The WTRU may invalidate configured system information or parts thereof. A WTRU may receive, apply, and/or store the on-demand system information. A WTRU may monitor the validity of stored on-demand system information. A WTRU may stop using, deactivate, invalidate, overwrite, replace, and/or delete the on-demand system information based on one or more of the following criteria: validity of on-demand system information may be associated with WTRU state; validity of on-demand system information that may be associated with WTRU location; validity of on-demand system information that may be associated with validity of essential system information; validity of on-demand system information that may be associated with a timer; and/or an explicit indication of on-demand system information validity.

For validity of on-demand system information that may be associated with a WTRU state, a WTRU may receive on-demand system information after transition to connected mode. Such on-demand system information may be used (e.g., required) for operation in connected mode. A WTRU may consider the on-demand system information to be invalid upon exiting connected state.

For validity of on-demand system information that may be associated with a WTRU state, a WTRU may acquire on-demand system information while in light connected state. Such on-demand system information may be used (e.g., required) for operation in connected mode. A WTRU may consider the on-demand system information to be invalid upon exiting to light connected state.

For validity of on-demand system information that may be associated with a WTRU state, on-demand system information may be applicable for light connected and/or connected state. A WTRU may consider the on-demand system information to be valid across transition between light connected and connected state. A WTRU may consider the on-demand system information to be invalid upon transition to IDLE state.

For validity of the on-demand system information that may be associated with WTRU location, a WTRU may consider the on-demand system information received in a DL beam to be valid (e.g., only) within that DL beam. Such an approach may be extended for a group of DL beams. For example a WTRU may consider a received on-demand system information to be valid in a group of DL beams.

For validity of the on-demand system information that may be associated with WTRU location, the group of DL beams may be associated with the same control channel. A WTRU may consider the on-demand associated with the group of DL beams valid as long as the WTRU can reliably receive the control channel.

For validity of the on-demand system information that may be associated with WTRU location, a WTRU may consider the on-demand system information to be valid (e.g., only) within the cell from which the WTRU received the on-demand system information. A WTRU may consider the on-demand system information to be invalid when the measured quality of the cell is below (or above) a predefined threshold.

For validity of the on-demand system information that may be associated with WTRU location, a WTRU may consider the on-demand system information to be valid in a geographical area, e.g. a RAN paging area and/or a list of preconfigured cells.

For validity of an on-demand system information that may be associated with validity of an essential system information, a WTRU may consider the on-demand system information associated with a transmission point, beam, cell, and/or region to be invalid if the validity of essential system information (if any) associated with the same transmission point/beam/cell/region becomes invalid.

For validity of an on-demand system information that may be associated with validity of an essential system information, a WTRU may be explicitly configured with the linkage between validity of one or more essential system information (if any) and validity of one or more on-demand system information.

For validity of on-demand system information that may be associated with a timer, a WTRU may consider the on-demand system information to be valid until expiry of a validity timer. For example, the value of validity timer may be specific to a valuetag (e.g. validity timer may be implicit based on ranges of valuetags and/or explicitly configured per valuetag). The value of validity timer may and/or specific to the type of system information (e.g. different timer values for MSI compared to OSI, and/or different validity for different types of SI within MSI and/or OSI). The value of validity timer may be specific to logical area, perhaps for example where the SI was acquired (e.g. a different longer value for SIs acquired in the current cell and/or current RAN area and/or shorter values for SIs acquired from non-serving cell and/or different RAN area).

For an explicit indication of on-demand system information validity, the on-demand system information may be associated with a validity tag and/or version. A WTRU may monitor the validity of stored on-demand system information using a validity tag in a broadcast message (e.g. MIB and/or SIB), paging message, and/or the like.

For an explicit indication of on-demand system information validity, the value tag may be specific to a single on-demand system information message, common to a group of on-demand system information messages, and/or common to some or all the on-demand system information messages from a transmission point/beam/cell/region.

A WTRU may use any combination of the above to stop using, deactivate, invalidate, and/or delete the on-demand system information.

A WTRU may re-acquire the specific SI that is changed (e.g., upon determining that an SI is invalid using one or more methods described herein). For example, the WTRU may re-acquire changed SI and/or refrain from re-acquiring unchanged SI. A WTRU may monitor minimum-SI for the schedule and/or trigger other-SI request for a specific SI to acquire (e.g., only) the required SI.

A WTRU may store different versions of SI in memory. A WTRU may determine validity in a specific cell of essential and/or on-demand system information obtained from a different cell and/or stored at the WTRU.

A WTRU may maintain and/or store in memory one or more, or multiple versions of SI from the network. Such different versions of SI may be received from the current serving cell, from a different cell, and/or from a different frequency layer. Stored SI may enable the WTRU to avoid acquiring SI after every cell change. A WTRU may determine a specific stored version of an SI applicable for a cell based on one or more aspects related to the DL transmission in that cell. A WTRU may consider spatial applicability and/or temporal applicability of a stored system information to avoid unambiguity and/or configuration mismatch between WTRU and the network.

A WTRU may use spatial applicability with SI. SI may be associated with an area for which it applies (e.g., where the area may correspond to a beam, group of beams, a cell, one or more, or each cell in an eNB, group of cells (within a RAN area, tracking area and/or similar), and/or a PLMN etc.). For example, a WTRU may be configured with a version of SI to apply in a geographical area covered by a group of cells. For example, a version of SI may be associated with the SI to be applied by the WTRU in different conditions (e.g., at different times of the day within the same cell).

A WTRU may use temporal applicability with SI. A WTRU may store one or more, or each instance of a received SI for a maximum of a timer ("T") (e.g., started when the WTRU first receives that SI). On expiry of the timer, a WTRU may delete the stored SI. The WTRU may have one or more, or multiple timers active (e.g., one or more, or each associated with a different SI instance).

A WTRU may use application of stored SI for cells transmitting a reference ID.

The term reference ID may refer to unique identity for a specific instance of an SI and/or a group of SIs. The reference ID may be unique over a predefined area and/or for a predefined time interval.

A WTRU may acquire SI from a transmission point that is not applicable to that transmission point (e.g., the SI may be applicable to a different transmission point). Thus, the WTRU may be configured to not assume an SI received from a transmission point that is applicable to that transmission point. A WTRU may be configured to associate an SI to a transmission point based on a reference ID associated to that SI. A WTRU may receive an SI from a transmission point and/or may apply the received/stored SI in a different transmission point, which may or might not transmit the corresponding SI. A WTRU may be configured to apply one or more SIs to a subset of beams from a transmission point. For example, a WTRU may activate one or more stored SIs based on the reference ID carried in a beam (e.g., implicitly based on reference signals in the beam and/or explicitly carried in a MIB associated with a beam).

A WTRU may determine to store a version of SI based on one or more reference IDs associated with one or more, or each version of SI and/or portions thereof. The reference ID for a version of SI may be broadcast by the network as part of the essential system information and/or along with the on-demand SI. For example, the reference ID may be implicitly determined by the WTRU by aspects related to the transmission by the network of the essential SI. For example, the WTRU may determine the reference ID for an SI based on the timing/frequency of the transmission of that SI relative to a reference time/frequency. In addition to the reference ID, and/or as part of the reference ID, the WTRU may also receive a value tag associated with the system information. The value tag may be used as in legacy LTE systems.

The reference ID and value tag may be independent identifiers received by the WTRU. For example, a single reference ID may be received by the WTRU, which may include a value tag. For example, a set of bits in the reference ID may indicate the specific version of the SI, while another set of bits in the reference ID may indicate the value tag associated with the version of the SI.

The reference ID may be applicable to all or part of the system information. For example, a WTRU may receive a reference ID (e.g., which may be applicable to some or all the SI transmitted by a cell (e.g., essential SI and/or on-demand SI)). A WTRU may receive a reference ID which is associated with the essential SI, and/or one or more different reference IDs associated with distinct portions of the on-demand SI. A WTRU may receive the reference ID and/or value tag associated with an SI or a portion of an SI via broadcast and/or dedicated signaling. A WTRU may be configured with the association of one or more sets of reference IDs and/or value tags with one or more sets of SI.

A WTRU may derive an implicit reference ID based on one or more aspects/characteristics associated with DL transmissions. A WTRU may associate the derived reference ID with one or more SI(s) based on predefined rules. For example, a WTRU may derive a reference ID based on a broadcasted area ID (e.g., a RAN area and/or a tracking area ID). A WTRU may be configured to apply the stored SI linked to a reference ID (e.g., while the WTRU can determine that the WTRU is within an area associated with that reference ID). For example, a WTRU may derive a reference ID based on the frequency layer and/or frequency band indication. A WTRU may be configured to apply the stored SI linked to a reference ID (e.g., while the WTRU can determine that a cell belongs to a frequency layer and/or frequency band). For example, a WTRU may derive a reference ID based on a geographical location (e.g., a WTRU may derive a reference ID based on part of global cell identity transmitted in a broadcast signaling). A WTRU may derive a reference ID based on characteristics of DL signals (e.g., logical sequence carried in a synchronization signal). A WTRU may associate the derived reference ID to one or a subset of received SIs. For example, a WTRU may determine the subset based on SI type (e.g., a WTRU may associate the derived reference ID to minimum-SI and/or other-SI). A WTRU may determine the subset based nature of physical channel carrying the SI (e.g., a WTRU may associate the derived reference ID to the SI carried in a physical channel dedicated for a SI transmission, a physical channel defined for single frequency network transmission, a SI transmitted on a physical shared downlink channel, and/or a SI transmitted on a beamformed physical channel. For example, a WTRU may be configured explicitly for the subset of SIs for which the derived implicit reference ID is applicable.

A WTRU may determine to apply a stored version of SI (e.g., upon detecting a cell which transmits a reference ID which matches (e.g., substantially corresponds with) at least one of the WTRU's stored SI versions). The match may also include, without loss of generality, some relational equivalence (e.g., greater than, less than, etc.). A WTRU may be allowed to perform cell operations with stored SI based on equivalence of the reference ID transmitted by a cell with a stored version of SI at the WTRU. A WTRU may be able to camp on a cell and/or perform INACTIVE/CONNECTED mode operations on that cell without acquiring SI from the cell (e.g., despite the cell transmitting a limited amount of SI and/or complete minimum-SI, one or more of which may include a reference ID). For example, a WTRU may camp on a cell which transmits (e.g., only) a portion of the essential SI (and including the reference ID) if the WTRU detects the reference ID matches (e.g., substantially corresponds with) the reference ID of a version of SI stored by the WTRU. A WTRU may consider a neighbor cell transmitting reduced minimum-SI as a candidate for reselection if the WTRU can determine that the reference ID of the neighbor cell (e.g., by receiving reduced minimum-SI from the neighbor cell and/or querying the serving cell) matches (e.g., substantially corresponds with) the reference ID of a version of SI stored by the WTRU.

A cell may transmit the reference ID (e.g., to identify the SI version) and/or a value tag associated with that SI version. One or more reference ID and/or value tags may be transmitted by network cells. A cell may transmit the essential SI, which may be the SI for a WTRU to access the cell. A cell may transmit less than the essential SI while still transmitting the one or more sets of reference IDs and/or a value tag.

The reference ID and/or value tag may be assumed to be associated with the essential SI. A reference ID and value tag pair may be associated with the on-demand SI and/or a subset of the on-demand SI.

A WTRU may have a processor programmed with conditions for storing a version of SI in memory.

A WTRU may store in memory newly acquired SI associated with a reference ID for which the WTRU does not currently have any stored information. A WTRU may also maintain and/or store in memory the SI for a particular amount of time, for a specific area (e.g., as long as the WTRU does not move beyond an area or by more than a certain amount), and/or as long as the value tag associated with the reference ID has not changed. For example, a WTRU may invalidate/delete stored SI associated with a reference ID when it detects a change in the value tag transmitted by the network for SI with the same reference ID.

A WTRU may replace stored SI associated with a reference ID when it detects and/or determines transmission by a cell of SI with the same reference ID as a version of SI stored by the WTRU, but where the value tag has changed. The newly acquired SI may also be stored in memory by the WTRU as stored SI.

A WTRU may have a processor programmed with conditions for applying a stored SI version.

A WTRU may determine that the WTRU may change from a current version of SI to applying a stored version of SI upon reselection to a new cell, moving from an out of coverage condition to in coverage condition, upon detection of a change of the essential SI and/or parts of the essential SI transmitted by the network, upon detecting a change of the reference ID and/or value tag, associated with the SI and/or a different subset of the SI, upon leaving connected state, and/or upon receiving a handover command; for example a WTRU may receive a handover command with a reference ID and/or value tag (or value identifier). A WTRU may apply the stored SI associated with the received reference ID and/or value tag for operation in the target cell. This approach may reduce the size of the handover command and/or allow compressed signaling of target cell parameters. A WTRU may further determine, following the above events, that it may apply a specific version of stored SI based on one or more of the following scenarios: the reference ID of a version of the stored SI matches (e.g., substantially corresponds with) the reference ID currently broadcast by the cell (e.g., in the essential SI); the reference ID and value tag of a version of stored SI matches the reference ID and value tag currently being broadcast by the cell (for example in the essential SI) and/or provided by the cell in dedicated signaling; the implicit reference ID derived by the WTRU for the cell matches with the implicit reference ID stored for the essential SI; the time elapsed since the version of stored SI was acquired by the WTRU does not exceed a predefined and/or configured threshold; and/or the distance travelled by the WTRU since it acquired the specific version of stored SI is below a predefined and/or configured threshold. Upon applying the stored SI(s) associated with the matching reference ID(s), a WTRU may perform one or more actions as if those SIs are acquired in the current cell (e.g., monitoring possible updates to the applied SI, requesting for one or more other-SIs if missing, forwarding relevant information to upper layers (e.g., cell identity, tracking area code, supported features) etc.).

A WTRU may have a processor programmed with instructions for actions upon having no valid stored SI.

A WTRU may determine that the WTRU does not have a valid stored SI for a cell if the reference ID received from a cell does not match any of the reference IDs of stored SI versions at the WTRU. A WTRU may determine that the WTRU does not have valid stored SI if the value tag for a transmitted reference ID which matches (e.g., substantially corresponds with) the reference ID of a stored version of SI does not match the value tag of the stored SI having that reference ID.

A WTRU may, under such conditions, perform and/or determine to perform one or more of the following actions: the WTRU may acquire the SI from the cell and/or store in memory the SI with the associated reference ID and value tag (e.g., if the cell transmits the SI in question (essential SI and/or other-SI)); the WTRU may determine the cell to be barred and/or inaccessible; the WTRU may perform a cell (re)selection and/or attempt to camp on a recent cell and/or another detectable cell for which the above conditions do not occur (e.g., if the cell does not transmit the essential SI); and/or the WTRU may initiate a request for SI, such as some or all other-SI, and/or possibly for the other-SI for which the associated reference ID and value tag meet the conditions described herein.

A WTRU may have a processor programmed with instructions for requesting a reference ID and/or value tag of SI. The network might not broadcast the reference ID and/or value tag of an SI. For example, the network may transmit the reference ID and/or value tag of the on-demand SI with the SI itself, and/or may currently not be broadcasting any other-SI. A WTRU may perform a request for the reference ID and/or value tag for some or all or a specific subset of SI. The request may be triggered as a result of one or more of the following triggers: a WTRU reselects to a different cell; a WTRU, in reselecting to a different cell, has one or more versions of stored SI for the SI and/or subset of SI for which the WTRU is requesting a reference ID/value tag; a WTRU detects a change in another (potentially related and/or linked) reference ID and/or value tag broadcast by the network; a WTRU initiates a service requiring access to a certain SIB and/or subset of SI, for which the WTRU may potentially have stored SI which may be validated; a WTRU reselects and/or connects to a cell where the current reference ID and/or value tag associated with a required part of the SI is not being broadcast by the cell; a WTRU has moved by a certain amount; and/or the validity timer associated with a subset of SI (potentially related to the specific SI in question) has expired.

A WTRU may perform a request for reference ID and/or value tag for a subset of SI through RRC signaling. A WTRU may make the request in IDLE/INACTIVE states and/or in a CONNECTED state. A WTRU may utilize a RACH procedure (e.g., 2-step and/or 4-step RACH) to make the request. A WTRU may use PHY layer signaling on an UL control channel and/or dedicated resources using RRC signaling to make the request.

The WTRU may include in the request of one or more of the following information: one or more reference IDs and/or value tag of any stored SI at the WTRU; a WTRU ID (e.g., C-RNTI, S-TMSI, resume ID, etc.); and/or a specific SIB, SI subset, and/or SI type for which the WTRU is interested in obtaining a reference ID and/or value tag.

Following a request, a WTRU may perform one or more of the following actions: acquire essential SI that may contain at least a reference ID and/or a value tag; apply a specific version of SI that may be associated with a reference ID and/or a value tag transmitted by the network in response to the request; perform reselection to a different cell, which may be a cell utilizing an SI for which the WTRU has a stored valid version; perform a request for other-SI that may be a result of the WTRU determining that the WTRU does not have a valid stored version of the SI; determine the scheduling information associated with on-demand SI, potentially transmitted by the network in the essential SI; and/or acquire SI, potentially based on previously acquired and/or configured scheduling information. Examples include a reference ID applicable to essential and on-demand SI; a reference ID applicable to essential SI (e.g., only essential SI); non-broadcast reference ID for on-demand SI; broadcast reference ID for on-demand SI; and reference ID applicable for a subset of minimum-SI and/or other-SI.

For a reference ID applicable to essential and/or on-demand SI, a WTRU may reselect to a cell (e.g., new cell) which transmits all or part of the essential SI, but includes a reference ID (indicating the version) and/or a value tag. A WTRU may apply a stored version of the essential SI for the cell if the WTRU possesses a version of SI having the same reference ID and/or value tag. A WTRU may apply the stored essential SI and/or on-demand SI. The WTRU may determine that the reference ID and/or value tag transmitted by the network is applicable to essential SI and/or on-demand SI.

For a reference ID applicable to essential SI (e.g., only to essential SI), a WTRU may reselect to a cell (e.g., new cell) and/or may determine that the reference ID and/or value tag transmitted by the network is applicable to the essential SI (e.g., only the essential SI). A WTRU may apply a valid stored SI for essential SI. A WTRU may initiate a request for on-demand SI in the new cell and/or acquire the on-demand SI (e.g., if it is already being transmitted by the cell).

For non-broadcast reference ID for on-demand SI, a WTRU may receive a reference ID and/or a value tag for essential SI and/or one or more sets of reference IDs/value tags for the on-demand SI. For example, the on-demand SI may be divided into one or more, or multiple, subsets and/or types of on-demand SI. One or more, or each set may have its own reference ID and/or value tag. A WTRU may be configured with the subset information. A WTRU may receive the reference ID and/or value tag sets for the on-demand SI during the transmission of the on-demand SI itself (either through dedicated and/or broadcast signaling). A WTRU may reselect to a cell (e.g., new cell) and/or may detect transmission of the essential SI (e.g., essential SI only) and/or part of the essential SI which may include the reference ID and/or the value tag for the essential SI. For example, a WTRU may receive the reference ID and/or value tag of the essential SI, may determine that the WTRU has a valid version of stored essential SI, and/or may apply the stored essential SI.

The WTRU may determine that the WTRU does not have a valid version of stored essential SI and/or may acquire the essential SI from the cell. The WTRU may perform a request for on-demand SI if the WTRU does not determine that the cell is transmitting the on-demand SI. The WTRU may include, in the request for the on-demand SI, the reference IDs and/or value tag(s) of any on-demand SI. This information may be useful to the network to determine whether to broadcast on-demand SI.

The WTRU may receive, from the network, an indication to use the stored on-demand SI associated with a reference ID; an indication that the on-demand SI will be broadcast by the network; and/or the WTRU may start to receive the on-demand SI from the network as an indication that it should acquire the on-demand SI. The WTRU may perform a request to have the network transmit the reference ID and/or value tag associated with the on-demand SI. The WTRU may receive the reference ID and/or value tag pairs associated with one or more, or each set of on-demand SI, may determine the validity of any stored on-demand SI, and/or may determine whether to perform a request for on-demand SI.

For broadcast reference ID for on-demand SI, a WTRU may reselect a cell (e.g., a new cell) and/or may receive in the essential SI, and/or as part of the essential SI, an independent reference ID and/or value tag pairs for essential SI and/or on-demand SI. The WTRU may determine whether it has a valid version of the essential SI and/or may apply the determined valid version of the essential SI. If the WTRU determines that the WTRU does not have a valid version of the essential SI, the WTRU may acquire the essential SI and the cell may broadcast the essential SI. The WTRU may reselect to a different cell (e.g., if the WTRU determines that the WTRU does not have a valid version and/or the WTRU cannot acquire the essential SI). The WTRU may determine whether the WTRU has a valid version of one or more, or each set of on-demand SI. The WTRU may perform a request for on-demand SI for any set of SI for which the reference ID and/or value tag does not match a stored version of SI at the WTRU.

For a reference ID applicable for a subset of minimum-SI and/or other-SI, a WTRU may apply a combination of stored SI and the SI received from a cell. For example, a WTRU may determine that the reference ID broadcasted for a subset of minimum-SI and/or other-SI, remaining minimum-SI, and/or other-SI should be acquired from the cell. A WTRU may have stored only a subset of minimum-SI and/or other-SI associated with a broadcasted reference ID and/or may determine that the remaining minimum-SI and/or other-SI should be acquired from a cell. A WTRU may implement a subset of SI that is area specific. The remaining SI may be cell specific. A WTRU may be configured with semi-static system information common to an area that may be associated with the area specific reference ID, whereas more dynamic system information may be configured as cell specific SI. A WTRU may be configured with an overlapping subset of area specific SI and cell specific SI. A WTRU may apply precedence for SI transmitted from the cell over the area specific SI (e.g., applied via reference ID+ stored SI). A WTRU may apply two or more subsets of stored SIs based on two or more reference IDs to obtain a complete minimum SI in a cell. For example, a WTRU may receive and/or store different parts of minimum SI. One or more, or each part may be associated with a reference ID. A WTRU may determine the complete minimum SI by a union of different parts of the stored minimum SI.

A WTRU may determine a reception of a list of valid cells. A WTRU may receive (e.g., as part of the SI of a cell) a list of other cells for which the SI can be used for the cell. The WTRU may apply the same rules described above for a reference ID in relation to storage and/or may apply the SI. The WTRU may determine based on whether a cell is within the list of other cells (e.g., based on, for example, the PSS/SSS, and/or cell ID), whether the WTRU can apply acquired/stored SI in the cell, and/or whether the WTRU wishes, desires, and/or finds useful to acquire new (e.g., fresh) SI for a cell.

A WTRU may have a processor programmed to determine conditions (e.g., dependent conditions) for applying SI.

A WTRU may store different instances of SI (associated with the same or different reference IDs) and/or may apply (e.g., selectively apply) an instance of the SI based on certain conditions in the WTRU. The conditions may be configured in the WTRU and/or provided to the WTRU as part of the SI instances. The conditions may include one or more of: the time of day; the geographical location, speed, and/or heading of the WTRU; beam configuration; active service(s) and/or service type(s); and/or an active numerology.

A WTRU may have a processor programmed for actions related to reception of minimum-SI, reduced minimum-SI, and/or other-SI. A WTRU may be configured to receive "reduced minimum-SI" if transmitted. Reduced minimum-SI refers to a transmission of minimum-SI with a reduced size, whose contents are a subset of a complete minimum-SI, and may have one or more information elements not present in complete minimum-SI. A WTRU may be configured to receive reduced minimum-SI in one or more of the following ways: a DL signal as reduced minimum-SI (e.g., a WTRU may derive a reference ID based on one DL signal or a combination of two or more DL signals (e.g. synchronization signals, reference signals)); an MIB as a reduced minimum-SI (e.g., a WTRU may receive from a Master Information Block, one or more reference ID(s) and/or value-tag(s) associated with pre-provisioned SI(s)); a MIB and most frequent minimum-SI as reduced minimum-SI (e.g., a WTRU may determine one or more aspects related to a more frequent minimum-SI from a master information block and the frequent (e.g., most) minimum-SI may carry one or more reference ID(s) and/or value-tag(s) associated with pre-provisioned SI(s)); an MIB, most frequent minimum-SI, and one or more minimum-SI with configurable periodicity; and/or the WTRU may receive and/or apply a minimum-SI with configurable periodicity (e.g., configured in a most frequent minimum-SI) to obtain the complete minimum-SI.

A WTRU may be configured to receive one or more of the following information in a (e.g., complete) minimum-SI; a minimum-SI (e.g., most frequent SI) may include a reference ID(s) and/or validity tag(s) common to some or all minimum-SIs and/or specific to a subset of minimum-SI; and/or a reference ID(s) and/or validity tag(s) common to some or all other-SIs and/or specific to a subset of other-SI.

A WTRU may be configured to determine a support for an SI based on the presence of a reference ID(s) and/or validity tag(s) for that SI. A minimum-SI may include the scheduling configuration for minimum-SI broadcast (e.g., MSI type, periodicity, window length) and/or one (e.g., only one) of the following for one or more, or each, supported other-SI: scheduling configuration for other-SI broadcast (e.g., other-SI type, periodicity, and/or window length) and/or RACH configuration to request other-SI.

Additional minimum SIs may include cell accessibility information (e.g., barring status, access control parameters, PLMN ID, cell ID, area ID etc.), initial access information (e.g., RACH configuration to enter connected state and/or data transfer in inactive state etc.), cell selection info (e.g., Qrxlevmin/offset, Qquallevemin/offset), and/or information for idle mode operation (cell reselection info for intra, inter neighbors, mobility scaling, common radio resource configuration (e.g., paging) etc.). A WTRU may be configured to request and/or receive one or more of the following information in other-SI: SI that might not be a part of complete minimum-SI and/or a reduced minimum-SI; SI that may be a part of minimum-SI (e.g., this may be useful for WTRUs that are coverage limited and/or may allow a less conservative design for broadcast minimum-SI); minimum-SI applicable for non-serving cells; and/or other-SI applicable for non-serving cells.

A WTRU may perform one or more of the following actions, perhaps for example when a system information acquisition procedure for a cell is triggered. If the cell transmits reduced minimum-SI, a WTRU may attempt to receive reduced minimum-SI. If reduced minimum-SI is received successfully by the WTRU, the WTRU may determine/derive one or more reference ID(s) associated with the cell. If the WTRU can determine a complete minimum-SI based on a received reduced-minimum-SI, derived reference ID(s), value-tag(s) and/or matching stored SI(s), the WTRU may perform one or more actions as if acquisition of minimum-SI was completed. If the WTRU receives configuration for resources for other-SI request from the reduced minimum-SI, a WTRU may trigger an other-SI request procedure to acquire one or more on-demand SI and/or perform one or more actions as if acquisition of minimum-SI is completed. A WTRU may assume that the cell is barred.

If the cell transmits complete minimum-SI, a WTRU may attempt to receive/determine a reference ID from the minimum-SI transmitted in the cell. If the WTRU can determine a complete minimum-SI based on reference ID(s), value-tag(s) and/or matching stored SI(s), a WTRU may perform one or more actions as if acquisition of minimum-SI is completed. A WTRU may attempt to receive complete minimum-SI transmitted in the cell. A WTRU may perform actions (e.g., subsequent actions) depending on the contents/status of received minimum-SI (e.g., whether WTRU is allowed to camp on the cell or if the cell is barred).

A WTRU may be configured to reclaim the random access resources (e.g., time/frequency and/or preambles) which may be configured for other-SI request(s), perhaps based on one or more factors. For example, a WTRU may reclaim the random access resources configured with the other-SI request(s), perhaps when the WTRU determines that the other-SI is broadcasted. For example, a WTRU may determine that the other-SI is broadcasted from an indication in the minimum-SI. For example, a WTRU may reclaim (e.g., only) the resources associated with a subset of other-SIs that may be broadcasted.

A WTRU may be configured to perform random access procedures for purposes other than other-SI request(s) on the reclaimed random access resources. For example, the WTRU may be configured to utilize the reclaimed random access resources configured for other-SI request(s) to perform an initial access and/or scheduling request and/or respond to a PDCCH order and/or to initiate UL synchronization and/or to initiate UL beam management and/or access target cell during handover, etc. For example, a WTRU may be configured to use reclaimed resources perhaps when the random access procedure fails on the resources configured for such procedure and/or on dedicated random access resources. For example, a WTRU may consider one or more, or a combination, of resources configured for access and/or reclaimed resources for random access resource selection.

A paging control function may be applied, for example, per TRP, per TRP group, per service, per configured MAC instance, per channel per instance, per central control function, etc.

A central control function may store a WTRU context and/or track a WTRU mobility within the coverage of RCCF, for example, for a WTRU in a light connected state. A WTRU may receive a paging message originated at the RCCF and/or transmitted by the RCCF triggered, for example, upon arrival of downlink data. A paging message may be transmitted, for example, at ACF granularity and/or RCCF granularity. A WTRU in a light connected state, e.g., upon receiving the paging message, may perform one or more actions.

For example, a WTRU action may resume a WTRU user plane path towards the central user plane function, e.g., without having to invoke any additional central control functions.

For example, a WTRU may perform control plane actions and/or user plane actions, e.g., based on the received paging message.

For example, a WTRU may receive additional indication(s) in the paging message that determine WTRU actions. For example, a WTRU may receive a type of service in the paging message. A WTRU may (e.g. based on the indication) transition to fully connected state or light connected state. For example, a WTRU may determine a type of initial access procedure (e.g. contention based, beamformed, initial access on a specific ACF), for example, based on a received paging message.

For example, a WTRU may receive an indication for the resources used for data transmission. A WTRU may (e.g. directly) receive the data without having to establish any connection. A WTRU may (e.g. upon completing data reception) transition back to idle or a light connected state.

For example, a paging message may trigger establishment of ACF. For example, a paging message may trigger RCCF establishment while another paging message may trigger resumption of RCUF.

WTRU identification may be provided, for example, by a layer 3 (L3)/central control plane connection/WTRU context identifier. Singular connectivity may have a one to one relation between WTRU identity on the radio (e.g. RNTI) and an RRC connection. A WTRU's RRC connection for dual connectivity may be associated with a WTRU specific RNTI in the MeNB (Master eNB). A WTRU may be assigned one or more, or multiple RNTIs during multi-connectivity (e.g. different RNTI per TRP), for example, in a tri-plane architecture. A WTRU context may be identified in the centralized control function, for example, by assigning an L3 identity to a WTRU. A WTRU may receive an L3 identity, for example, upon central control plane establishment. An L3 identity may be used, for example, to uniquely identify an RRC connection and/or RRC context associated with a WTRU.

An RCCF connection may be managed. There may be one or more triggers for re-association with RCCF. For example, a WTRU may trigger an association and/or re-association procedure with the RCCF when one or more of criteria are satisfied.

An example criteria may be when no valid L3 context exists in a WTRU, for example, due to a power up scenario where a WTRU may be unknown at the network, and/or an L3 context expired (e.g. due to extended periods of inactivity).

An example criteria may be when a WTRU enters a coverage of an anchor control function different than a serving anchor control function. A WTRU may determine presence and/or identity of an anchor control function using one or more procedures. An example procedure may comprise using a shared system signature. For example, TRPs associated with the same anchor control function may share at least one system signature. An example procedure may comprise using explicit identification in MIB. For example, TRPs associated with an anchor control function may transmit some form identity associated with the anchor control function. A WTRU may obtain the anchor control function identity during a previous association. An example procedure may comprise using logical area transmitted in broadcast channels. For example, an (e.g. one or more, or each) anchor control function may provide anchoring services to a logical area including one or more TRPs. A WTRU may consider TRPs belonging to a specific logical area as associated with the same anchor control function. An example of a procedure may be using a pre-configured system signature group. For example, two or more system signatures may be preconfigured to be associated with the same anchor control function. A WTRU may consider TRPs transmitting at least one of the system signatures within a particular system signature group to be associated with the same anchor control function.

An example criteria may be when an access control function associated with macro eNB experiences failure and/or a WTRU might (e.g. does) not have a valid access table entry.

An example criteria may be when (e.g. one or more, or all, of) the configured/activated access control functions may be terminated/released.

An example of a criteria may be upon arrival of a paging message indicating arrival of DL data and/or DL signaling from the core network.

An example of a criteria may be unreachability of a serving anchor control function, which may be determined, for example, based on an absence of response to signaling message towards the anchor control function and/or absence of keep alive/heart beat with the serving anchor control function.

An example of a criteria may be upon receiving a last RAR message. A WTRU may (e.g. during initial access to a network) perform a multi-point random access procedure. A WTRU may wait for a last RAR message to trigger an RCCF association procedure. A WTRU may determine the last RAR message in one or more ways. For example a (e.g. one or more, or each) RAR message may include a countdown value. For example, a WTRU may consider the RAR message with countdown value of zero as the last RAR message. For example, a WTRU may wait until the end of an RAR window to receive an (e.g. every possible) RAR message before triggering an RCCF association procedure.

A WTRU may initiate association towards an anchor control function, for example, any time after acquiring UL resources to transmit, e.g., after access plane establishment. A WTRU may transmit a higher layer signaling message that may include a WTRU identity, an identity of an anchor control function, a reason for association, a number of RAR messages, a list of TRPs and/or a selected list of TRPs.

A WTRU identity may be, for example, one or more of the following: an identity allocated by a previous anchor control function, a temporary identity allocated by a core network and/or a sufficiently long random number (e.g. >=40 bits).

An identity of anchor control function may be, for example, optionally present, e.g., when a WTRU had a previous association with an anchor control function.

A reason for association may be, for example, one or more of the following: a request for anchoring control service, a request for paging service, a request for access to specific core network slice, an initial association for subsequent core network signaling, an association due to change in anchor control function, a failure of a previous anchor control function, a response to paging, UL data arrival and/or type of service requested (e.g. high throughput service, low latency service and/or low overhead and energy efficient service), etc.

A number of RAR messages may be, for example, a number of RAR messages received in response to a random access procedure.

A list of TRPs may be, for example, a list of TRPs that transmitted the RAR messages and/or quality metric for a (e.g. one or more, or each) received RAR.

A selected List of TRPs may be, for example, a list of TRPs selected by a WTRU using a predefined selection criteria.

A WTRU may transmit an RCCF association request on available resources. A request may be transmitted in an order. An example of an order may be, for example one or more of: time/frequency resources associated with a macro ACF whose suitability metric is highest among available macro ACFs; time/frequency resources associated with a macro ACF whose suitability metric is above a certain threshold; time/frequency resources associated with a TRP ACF whose suitability metric is highest among configured/active/available TRP ACFs; and/or time/frequency resources associated with a TRP ACF whose suitability metric is above a certain threshold.

A suitability metric may be, for example, received power measured from a reference signal and/or system signature averaged over a time window.

A WTRU may prefer ACFs associated with one or more licensed bands over ACFs associated with unlicensed bands.

A WTRU may prefer non-beamformed ACFs over beamformed ACFs.

A WTRU may (e.g. in response to an RCCF association request) receive and/or process an association response. The contents of a response may include, for example, one or more of an identity of an RCCF, an identity of a WTRU, access table parameters, a measurement configuration, an SRB configuration, a DRB configuration, dedicated ACF parameters/resources and/or user plane RCUF status and/or parameters.

An identity of an RCCF may be stored and/or used (e.g. by a WTRU), for example, to address subsequent control signaling towards the RCCF.

An identity of a WTRU may be stored and/or used (e.g. by a WTRU), for example, to identity itself for subsequent interaction with the RCCF.

Access table parameters may be received in a response. A WTRU may (e.g. directly) receive access table contents within the association response message and/or parameters that may help a WTRU to obtain the access table parameters (e.g. ACFs and/or time/frequency resources that carry access table transmission, and/or an RNTI to decode the schedule for access table transmission, etc.).

A measurement configuration may comprise configuration of measurement resources, measurement objects, measurement quantity and/or measurement id, triggers, etc. A measurement configuration may be specific to an ACF or group of TRPs.

An SRB configuration may indicate mapping rules for SRB. For example, an SRB to ACF mapping (e.g. for SRBs terminating at ACFs) may provide (e.g. an explicit) mapping between SRBs and an ACF. A mapping may map an SRB to transport/physical channels associated with a specific ACF. For example, an SRB to ACF mapping restriction may be provided. A WTRU may be configured with restricted ACFs that might not be used for SRB transmission. WTRU may flexibly split the SRBs among available/allowed ACFs. For example, an SRB prioritization via ACF mapping may be provided. High priority SRBs may be mapped and/or low priority SRBs may be mapped, e.g., to a different ACF/ACF group. For example, Dynamic SRB mapping based on ACF quality may be provided. A mapping may transmit high priority SRBs over ACFs whose quality metric is above certain threshold. For example, a DRB configuration may include, for example, DRB tagging information. A WTRU may attach to a (e.g. one or more, or each) PDU belonging to a DRB associated tagging information provided by the central control function. Tagging information may be used, for example, by the RCUF to map the PDUs to the right core network flow. Dedicated ACF parameters/resources may be provided in a response to an RCCF association request. User plane RCUF status and/or parameters may be provided in a response to an RCCF association request.

An ACF connection may be managed. Triggers may be provided for access plane management. A WTRU may trigger access plane establishment, for example, when one or more criteria is satisfied.

An example of trigger criteria may be, for example, when a WTRU receives an unknown signal (e.g. without a valid entry in the access table), which may occur when an SIB might not be broadcast in the cell, UL resource for SIB interest notification and/or on-demand access table and/or when a WTRU may request an access table entry from another TRP (e.g. send the signature).

An example of a trigger criteria may be, for example, upon arrival of user plane data (e.g. IP packet), which may occur, for example, when a WTRU already has an access plane established or does not have an access plane established, such as when higher layer data may allow for early data transfer and/or a valid entry in the access table is available that indicates UL resources timing (e.g. w.r.t to another signal and/or control channel, etc.).

An example of a trigger criteria may be, for example, upon arrival of control plane signaling (e.g. L3/RRC message and/or NAS message).

An example of a trigger criteria may be, for example, change in RAN tracking area, proximity to non-serving anchor control function, change in anchor control function, etc.

An example of a trigger criteria may be, for example, re-establishment of an access plane on a same or better TRP, for example, when a WTRU loses uplink synchronization (TAT expiration) and/or when a WTRU goes out of sync at lower layers.

An example of a trigger criteria may be, for example, WTRU mobility based on, for example, one or more of: a discovery of a new TRP associated with a serving anchor control function, a measurement events at (L1/L2/L3) above a predefined threshold; and/or a reception of a new system signature above (or below) a predefined threshold.

A TRP/network may trigger access plane establishment, for example, when one or more of the following criteria is satisfied: upon command from central control plane entity; upon receiving user plane data, e.g. paging; and/or upon an addition of a new TRP and/or cell group.

Access plane establishment may involve, for example, one or more of the following: a WTRU may trigger a random access on a predefined UL resource determined by system signature; and/or a WTRU may trigger a random access procedure on a multi-point random access resource.

A WTRU may consider an access plane established, for example, when it receives one or more RAR messages that pass a suitability criteria.

A WTRU may take one or more actions after establishing an access plane. For example, a WTRU may be uplink synchronized and/or may (e.g. be required to) maintain the synchronization.

WTRU may be assigned an identifier, e.g., to uniquely identify a WTRU with a single TRP or a group of TRPs. For example, a WTRU may monitor downlink control channels for possible scheduling grants and/or feedback. For example, a WTRU transmit periodic and/or event triggered feedback and/or reference signals on the uplink control channels.

Access plane establishment may enable one or more of the following: a WTRU may be reachable at TRP level granularity; and/or a WTRU may be assigned dedicated physical resources (e.g. UL control channel resources, semi-persistent resources, etc.).

A WTRU may transmit higher layer data and/or signaling terminated at a TRP and/or signaling messages terminated at the RCCRF to setup control plane. A WTRU may (e.g. additionally) transmit L3 control/signaling, measurement report, NAS signaling messages, etc., for example, when the control plane may be set up. A WTRU may (e.g. additionally) transmit application/user data, for example, when the user plane is set up.

A radio link monitoring (RLM) function may be provided, for example, as a WTRU-specific function, a component-specific function and/or a plural-component function.

A WTRU-specific function, for example such as an RLM function may be configured per WTRU.

A component-specific function, for example such as an RLM function may be configured per WTRU-TRP pair and/or a WTRU-ACF pair.

A plural-component function, for example such as an RLM function may be configured per group of components, such as one or more, or multiple cells, one or more, or multiple TRPs, one or more, or multiple TRPGs, and/or one or more, or multiple NR-eNBs, etc. For example, a WTRU may perform radio link monitoring on one or more (e.g. a subset of TRPs per group of TRPs). A WTRU may consider the measurements on a TRP as indicative of radio link status for a group of TRPs. For example, a WTRU may consider measurements on a (e.g. any) TRP as indicative of radio link status for a group of TRPs.

A WTRU may be configured with a different monitoring procedure, for example, based on one or more of the characteristics/property of Uu with a TRP, a nature of a service and/or a WTRU state.

One or more characteristics/property of Uu with a TRP, for example such as an RLM procedure for a beamformed Uu may be different from a narrow band Uu. For example, an RLM may be optional in some scenarios, e.g., in an unlicensed Uu.

In an example of a nature of a service, one or more aspects of an RLM procedure may be tied to the type of services active in a WTRU. For example, a WTRU may perform RLM with (e.g. strict) thresholds while using a URLLC service.

For example one or more aspects of an RLM procedure may be tied to one or more WTRU states. For example, a WTRU may perform a relaxed monitoring procedure in a light connected state, e.g., compared to fully connected state.

A radio link failure handling function may be, for example, a WTRU-specific function, component-specific function and/or a plural-component function.

A WTRU may support multi-connectivity to increase reliability, mobility robustness, throughput etc. For example, a relation between configured cells for a WTRU may be flexible. A (e.g. one or more, or each) cell configured for a WTRU may be dynamically assigned different roles. For example, a cell may be a Pcell, PScell and/or Scell, where roles may vary with time, e.g., based on predefined criteria and/or measurements.

A WTRU may (e.g. be required to) determine and/or may react to different types of failure. A WTRU may (e.g. with a distributed control plane architecture) distinguish between aspects related to connectivity to a TRP, reachability to different control functions, etc.

For example, a WTRU may determine different types of failure, such as a TRP level failure, an ACF level failure and/or an RCCF failure.

For example, a TRP level failure may be related to status of lower layer functions, e.g., loss of timing, unsuitability based on measurements below threshold, etc.

For example, an ACF level failure may be related to unreachability of a specific ACF. A WTRU may trigger a report to a central control function, which may include which ACF failed and/or a reason for failure.

For example, an RCCF failure may be related to unreachability of a central control function, for example, based on a timer expiring from the last interaction with RCCF.

A WTRU may decouple a capability to transmit data from different levels of failure on a control plane. For example, a TRP level failure might not trigger a WTRU to suspend the data transmissions. For example, a WTRU may continue data transmissions, for example, even while a control plane is being re-established. For example, a WTRU may perform connectionless transfer, for example, while trying to recover from partial control plane failure.

A mobility control function may be a WTRU-specific function, component-specific function and/or a Plural-component function.

WTRU mobility may be (e.g. closely) tracked at the RAN for WTRUs, e.g., in light connected states and/or IDLE connectionless states. Tracking may be at a granularity of a TRP group and/or a central control function. Different levels of mobility control functions may be defined, such as one or more of the following: Intra-TRP (e.g. may include beam level mobility); Inter-TRP (e.g. may include mobility handling at ACF level without involving a central anchor function); Inter-ACF (e.g. may be controlled by central anchor function and/or may be defined between LTE ACF and NR ACF in example of a tightly coordinated mobility function); Inter-RCCF (e.g. may be applicable for WTRUs in connected state and/or light connected state and/or a WTRU may support a control anchor change without a change to the user plane functions and/or user plane anchor); and/or Inter-RAT (e.g. may include mobility between NR to legacy RATs like GSM/UMTS, etc.).

Mobility control functions may be WTRU autonomous, network controlled, network assisted WTRU controlled and/or WTRU assisted network controlled.

Different parts of WTRU context and/or L2 state may persist after a mobility event. A WTRU may reset different parts of context and/or L2 state, for example, based on a type of mobility event. For example, a WTRU may use a specific set of rules to 'convert' a configuration/context upon handover to a different TRP/ACF. For example, a WTRU may retain parts of configuration and/or L2 context that are compatible while applying equivalent configurations and/or mapped configurations and/or while converting certain aspects during a mobility event between LTE and NR.

A WTRU may be configured with mobility restrictions. For example, a WTRU might not perform autonomous mobility to a LTE TRP.

A measurement configuration and reporting function may be a WTRU-specific function, component-specific function and/or a plural-component function.

A WTRU may transmit a measurement report to plurality of TRPs. A WTRU may, for example, based on a configuration, report beam related measurements (e.g. intra-cell beam level RRM measurements) to the associated TRP. A WTRU may report measurements of a plurality of TRPs to an associated ACF. For example, a WTRU may report measurements on LTE TRPs to an LTE ACF.

For example, a WTRU may differentiate measurements on TRPs associated with a serving central control function from the measurements on TRPs associated with a different central control function. For example, a WTRU may be configured to measure (e.g. only) the TRPs associated with a serving control function.

The placement of a measurement processing control function may be flexible. For example, a measurement processing control function may be placed closer to a WTRU, e.g., for URLLC service.

A security and authentication control function may be a WTRU-specific function, component-specific function and/or a plural-component function.

A WTRU may treat security aspects associated with an ACF independently from other ACFs. For example, a security failure in ACF may be localized to that ACF and/or might not affect WTRU connectivity to other ACFs.

For example, a WTRU may perform independent integrity protection for control plane messages, such as control plane signaling towards an ACF and/or control plane signaling towards an RCCF.

For example, WTRU control signaling towards an RCCF may be placed in a container within ACF messages. A WTRU may apply (e.g. only) ACF integrity protection to the RCCF messages.

For example, a WTRU may obtain integrity protection keys for a (e.g. one or more, or each) ACF, for example, based on interaction with those ACFs. A WTRU may obtain integrity protection keys for an (e.g. one or more, or each) ACF from the RCCF.

Configuration failure handling may be a WTRU-specific function, component-specific function and/or a plural-component function.

A WTRU may trigger failure handling, for example, based on a control function that triggered the configuration. For example, configuration failure for an access control function might not affect WTRU association with other access control functions. A WTRU may report a failure to the RCCF indicating the specific ACF that triggered the configuration and/or the reason for failure, for example, when a WTRU is unable to comply with one or more aspects of a configuration. For example, a WTRU may perform connectionless signaling transfer, e.g., to report a configuration failure. For example, configuration failure towards a central control function might not affect WTRU capability to transmit data over the user plane. For example, configuration failure may trigger release of an access plane towards (e.g. one or more, or all) the access control functions.

A Logical association may be defined between PDU carrying control signaling. An association may, for example, be based on data units being associated with an access control function or an instance thereof, with a central control function or instance thereof and/or with the same SOM and/or slice. For example, an association may characterized, for example, by at least one of a chaining of processing functions, an applicable physical data (and/or control) channel (or instance thereof) and/or an instantiation of a protocol stack, which may include a specific portion being centralized (e.g. anchor control function) and another portion being closer to the edge (e.g. access control function).

An example of logical association may be a signaling radio bearer (SRB). A WTRU may have one or more, or multiple termination points for control signaling. A WTRU may a have signaling association towards an access control function, e.g., access signaling radio bearer (ASRB). A WTRU may (e.g. in case of multi-connectivity) have more than one ASRB. An (e.g. one or more, or each) ASRB may terminate at a different access control function. A WTRU may have a signaling association towards an anchor control function (e.g. a central SRB (CSRB)) that may terminate at the anchor control function.

A WTRU may transmit a control message on the same SRB that carried an original message, for example, when the control message is a response to a control message from a network (e.g. setup and/or reconfiguration message). For example, a WTRU may address a response to an access control function that transmitted the control message. In an (e.g. another) example, a WTRU may transmit a response to a control message received from a downlink cell group, e.g., in an uplink cell group associated with the same MAC instance.

An (e.g. one or more, or each) ASRB may be associated with a MAC instance.

Mapping ASRB to physical channels may be specific to one or more, or each ACF instance. For example, the characteristics of physical channels that carry ASRB may be different from physical channels carrying data packets. For example, an ASRB may be mapped to physical channels with wider spatial coverage, for example, when a MAC instance utilizes beamformed channels.

A WTRU may use data transmission services provided, for example, by the access plane, e.g., to transmit a control signaling message towards an anchor control function.

A WTRU may be preconfigured with a (e.g. exactly one) MAC instance to transmit control signaling (e.g. a message) towards an anchor control function. For example, a MAC instance may be associated with a macro TRP.

For example, a WTRU may be configured with one or more MAC instances for CSRB transmission. A WTRU may shortlist candidate MAC instances, for example, based on one or more criteria, such as one or more of access plane status, UL TAT, prohibited MAC instances, coverage of a TRP, security status and/or activation status.

For example of an access plane status, a WTRU may choose MAC instances for which an access plane is already established.

For example of UL TAT, a WTRU may choose MAC instances with valid UL timing (e.g. TAT timer is running).

For example of prohibited MAC instances, a WTRU may consider one or more MAC instances that are not prohibited for CSRB transmission. For example, a WTRU may be configured with blacklisted MAC instances that might not carry CSRB transmission and/or (e.g. equivalently) a WTRU may be configured with whitelisted MAC instances for CSRB transmission.

For example of coverage of a TRP, a WTRU may choose MAC instances that are associated with a larger coverage, e.g., belonging to a macro TRP.

For example of security status, a WTRU may choose MAC instances associated with ACFs for which security context may be (e.g. already) established. For example, a WTRU might not consider MAC instances for which an authentication/security mode procedure is ongoing or not yet started. For example, a WTRU may wait for security activation for the access control function to complete before transmission of control message towards the anchor control function.

In an example of activation status, a WTRU may choose MAC instances that may be configured and/or activated by a network.

For example, a WTRU may have one or more, or multiple candidate MAC instances available for CSRB transmission. A WTRU may select a MAC instance for a CSRB transmission in one or more ways, such a based on signal quality, transmission opportunity, explicit priority, reliability, outcome of previous transmission and/or linked MAC status.

In an example of signal quality, a WTRU may choose a MAC instance with a better signal quality metric (e.g. RSRP/RSRQ/Hypothetical PDCCH error rate) for one or more cells in the cell group associated with that MAC instance.

In an example of transmission opportunity, a WTRU may choose a MAC instance with the earliest transmission opportunity. A WTRU may prefer a MAC instance with an available scheduling grant over a MAC instance that may find a resource request procedure useful and/or may have (e.g. only) contention based resources. A WTRU may (e.g., temporarily) suspend transmissions on MAC instances that may have an outstanding reconfiguration procedure that reconfigures one or more characteristics associated with that MAC instance.

In an example of explicit priority, a (e.g. one or more, or each) MAC instance may be associated with a priority. A WTRU may choose the MAC instance with highest priority for transmission of CSRB messages.

In an example of reliability, a WTRU may choose to transmit the same control message over plurality of MAC instances, for example, for control messages that may require high reliability (e.g. those associated with ultrareliable services).

In an example of outcome of previous transmission, a WTRU may choose a different MAC instance (e.g. for retransmission) than the MAC instance used for a (e.g. an original) failed transmission.

In an example of a linked MAC instance—WTRU may (e.g. for a response control message) choose the same MAC instance on which the corresponding request/setup control message was received.

For example, a WTRU may perform MAC instance selection (e.g. only) during initial registration and/or association towards a new anchor control function. A WTRU may use the same MAC instance for a (e.g. any) subsequent control message exchange with that anchor control function.

For example, a WTRU may perform MAC instance selection (e.g. once) for a (e.g. one or more, or each) control signaling procedure with the anchor control function. A control signaling procedure may involve one or more control signaling message transactions. For example, a (e.g. one or more, or all) control messages belonging to the same procedure may be transmitted over a (e.g. single) MAC instance.

For example, a WTRU may perform MAC instance selection for a (e.g. one or more, or each) control message transmission. For example, control messages belonging to the same procedure may be transmitted over different MAC instances. A WTRU may switch to a different MAC instance, for example, for a retransmission of the control message.

A WTRU may prioritize transmission signaling messages mapped to ASRB over control signaling mapped to CSRB. A WTRU may have an access control message and/or an anchor control message ready for transmission. For example, a WTRU may (e.g. first) transmit an access control message in the earliest transmission opportunity and/or may (e.g. subsequently) transmit the anchor control message in the same subframe/TTI from the same MAC instance or a different MAC instance, for example, when resources are available and/or in the next available resource from the same MAC instance or a different MAC instance. For example, a WTRU may wait for the completion of the ongoing procedure with the access control function and then transmit the anchor control message at the first available transmission opportunity. For example, a WTRU may be configured with two more ASRBs mapped to the same MAC instance. One or more, or each of the ASRBs may be identified by a different logical channel identity and/or ASRB identity. A WTRU may be preconfigured with rules to prioritize between two or more ASRBs mapped to the same MAC instance. For example, a prioritization may be implicit, e.g., based on the type of control message and/or based on explicit SRB identity/logical channel identity.

A WTRU may provide an (e.g. additional) indication in a PDU, for example, to differentiate a control message addressed to access a control function from a control message addressed to an anchor control function. For example, an indication may include one or more of the following: a logical channel identity, an explicit indication of a type of message and/or an explicit identity of an anchor control function.

In an example of a logical channel identity, a different logical channel identifier may be used to differentiate different ASRB within the same MAC instance. Logical channel identifiers may be reserved, for example, to indicate that the control message belongs to CSRB.

In an example of an explicit indication of a type of message, a (e.g. one or more, or each) control message may carry an indication for a type of the message. For example, a first type may indicate that it may be an access control message and/or a second type may indicate an anchor control message.

In an example of an explicit identity of anchor control function, a WTRU may (e.g. additionally) provide an explicit identity of a destination anchor control function, for example, when the access control function may be associated with more than one instance of the anchor control function. A WTRU may transmit a special/reserved identity, for example, to indicate lack of previous interaction with an anchor control function (e.g. a network may select a new anchor control function to deliver the control message).

A WTRU may receive a control message with configuration. A configuration may be applicable, for example, to a specific cell within a cell group associated with a MAC instance, to multiple (e.g. one or more, or all) cells within a cell group associated with a MAC instance, to a group of MAC instances or to one or more, or all MAC instances. For example, configuration parameters may include one or more of the following: slicing configuration, supported services configuration, addition/removal/modification of cells, QoS configuration, DRX configuration, security configuration, measurement configuration, dedicated radio resource configuration like SRB configuration, DRB configuration including PDCP and/or RLC and/or MAC configuration, physical channel configuration, SPS-configuration, etc.

A WTRU may determine the applicability of a configuration, for example, based on one or more criteria, such as a type of SRB, a linked MAC instance and/or an explicit access control identity.

In an example of a type of SRB, a WTRU may apply configuration parameters received in the ASRB applicable (e.g. only) to a MAC instance associated with the ASRB. A WTRU may consider the configuration parameters received in CSRB applicable to (e.g. one or more, or all) the MAC instances, e.g., unless explicitly indicated within the configuration message.

In an example of a linked MAC instance, a WTRU may apply configuration parameters received from a cell/cell group to a MAC instance associated with that cell/cell group.

In an example of an explicit Access control function identity, a WTRU may receive configuration parameters with an explicit indication of a MAC instance to which the configuration is applicable. For example, a WTRU may receive a MAC identity and/or access control function identity, e.g., along with the configuration parameters.

For example, a WTRU may be configured with a linked-SRB. A linked-SRB may be an ASRB that may be associated with one or more DRBs. For example, linkage may be many-to-many association. A (e.g. one or more, or each) DRB may be linked to one or more ASRBs. A WTRU may apply configurations received in a ASRB to (e.g. only) the DRBs linked with the ASRB.

For example, a WTRU may (de)multiplex control signaling (e.g. RRC PDUs and/or the like) using different logical connections, bearers (e.g. SRB0, 1, 2, 3, etc. and/or using different sets thereof), flow-based treatment (e.g. based on configured tuples applicable to L3 protocols), for example, as a function of the logical grouping of the function that generated the RRC SDU.

For example, a WTRU RRC function for access plane establishment may generate an RRC SDU that may be mapped to a specific SRB. An SRB may correspond to a set thereof. A set may be associated with the Access Plane connection being established. For example, a procedure may use a first SRB corresponding to the set of SRBs available for establishment of such connection, for example, for initial access to the system (e.g. while security is not yet activated). A (e.g. the) procedure may use a second SRB otherwise, for example, when at least part of the security may be activated, e.g., for the RCCF. A WTRU may (e.g. in the latter case) include authentication (and/or encryption), for example, for at least part of the RRC SDU, e.g. the part of the SDU that may be used to determine the identity of a WTRU and/or may provide capability for the network to fetch a WTRU's context.

A WTRU RRC function for central control plane may (e.g. similarly) generate an RRC SDU that may be mapped to a different specific SRB (e.g. an SRB that may correspond to a different set of SRBs).

For example, different logical grouping of functions may have different sets of SRBs from each other.

For example, when a single set of logical paths may be configured, and/or when a WTRU may be configured with a (e.g. one) set of logical paths for one or more, or each type of logical grouping), an RRC SDU may include an identifier (e.g. the identity of the instance of the logical group of functions that generated the SDU), for example, when a WTRU may be configured with one or more, or multiple user plane "slices" and/or equivalent.

For example, procedures may be (e.g. further) applied, for example, (e.g. similarly) as a function of the physical transport paths. Grouping of functions and/or association of transport paths may be a configurable aspect, e.g., from a WTRU's perspective.

Systems, procedures, and instrumentalities (e.g. aspects of entities, interfaces and procedures in a wireless transmit/receive unit (WTRU) and/or network layers L1, L2, 13) have been disclosed for distributed control in wireless systems, such as 5G flexible radio access technology (RAT) (5gFLEX). Example procedures are provided for WTRU and network operation associated with a distributed control plane architecture, connectionless data transfer and dedicated system information acquisition. Distributed control may be provided, for example, by replicating a plurality of access control functions (ACFs) using a plurality of instances in a plurality of different transmission/reception points (TRPs) with multi-connectivity. The plurality of TRPs may concurrently provide control services to a WTRU. Centralized control functions may manage core network connectivity and/or a plurality of user plane instances for the WTRU and/or may facilitate coordination between the plurality of ACF instances for the WTRU in the plurality of different TRPs of the WTRU's configuration. For example, there may be a first access plane between the WTRU and a first TRP that provides a first ACF for the WTRU, a second access plane between the WTRU and a second TRP that provides a second ACF for the WTRU, a RAN central control plane between the WTRU and a first RAN central control function (RCCF) and a RAN central user plane between the WTRU and a RAN central user function (RCUF).

The processes and instrumentalities described herein may apply in any combination, may apply to other wireless technologies, and/or for other services.

A WTRU may refer to an identity of the physical device, and/or to the user's identity such as subscription related identities, e.g., MSISDN, SIP URI, etc. WTRU may refer to application-based identities, e.g., user names that may be used per application.

One or more, or each of the computing systems (e.g., WTRU) described herein may have one or more computer processors having memory that are configured with executable instructions and/or hardware for accomplishing the functions described herein including determining the parameters described herein and/or sending and receiving messages between entities (e.g., WTRU and network) to accomplish the described functions. The processes described above may be implemented in a computer program, software, and/or firmware incorporated in a computer-readable medium for execution by a computer and/or processor. Except as explicitly noted, determinations in reference to a computer generally refers to a processor programmed with instructions for determining. Likewise, the term store in reference to a computer generally means a processor programmed with instructions for storing in computer memory.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A method for communicating with a communication network, the method comprising:
    determining to request other system information (other-SI) from the communication network;
    initiating the request for the other-SI from the communication network as part of a Radom Access Channel (RACH) procedure;
    transmitting a RACH signal, the RACH signal including the request for the other-SI in a random access preamble of the RACH signal;
    monitoring for a message that includes a minimum SI from the communication network for a predetermined period of time following the transmission of the RACH signal;
    determining if the requested other-SI is included in the message that includes the minimum SI upon a detection of the message that includes the minimum SI; and
    initiating one or more retransmissions of the RACH signal upon at least one of: the message that includes the minimum SI not being detected, or the other-SI is determined to not be included in a detected message that includes the minimum SI.

2. The method of claim 1, wherein the predetermined period of time occurs within a random access response time window.

3. The method of claim 2, further comprising monitoring for a predefined identifier in a control channel within the random access response time window.

4. The method of claim 3, wherein the predefined identifier is specific to the request of the other-SI.

5. The method of claim 3, wherein the predefined identifier is a Radio Network Temporary Identifier (RNTI).

6. The method of claim 2, wherein the message that includes the minimum SI is at least one of: one or more random access response messages, and wherein the method further comprises processing the at least one of the one or more random access response messages within the random access response time window.

7. The method of claim 6, wherein a format of the at least one of the one or more random access response messages is specific to the request for the other-SI.

8. The method of claim 1, further comprising initiating a power ramping of the random access preamble in the one or more retransmissions.

9. The method of claim 1, further comprising initiating the one or more retransmissions of the RACH signal upon at least one of: no response to the RACH signal being detected in the predetermined period of time; or a limit of a preamble counter associated with the RACH signal not being reached.

10. The method of claim 1, wherein the message that includes the minimum SI is at least one of: a random access response message that corresponds to the random access preamble of the RACH signal, or a random access response message that does not correspond to the random access preamble of the RACH signal.

11. The method of claim 1, wherein at least one of the one or more retransmissions have been initiated, the method further comprises:
    ceasing an initiation of any further retransmissions of the one or more retransmissions upon:
        a detection of the message that includes the minimum SI; and
        a determination that the requested other-SI is included in the detected message that includes the minimum SI.

12. A wireless transmit/receive unit (WTRU) in communication with a communication network, the WTRU comprising:
    a memory;
    a processor, the processor configured at least to:
        determine to request other system information (other-SI) from the communication network;
        initiate the request for the other-SI from the communication network as part of a Radom Access Channel (RACH) procedure; and
    a transceiver, the transceiver configured at least to:
        transmit a RACH signal, the RACH signal including the request for the other-SI in a random access preamble of the RACH signal, the processor being further configured to:
        monitor for a message that includes a minimum SI from the communication network for a predetermined period of time following the transmission of the RACH signal;
        determine if the requested other-SI is included in the message that includes the minimum SI upon a detection of the message that includes the minimum SI; and
    initiate one or more retransmissions of the RACH signal upon at least one of: the message that includes the minimum SI not being detected, or the other-SI is determined to not be included in a detected message that includes the minimum SI.

* * * * *